United States Patent [19]
Fukahori et al.

[11] Patent Number: 4,881,092
[45] Date of Patent: Nov. 14, 1989

[54] MOTOR DRIVEN CAMERA

[75] Inventors: Hidehiko Fukahori; Masayuki Suzuki; Yoshihiko Aihara, all of Kanagawa, Japan

[73] Assignee: Canon Kabushiki Kaisha, Tokyo, Japan

[21] Appl. No.: 139,844

[22] Filed: Dec. 29, 1987

[30] Foreign Application Priority Data

Jan. 7, 1987 [JP] Japan .................. 62-002172
Jan. 7, 1987 [JP] Japan .................. 62-002177
Jan. 7, 1987 [JP] Japan .................. 62-002178

[51] Int. Cl.⁴ .................. G03B 1/12; G03B 19/12
[52] U.S. Cl. .................. 354/152; 354/173.1
[58] Field of Search .................. 354/152, 173.1, 173.11

[56] References Cited
U.S. PATENT DOCUMENTS
4,538,893  9/1985  Nakano et al. .................. 354/152 X Primary Examiner—Michael L. Gellner
Attorney, Agent, or Firm—Fitzpatrick, Cella, Harper & Scinto

[57] ABSTRACT

A motor driven camera includes a mirror drive mechanism of swinging a movable mirror between a finder viewing position and an exposure retracted position, a shutter charge mechanism for performing charge driving and charge releasing of a shutter, a first film drive mechanism for driving film in a direction reverse to the feeding direction for each shot, a first motor serving as a drive source for driving the mirror drive mechanism, the shutter charge mechanism and the first film drive mechanism, and a clutch mechanism having output transmission systems being changed over in response to a change of the direction of rotation of an output of the first motor, one of the output transmission systems being connected to the mirror drive mechanism and the shutter charge mechanism, and another of the output transmission systems being connected to the first film drive mechanism.

9 Claims, 27 Drawing Sheets

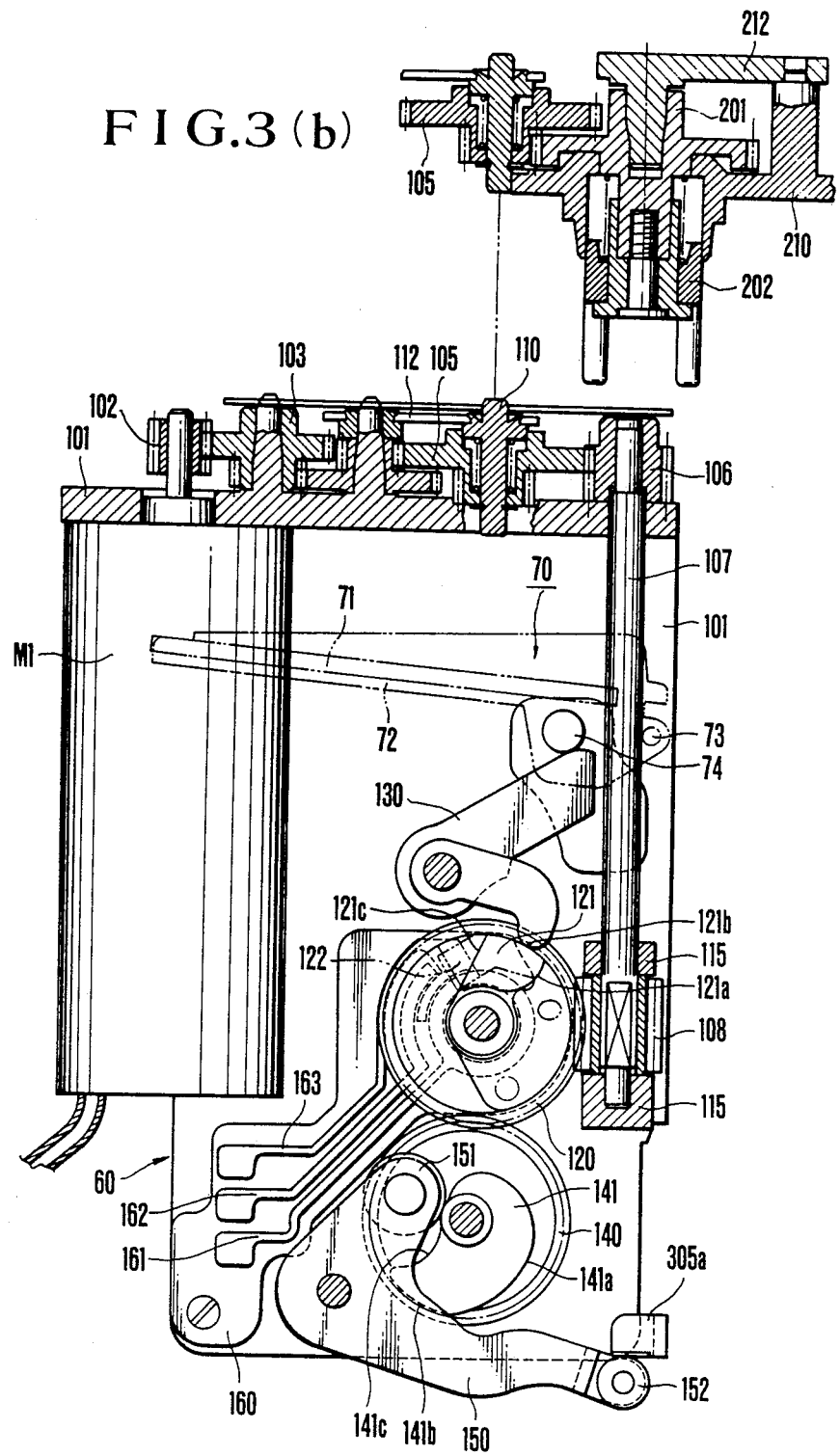

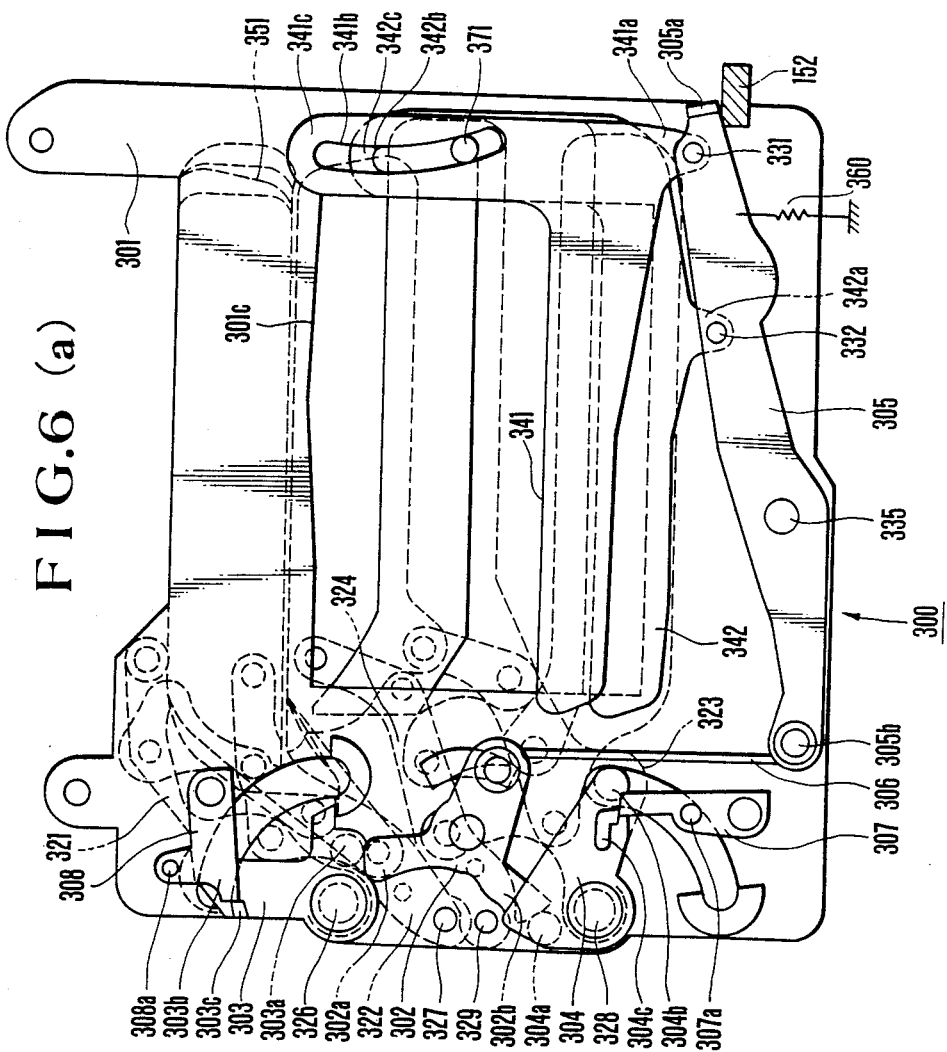

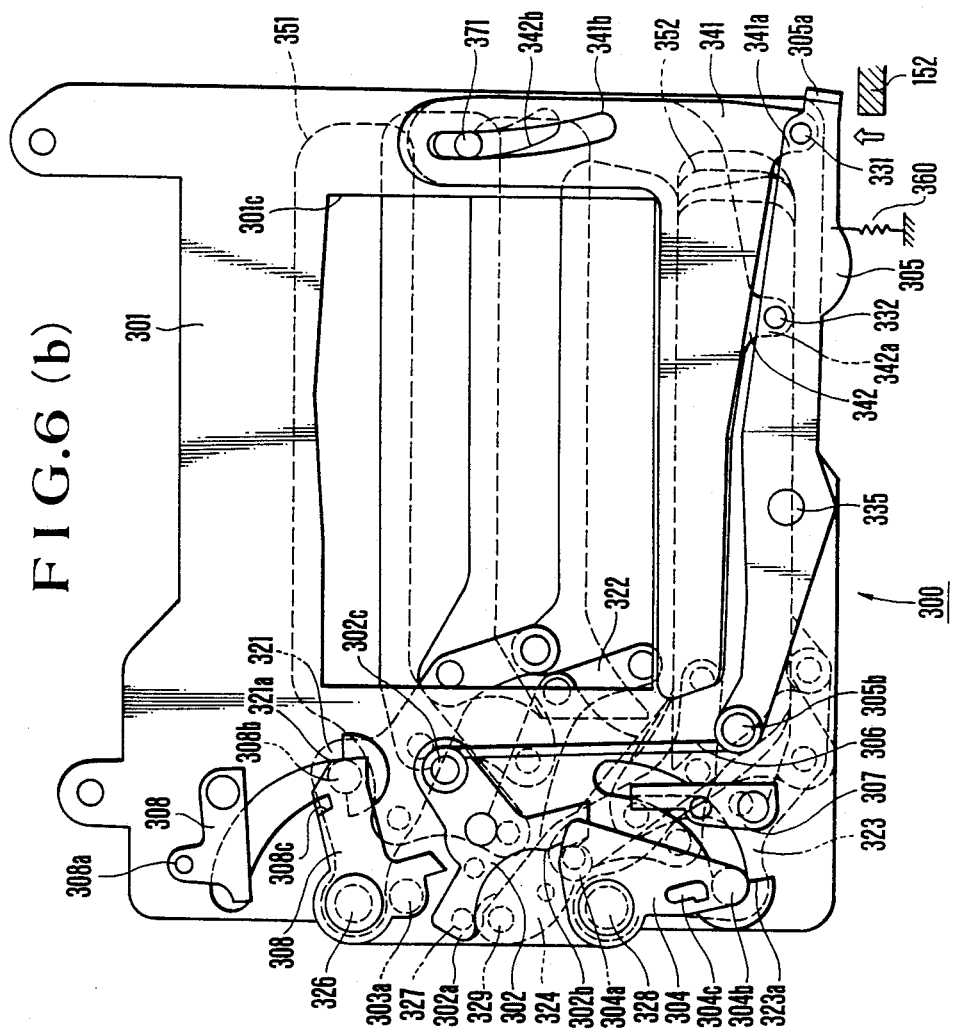

AL SUBROUTINE

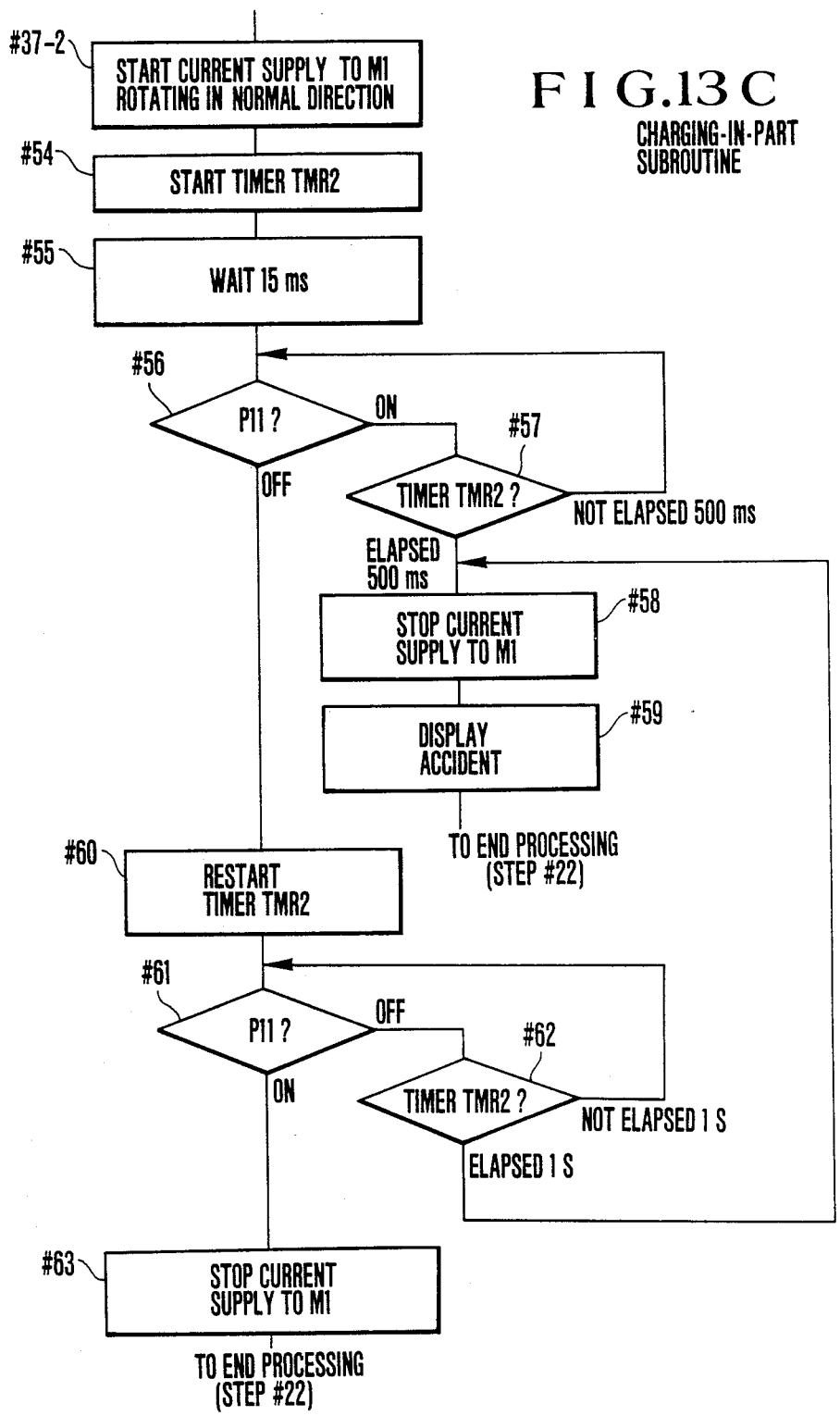

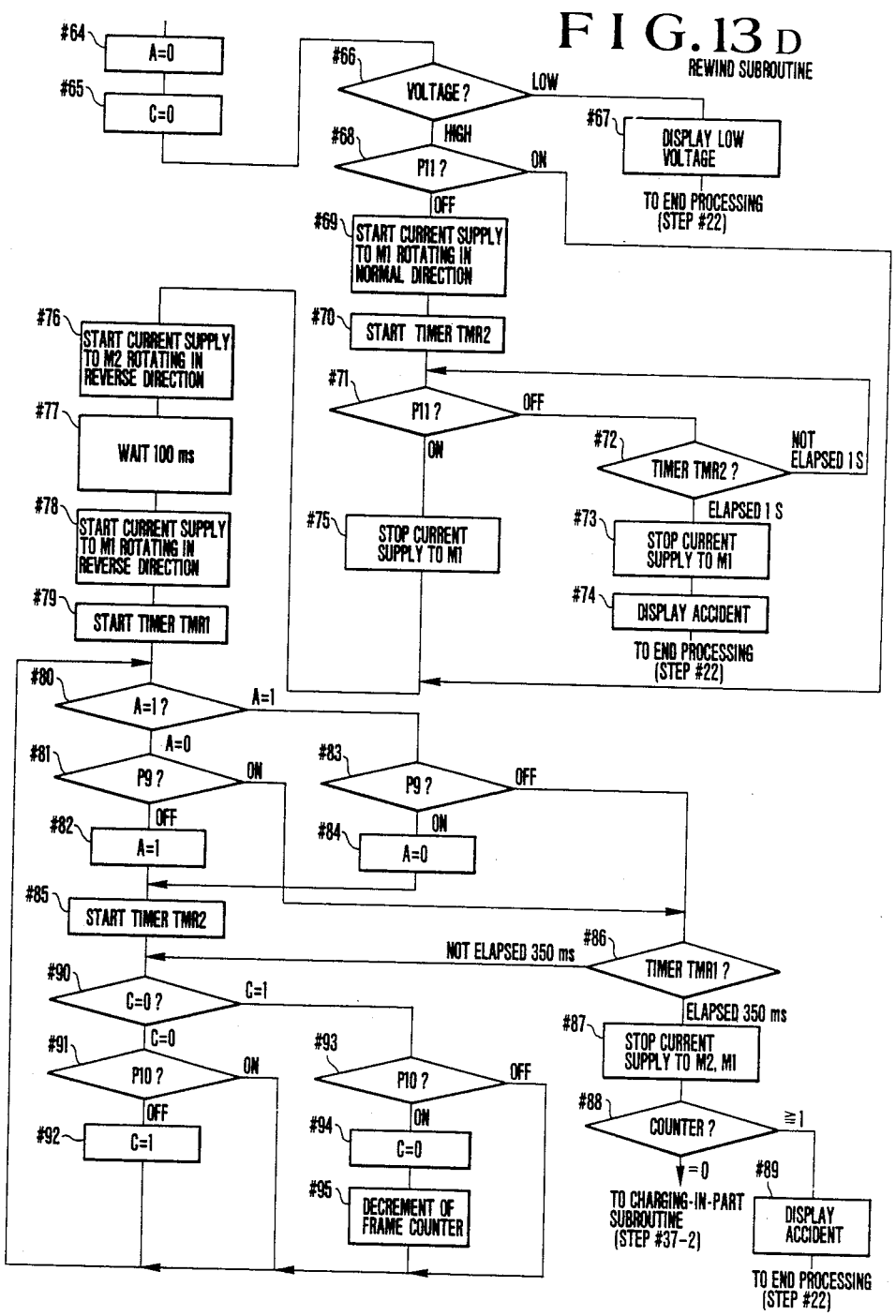
FIG.13D REWIND SUBROUTINE

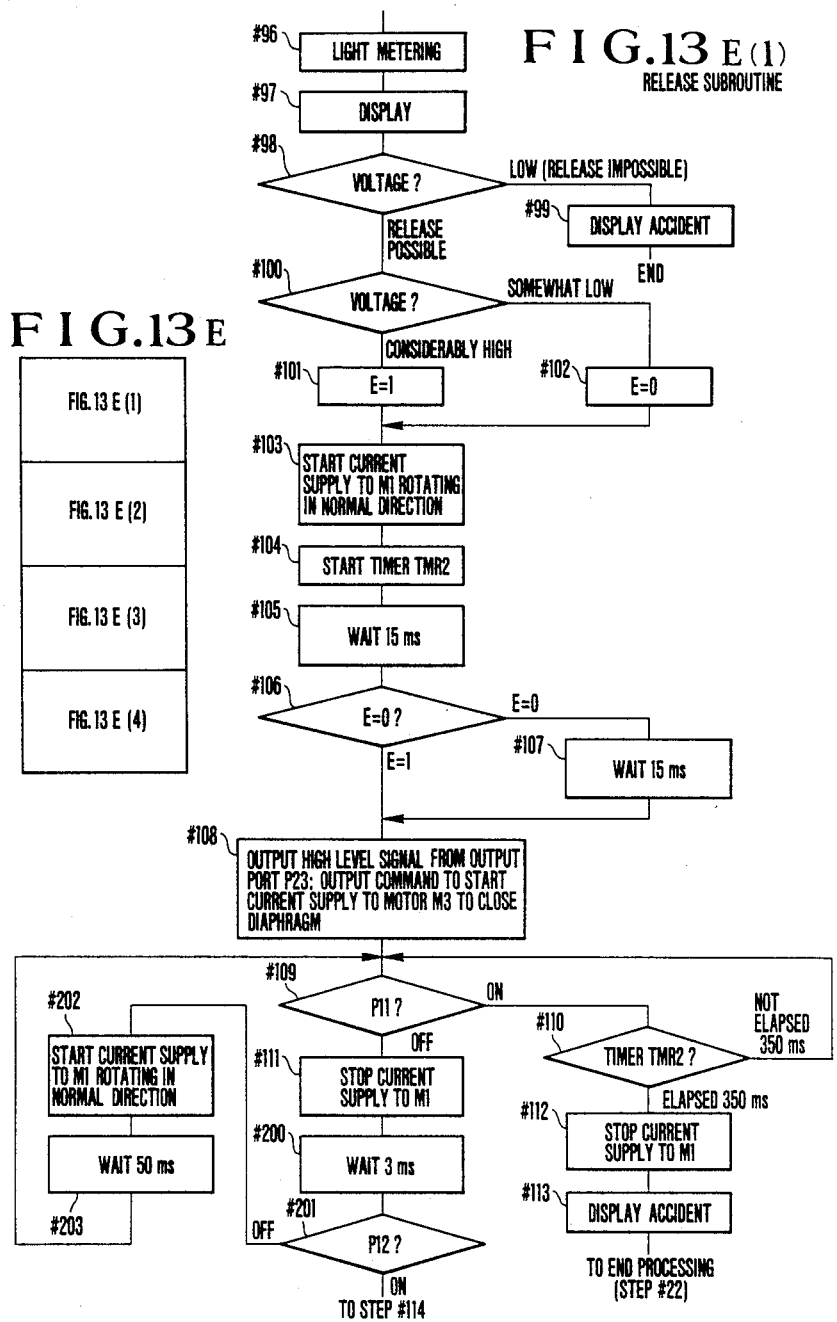

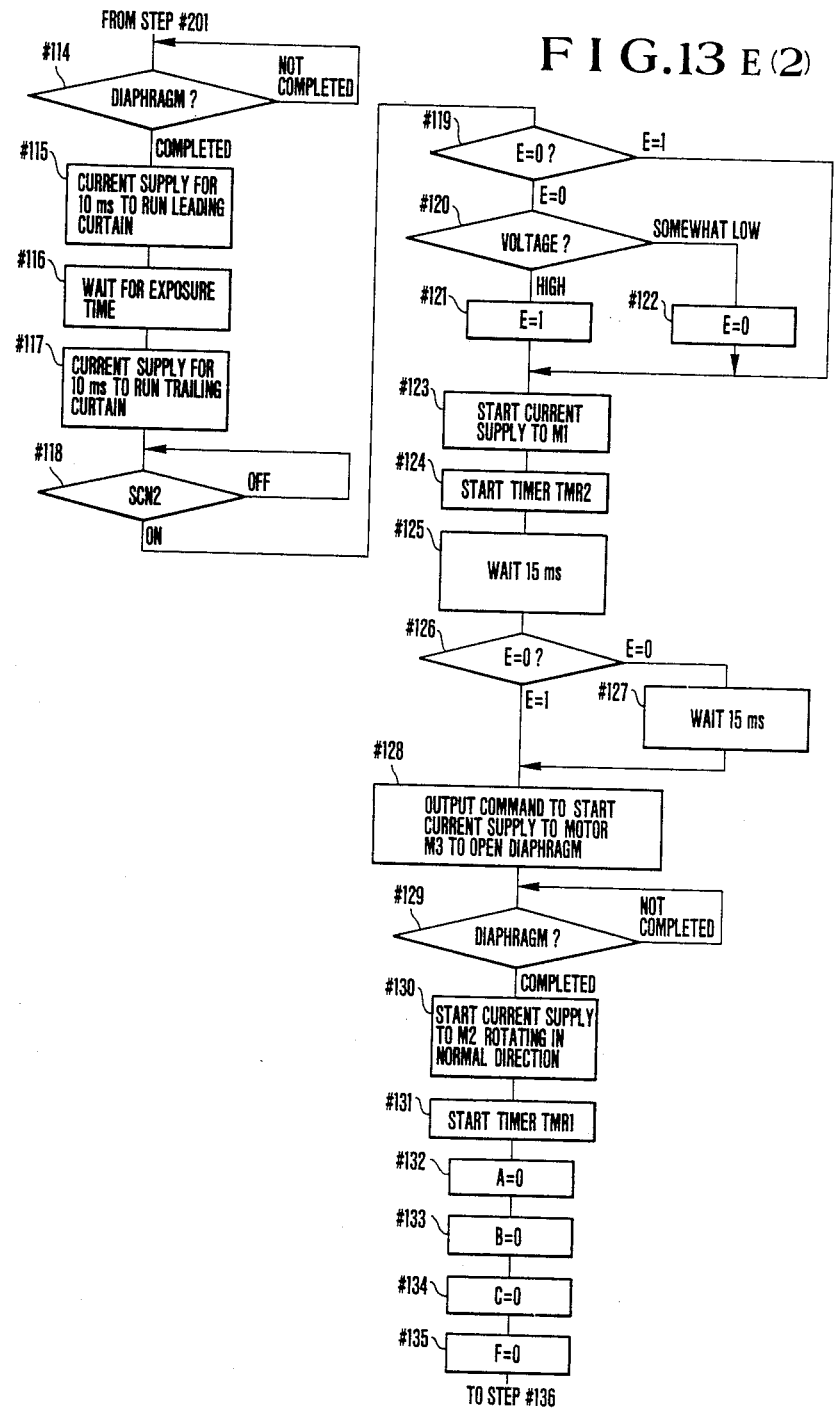
FIG.13 E(2)

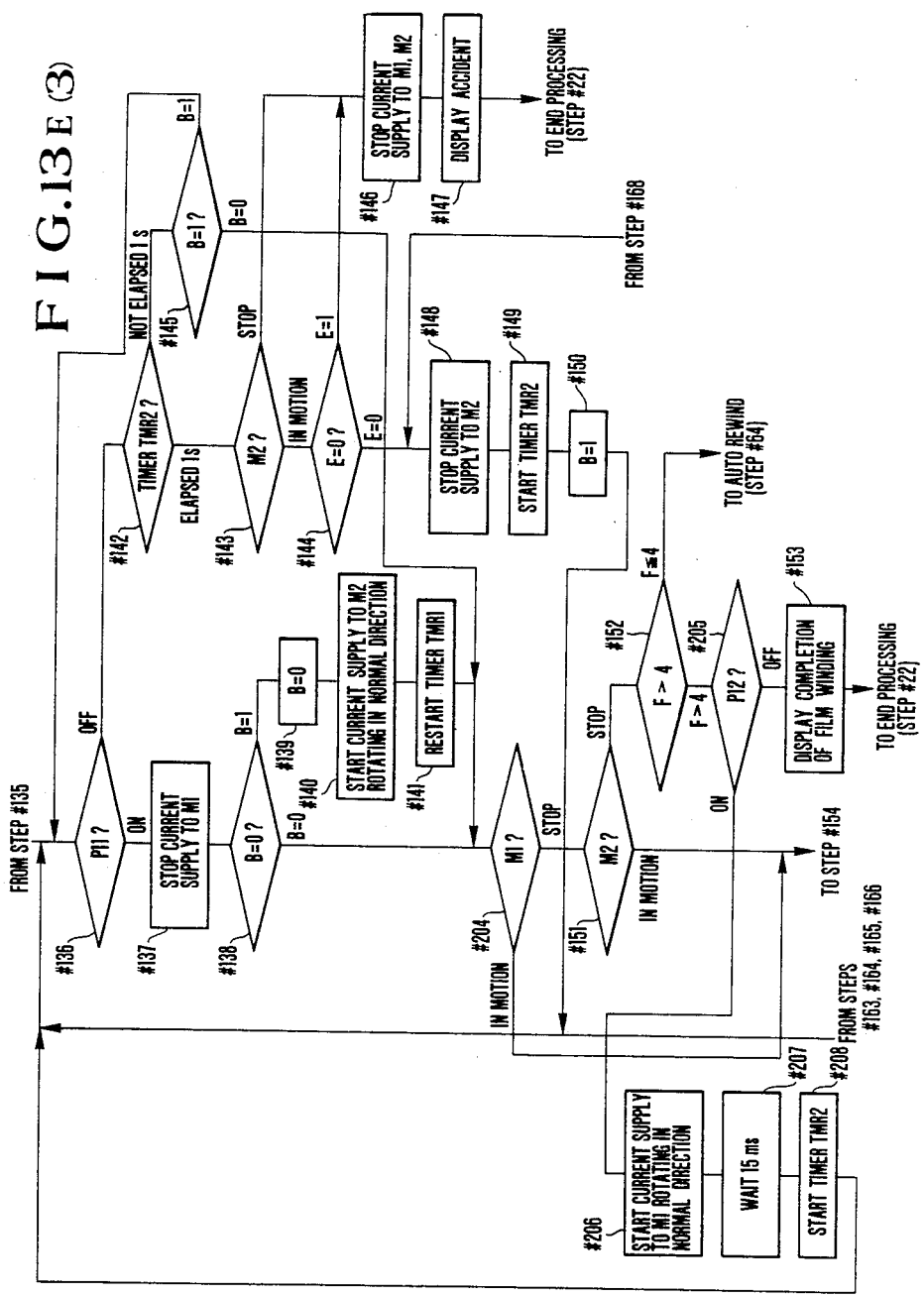

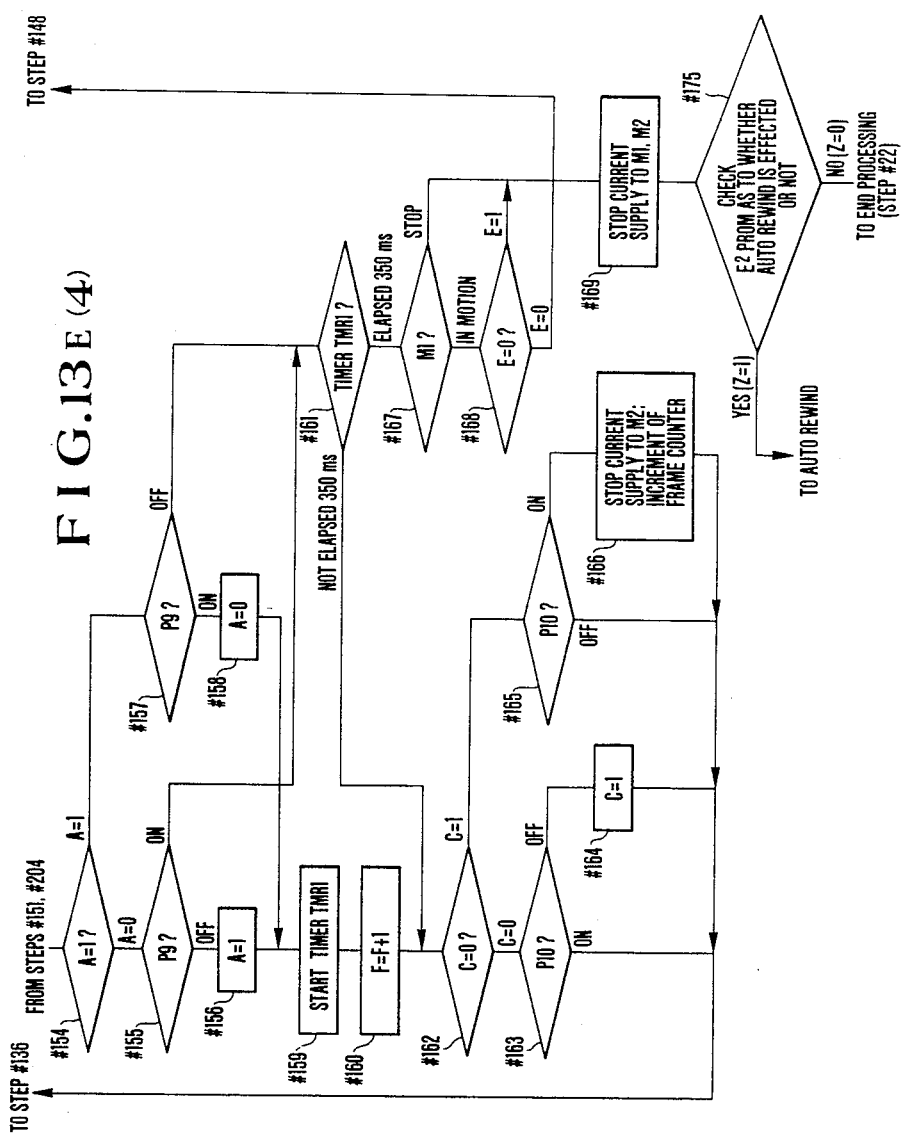
FIG.13E (4)

LENS MI-COM MC3 SUBROUTINE

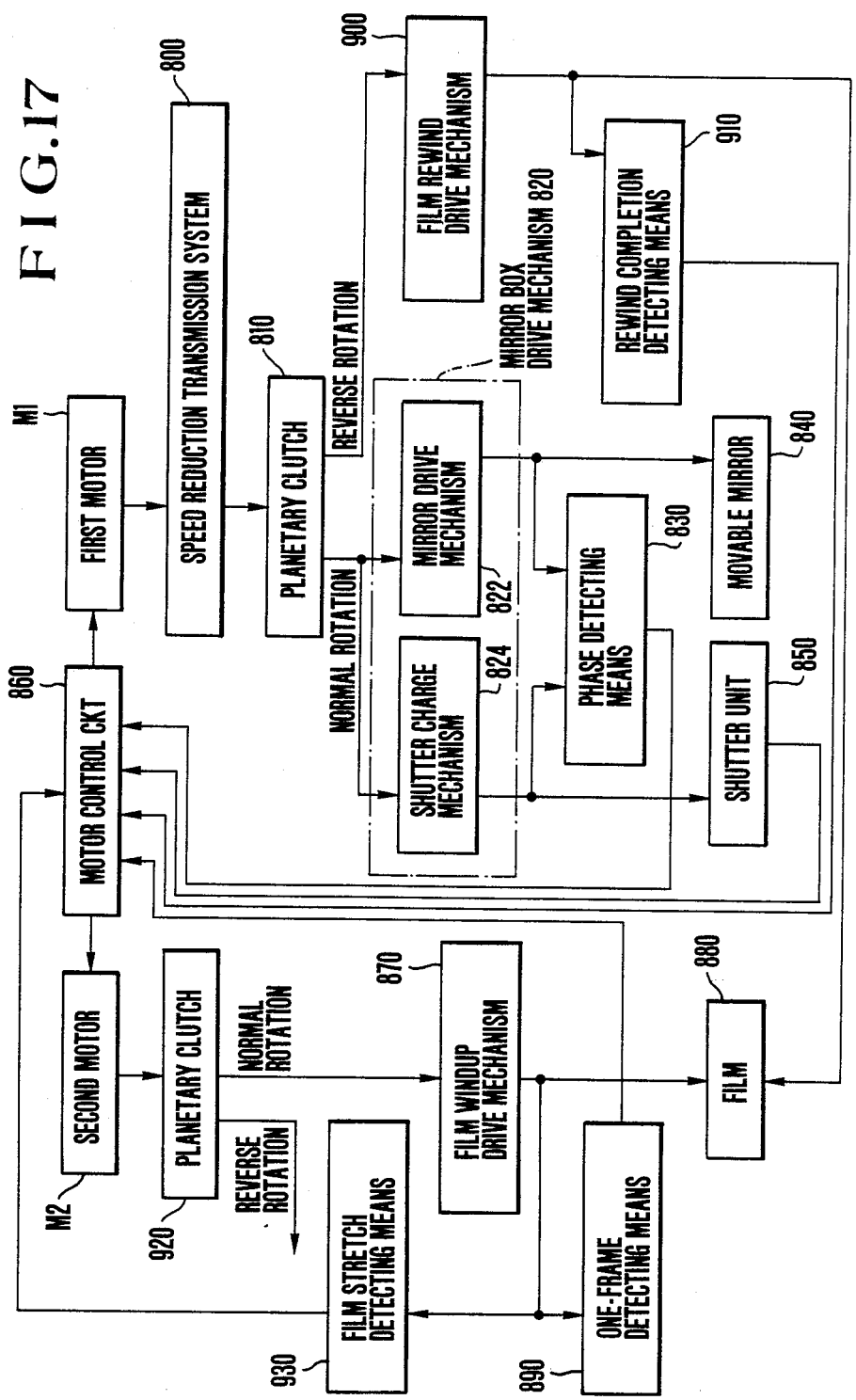

MOTOR DRIVEN CAMERA

BACKGROUND OF THE INVENTION

1. Field of the Invention

This invention relates to a motor driven camera whose various operations are performed by motors as the drive sources.

2. Description of the Related Art

In the past, springs were used for driving the swinging motion of the movable mirror incorporated in the camera, constituting a quick-return mechanism together with other means. Of these, the electromagnet when actuated releases the mirror from the mechanical latch to effect swinging from the finder-viewing position to the exposure-retracted position by the force of the charged drive spring which overcomes the force of the return spring urging the mirror to move backward from the exposure-retracted position to the finder-viewing position. And, to charge the drive spring, the driving power of an electric motor for moving the windup transmission system was used in common. In the camera of this kind, therefore, as the motor alone was not sufficient, the expensive electromagnet structure had to be used for the purpose of actuating the movable mirror. Further, the load on the windup motor was increased. Hence there were problems that the cost was high and the speed of charging movement (including the winding up) was slow.

As a conventional example of the improved one, direct drive connection of the motor to the movable mirror was proposed (by Minolta Co. in its single-lens reflex camera named "Minolta 7000") with an advantage that the expensive electromagnet or actuator for the movable mirror could be removed. However, this proposal made use of an alternative mechanism in the form of a planetary clutch responsive to normal rotation of the windup motor for causing the movable mirror to flip upward to the exposure retracted position, and responsive to reversed rotation of that motor for driving the windup transmission system and the charge mechanism for the shutter. The use of such a switching mechanism produced problems that the minimum interval time between the successive two shots was increased, and, the life-time of the motor was shortened due to the overwork of the motor. In turn, therefore, many new problems arose that much desired increase of the framing rate for continuous shooting could not be achieved in any way, and that, to hold the movable mirror in the exposure retracted position, an additional mechanism of complicated structure was necessitated. Another feature of this improved proposal is that the rewinding is operated by using the common motor of the above-described windup, mirror drive and shutter charge mechanism. In actual practice, a rewind control button was manually sliden to operate another clutch of the thrust type, thereby the output shaft of the motor was brought into meshing engagement with the rewind transmission system. This feature was associated with a problem on manageability that, because the force necessary to move the thrust clutch was very strong, automatic transition from the windup to the rewind mode (or auto-rewind) was impossible to perform.

Attempts have been made to increase the framing rate by using three motors, of which the first is to charge both the drive spring for the mirror and the shutter, the second is to wind up film, and the third is to rewind the film, as disclosed in U.S. Pat. No. 4,616,913 corresponding to Japanese Laid-Open patent application No. Sho 61-183628 (and many others). In this patent, however, because of its using the conventional electromagnet structure for actuating the movable mirror, the problem of the high cost is not solved. Yet, this patent admits for a very high efficiency of transmission, since each mode is operated by the respective individual motor. If the damages resulting from the increase of the number of used motors of the cost and the space efficiency are limited to an acceptable minimum, it can be said that such a prior art is nearly ideal. In reality, on the other hand, for cameras to be developed year by year, the requirement of increasing the number of capabilities, heightening the grade of performance and advancing automation and the requirement of minimizing the bulk and size and lowering the production cost are becoming more desirable to fulfill at a time, although they are contradictory to each other in principle. After all, minimization of the size of the camera and reduction of the cost are becoming a problem that cannot be averted.

Also, in the camera having the motorized windup and rewind modes, when changing over from the windup to the rewind mode, the control mechanism therefor must operate in such a manner that, in the general case, the windup motor is taken out of drive connection with the windup side gear, and the takeup spool and the drive sprocket are freed, while simultaneously bringing the rewind motor into drive connection with the rewind fork which has so far been free.

This control mechanism may be actuated either manually from the outside of the camera by means of the slide knob or the rewind control button as in the cameras of, for example, U.S. Pat. Nos. 4,693,578 and 4,611,896, or automatically by means of the plunger or planetary gear mechanism as in the cameras of, for example, U.S. Pat. Nos. 4,548,304 and 4,752,793.

The camera which is made necessary to actuate from the outside of its housing has a buzzer or an external display informing the user of when the last one of the prescribed number of film frames is shot, for he switches the camera to the rewind mode. Looking at this alarm display, the user will manipulate the knob or the like to operate the clutch or mode changeover mechanism. Thereupon, the camera starts to energize the rewind motor. Thus, the rewinding operation is started.

Differing from this, the camera which does not necessitate the manipulation of the external member or capable of automatically switching to the rewind mode has its plunger or planetary gear made to perform disengagement followed by engagement automatically, when the film is stretched as the number of fed film frame has reached the prescribed value. Thus, the rewinding operation is automatically started.

In comparison of the above-described two conventional examples, the latter camera that does not necessitate the awareness of the user to render operative the automatic rewind mechanism is more convenient. But it has such a drawback as follows. Since the completion of exposure of all the prescribed number of film frames is immediately followed by the automatic transit to the rewind mode, because the rewinding noise travels over a long distance in a quiet place, if, as the photographer is taking continuous shooting, it happens in, for example, a theater, he will be ashamed of annoying the audience around him. Also, in wild animal photography, as the rewinding noise frightens a bird or animal away, the photographer will fail to hold the chance of shooting it for the next film cartridge.

In the case of the former camera, on the other hand, though the inconvenience of the user manipulating the rewind control member is left unremedied, there is a merit that the user can make a decision on whether to do the rewinding or to abandon it at the given time. Hence, the above-described problem can be avoided.

Also, a camera having the automatic rewind mechanism is disclosed in U.S. Pat. No. 4,616,913. The winding up and rewinding of the film are operated by respective individual motors so that the only way for achieving automatic switching from the windup to the rewind mode is to control current supply to these motors. Moreover, the use of this type in the design of a motor driven camera provides a possibility of remarkably improving the efficiency of transmission of every drive connection.

However, in the camera disclosed in the above-cited patent, even after the camera has been switched to the rewind mode, the windup motor is left engaged with the windup transmission system. The load on the rewind motor is very heavy.

In connection with the above-cited U.S. Pat. No. 4,616,913, it should be pointed out that an embodiment is disclosed where use is made of a planetary clutch positioned in between the rewind motor and the rewind transmission system, and arranged to be cut out when the rewinding of the film is completed. For this purpose, the rotation of the rewind motor is reversed in response to detection of that completion, and then stopped after some reverse rotation.

SUMMARY OF THE INVENTION

One aspect of the invention is to use two electric motors for performing of all operations of driving the mirror, of charging the shutter and of winding and rewinding film, and, in particular, to make it an object to provide a motor driven camera in which the division of the operations with a very good efficiency to achieve an improvement of the framing rate and a reduction of the production cost is realized by the two motors.

Another aspect of the invention is to make it an object to provide a motor driven camera in which both of capabilities of automatically switching the camera from the windup to the rewind mode, and of prohibiting the automatic transition to the rewind mode from taking place can simply obtained without involving an unduly large increase of the production cost.

A further aspect of the invention is to make it an object to provide a motor driven camera in which on the premise that automatic transition to the rewind mode is relied only on the current supply control to the motors and an improvement of the efficiency of transmission of every one of the transmission systems is achieved, the rewind load is reduced to shorten the time necessary to fully rewind the film.

BRIEF DESCRIPTION OF THE DRAWINGS

FIGS. 3(a) and 3(b) are partly sectional, partly elevational views of the mirror and film rewing drive mechanisms of FIG. 2 in different operative positions.

FIGS. 6(a) and 6(b) are top views of the main parts of the shutter unit in different operative positions.

FIG. 17 is a block diagram taken to explain that operational feature which corresponds to a further aspect of the invention.

DETAILED DESCRIPTION OF THE PREFERRED EMBODIMENT

The present invention is described in connection with an embodiment thereof applied to a single lens reflex camera by reference to the drawings.

Figure 1:
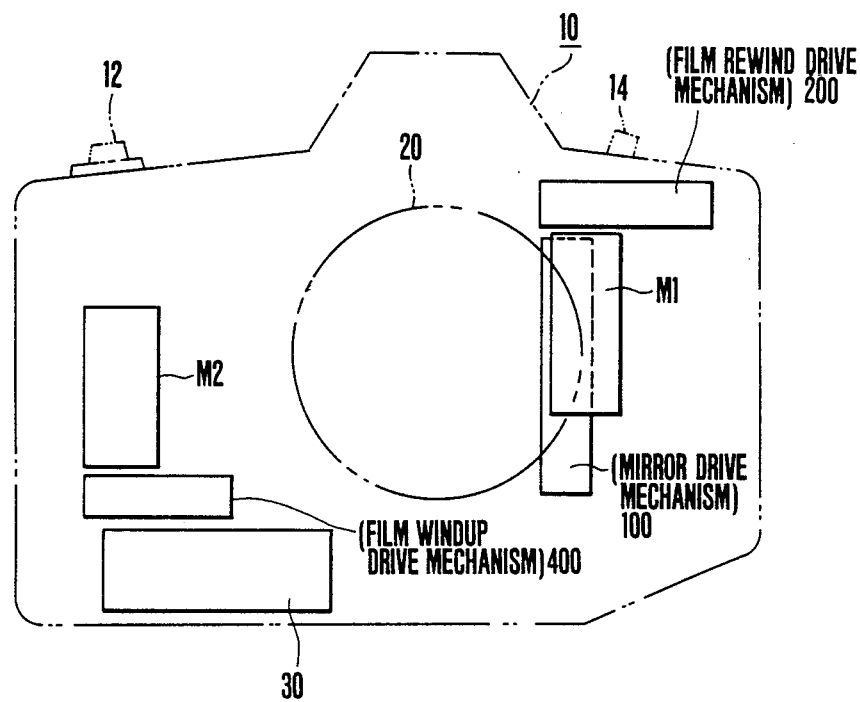
FIG. 1 is a schematic front view of an arrangement of the subassemblies of an embodiment of a motor driven camera according to the invention.

In FIG. 1, the single lens reflex camera has a photographic lens 20 releasably attached to the body 10 thereof. A shutter button is schematically shown by 12 and a rewind release button by 14. A chamber for batteries 30 lies just above the bottom panel of the body 10 with its lid movably fitted therein to replace the exhausted batteries by fresh ones easily. A first electric motor M1 selectively drives both a mirror drive mechanism 100 and a film rewind drive mechanism 200. A second electric motor M2 drives a film windup drive mechanism 400.

Figure 2:
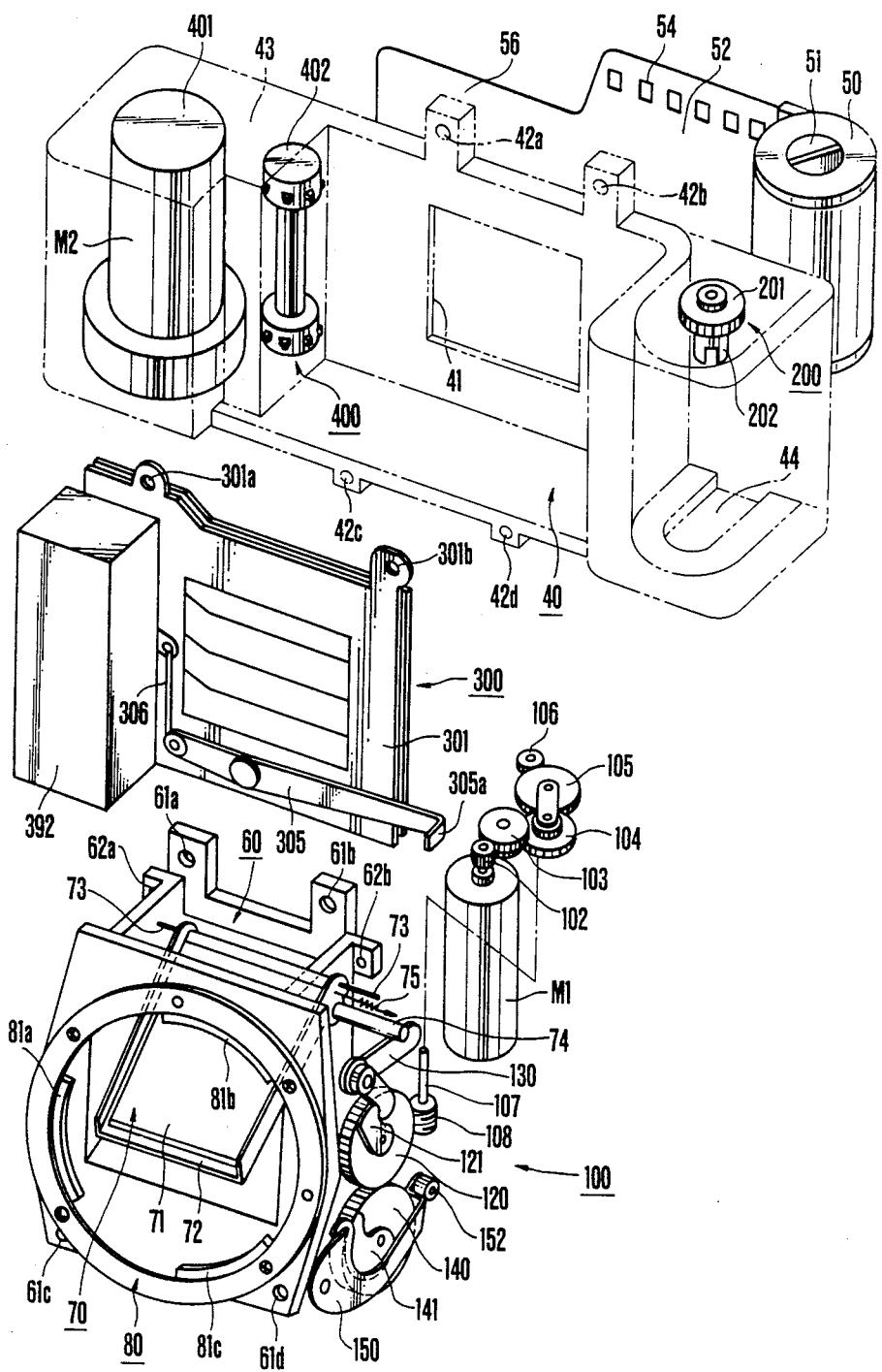
FIG. 2 is an exploded perspective view of the main mechanisms of the subassemblies of FIG. 1.

In FIG. 2, a framework 40 though schematically shown is generally made of plastic by molding techniques. Yet, where the required precision accuracy and strength are especially high and strong, such as a film gate 41, are formed by inserting metallic elements into the plastic mold. A mirror box 60 is fixedly secured to the framework 40 by four fasteners (not shown) in respective fitted holes 61a–61d and 42a–42d. On either side of the mirror box 60 there are chambers 43 and 44 for a takeup spool 401 and a film cartridge 50 respectively. The cartridge 50 contains a roll film 52 on a supply spool 51. The film 52 has perforations 54 and its leader 56 in as-sold state is out of the casing of the cartridge 50. A reflex mirror 71 is pivotally supported to selectively take a finder-viewing position (shown in FIG. 2 and FIG. 3(a)) where light coming from an object to be photographed and entering through the photographic lens 20 is reflected to a finder optical system (not shown) and a non-viewing position (shown in FIG. 3(b)) where the light goes to the film 52. A lens mount 80 is fixedly secured to the mirror box 60 by screw fasteners and has beyonet pawls 81a–81c for coupling with those on the ferrule of the lens mounting.

A mirror drive mechanism 100 is all mounted on the mirror box 60. A film rewind drive mechanism 200 is mounted partly on the framework 40 partly on the mirror box 60. A first electrical motor M1 is fixedly mounted on the mirror box 60 and is drivingly connected to both of the aforesaid mechanisms 100 and 200. A shutter unit is generally indicated at 300. Its base plate 301 is fixedly secured to the mirror box 60 by two fasteners in fitted holes 301a–301b and 62a–62b. A film windup drive mechanism 400 though fragmentarily shown in FIG. 2 is all in unified form, and installed in and around the spool chamber 43.

The mirror drive mechanism 100 is next described in details by reference to FIGS. 2 to 5. A base plate 101 is fixedly mounted on the right hand side wall of the mirror box 60 as viewed in FIG. 2. All the gears of the mechanism 100 are rotatably supported on the base plate 101. A pinion 102 on the output shaft of the first motor M1 meshes with a speed reduction gear assembly 103 which in turn meshes with a sun gear 104. The sun gear 104 is rotatable about a common axis 114 of a planetary lever 112 whose free end rotatably carries a planetary gear 105 in mesh the sun gear 104. A friction coil spring 111 intervenes between the planetary gear 105 and its shaft 110 so that when the sun gear 104 rotates in a counter-clockwise direction as viewed in FIG. 5(a), the planetary gear 105 revolves round the embossed shaft 114 counter-clockwise until it engages with a transfer gear 106. After that, as the driving torque overcomes the frictional force of the coil spring 111, the planetary gear 105 while slipping on it rotates about the shaft 110 in a clockwise direction. Thus, rotation of the first motor M1 is transmitted to the transfer gear 106.

When the direction of rotation of the sun gear 104 is reversed to the clockwise, the planetary gear 105 revolves clockwise first to disengage from the transfer gear 106 and then to engage a rewind gear 201, as shown in FIG. 5(b).

The transfer gear 106 when rotates in the counter-clockwise direction functions as an original drive gear of the mirror mechanism, being fixedly mounted on the top of a shaft 107, of which the bottom end fixedly carries a worm gear 108. This shaft 107 is restrained from movement in the thrust direction by a pair of bearings 115 on the base plate 101 at locations adjacent both ends of the thrust of the worm gear 108.

A clockwise driven gear 120 in mesh with the worm gear 108 has an in-and-out cam 121 formed on its front face as a unit and fixedly carries on its back face a slider 122 of electrically conductive material. This gear 120 is rotatably mounted on a boss 116 of the base plate 101.

A mirror control lever 130 has two arm elements 131 and 132 fixed to each other in the letter "V" shape and is pivotally mounted on a boss 117 of the base plate 101. The free end of the first arm 131 functions as a follower for the cam 121 so that the control lever 130 is turned in the counter-clockwise direction by the out-camming surface 121a, then maintained in the counter-clockwise-most position by the lobe 121b and then allowed to return either in or out of contact with the in-camming surface 121c. The mirror mechanism 70 comprises a mirror 71 fixedly secured to a bracket 72 pivotally mounted on a shaft 73. A rod 74 extends sidewardly of the bracket 72 into the path of movement of the second arm 132 so that the mirror 71 is movable between its viewing and non-viewing positions. A return spring 75 urges the bracket 72 in the counter-clockwise direction (downward) so that the cam 120 moves away from the control lever arm end 131, the mirror 71 is returned to its viewing position by the bias force of the spring 75.

A shutter charge gear 140 is rotatable about a boss 118 of the base plate 101 in mesh with the mirror drive gear 120 at a speed reduction ratio of 1:1 and has a cam 141 formed on the front surface thereof as a unit.

A cam follower or roller 151 is mounted on one arm end of an intermediate lever 150 of almost letter "L" shape mounted on a pivot boss 119, the other arm of which carries a round stud 152 at the end thereof bearing the bent-off portion of a seesaw lever 305. As the gear 140 rotates counter-clockwise, the in-camming surface 141a turns the lever 150 in the counter-clockwise direction, then the lobe 141b holds it in the counter-clockwise-most position, and then the out-camming surface 141c turns it in the clockwise direction. During the cycle of such operation of the shutter charge mechanism, the leading and trailing curtains in the shutter unit 300 are brought back to the initial positions, then mechanically latched and then magnetically latched, while being released from the locking connection with the mechanical latches. Thus, the shutter is ready to run down for the next exposure. The initiation of a running down operation of the shutter curtain is electromagnetically controlled.

Figure 3A:
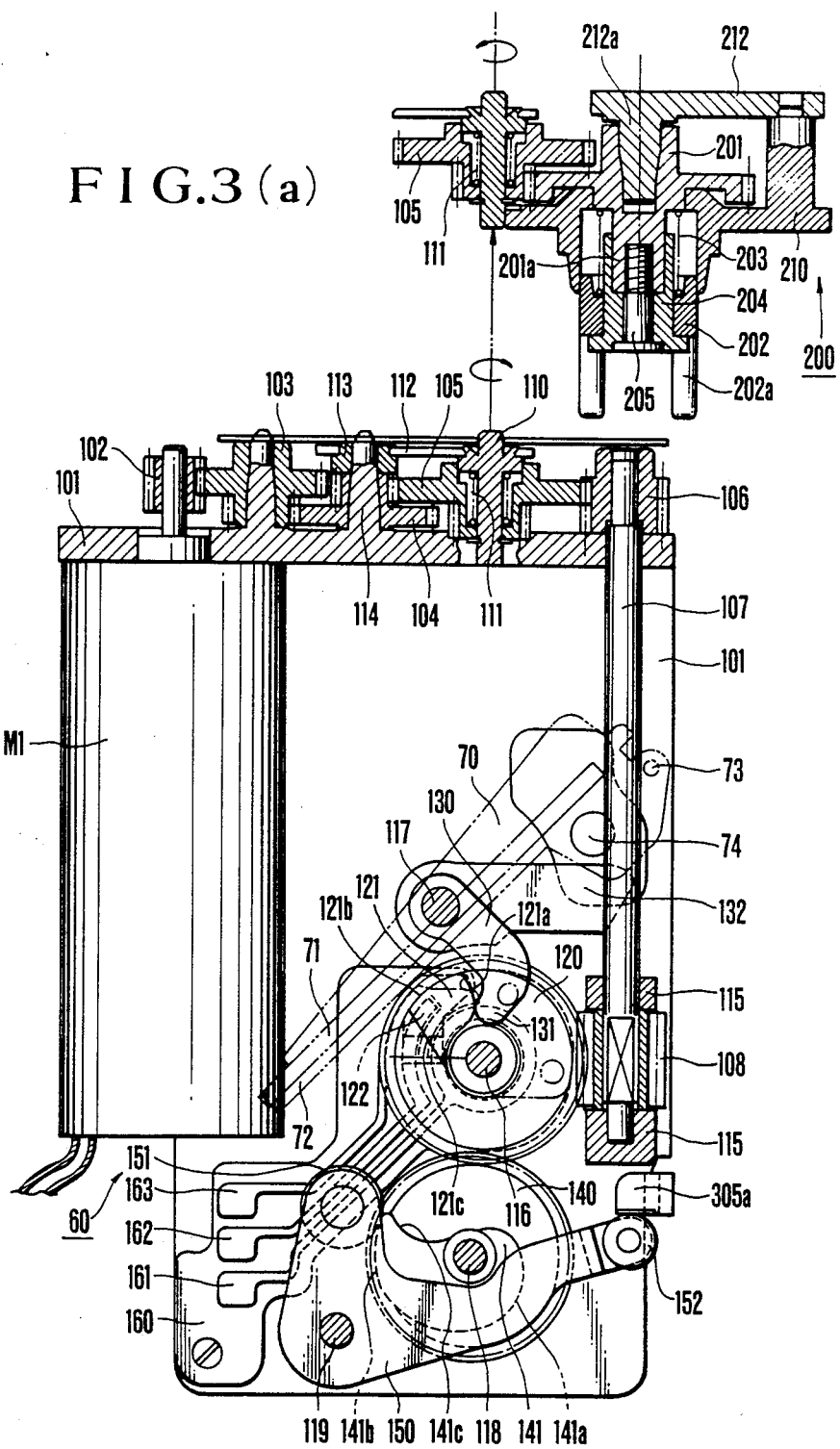

It is to be noted that as will readily be understood from the comparison of the operative positions of FIGS. 3(a) and 3(b), the phases of rotation of the cams 121 and 141 are so differentiated that as shown in FIG. 3(a), during the time when the shutter is charged, the mirror mechanism 70 remains stationary in its non-viewing position. At a time when the mirror 71 reaches the uppermost position, the locking of the leading and trailing curtains in the start positions is switched from the mechanical to the magnetical latches.

A spatial encoder 160 on an insulator plate fixedly secured to the base plate 101 by screw fasteners has three electrically conductive circular tracks 161–163 of different length and location with respective leads terminating at lands 161a–163a. These conductive elements are formed by vacuum evaporation techniques. The encoder 160 constitutes a position detector together with the slider 122. This slider 122 is divided into a great number of comb tooth like parts 122a with an advantage of heightening the safety of contact of the slider with the tracks 161–163. Their tips are slightly curved upward so that their contact points are retreated inward to a line 122b.

Figure 4A:
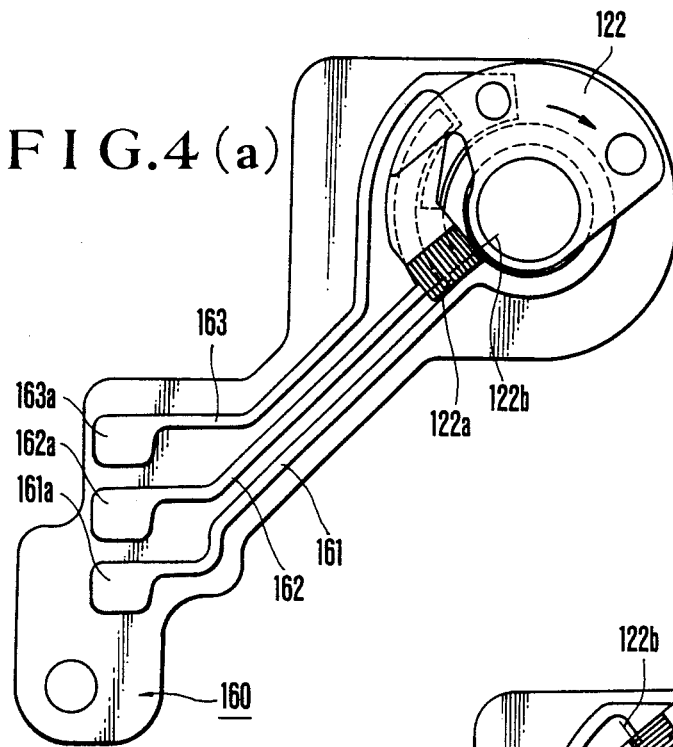
FIGS. 4(a) and 4(b) are top views of the phase detector of FIGS. 3(a) and 3(b) in the corresponding operative positions.
Figure 11:
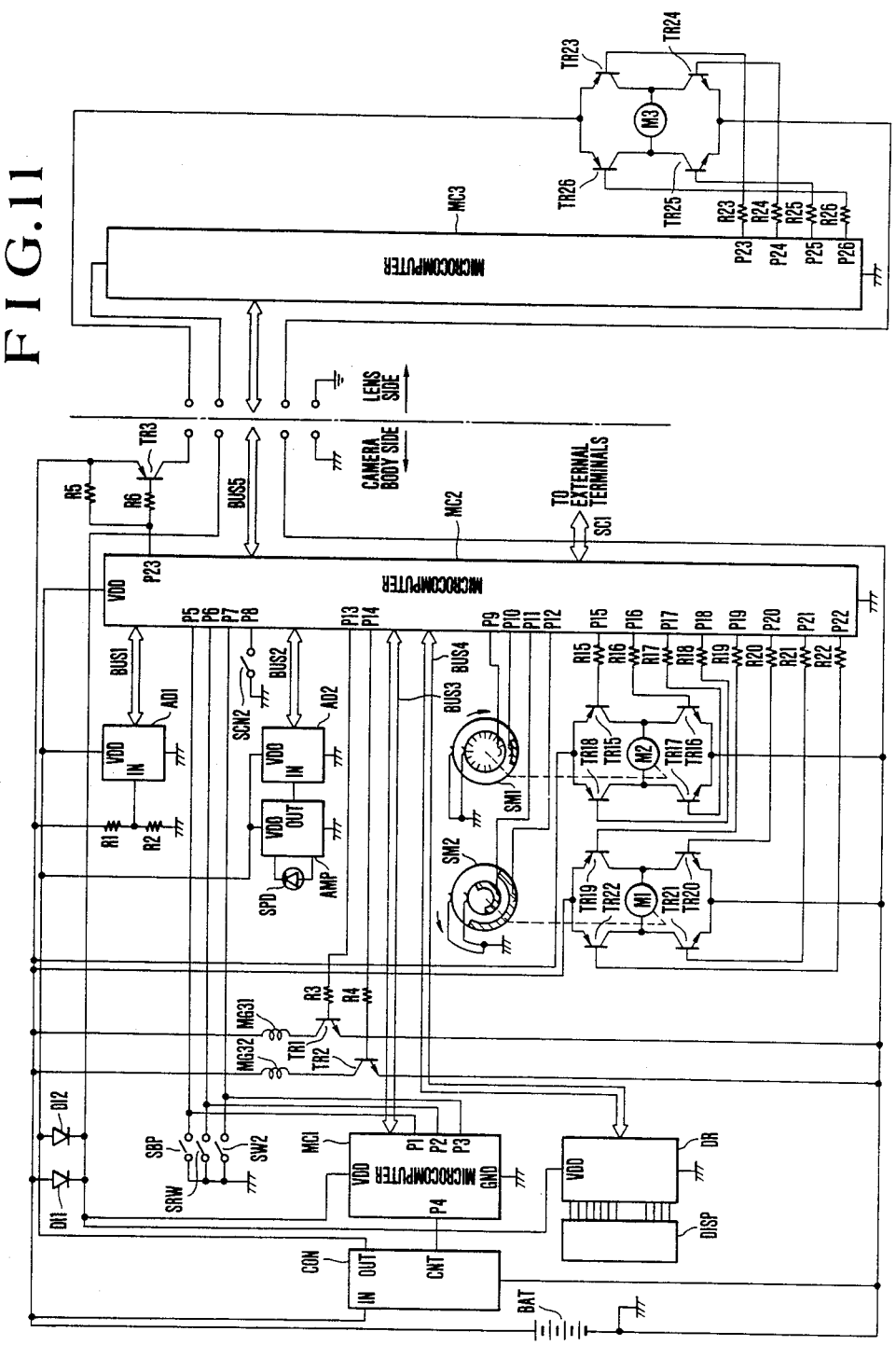
FIG. 11 is a diagram of an electrical circuit for controlling the operations of the various mechanisms.

FIG. 4(a) corresponding to FIG. 3(a) illustrates that phase of rotation which is detecting the termination of a shutter charging operation. As the slider 122 rotates in the clockwise direction indicated by arrow in response to lockwise movement of the mirror drive gear 120, when the contact line 122b of the slider 122 starts to ride on the conductive pattern in the second track 162, the latter is electrically connected to the first track 161 which is always grounded so that the potential at the land 162a changes to ground level. Hence, the position detector produces a signal representing the termination of a shutter charging operation. In more detail, the first land 161a is supplied with a signal of ground level from a camera control circuit to be described more fully later. Meanwhile, the output from the second land 162a is applied to that circuit at an input port P11 (FIG. 11). On assumption that the slider 122 lies ahead the position of FIG. 4(a) (which may otherwise be seen as turned in the counter-clockwise from the position of FIG. 4(a)), the only contact of the slider 122 is with the integral pattern of the first track 161, and the potential at the second land 162a is not as yet changed to ground level. Then, from this, the mirror drive gear 120 further rotates in the clockwise direction, and, at the same time, the slider 122 also rotates in the clockwise direction. Upon arriving at the position of FIG. 4(a), the slider 122 starts to contact with the pattern in the second track 162, changing the potential at the second land 162 to ground level. Responsive to detection of the fact that the charging of the shutter is complete, the camera control circuit stops the rotation of the first motor M1 by cutting off the current supply and braking action. Because of its inertia, the motor M1 cannot suddenly be stopped, overrunning some distance of which a prescribed maximum value is shown in FIG. 3(a). When this value is exceeded, the brush 122 starts to ride on the pattern in the middle or third track 163. Thus, the excessive overrunning is detected. Under the normal conditions, the mirror drive gear 120 can stop in the maximum allowable range of overrunning distances. In order to retain the shutter in the charged position despite such overrunning of the first motor M1, determination of the angular distance of the cam lobe 141b is made depending on the aforesaid range.

Figure 4B:
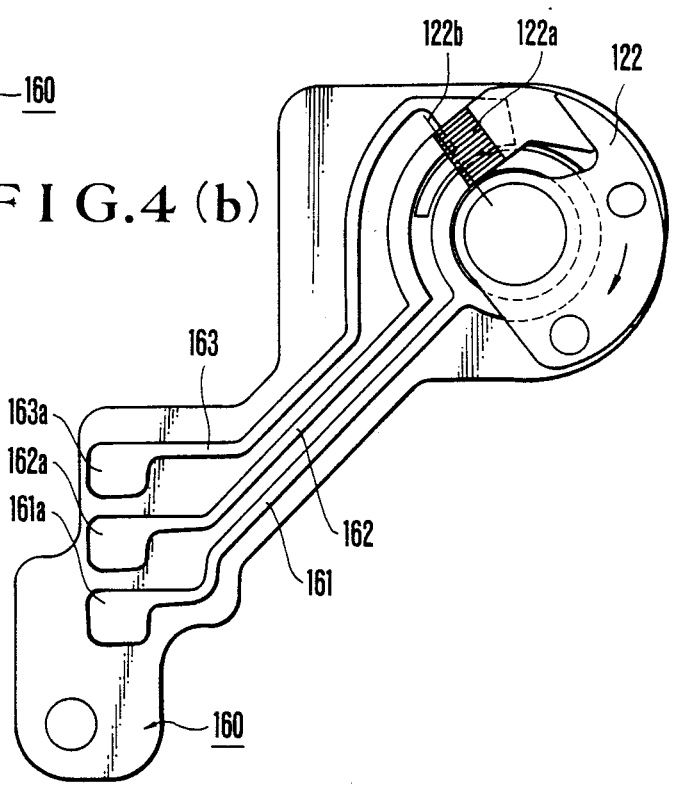

FIG. 4(b) corresponding to FIG. 3(b) illustrates that phase of rotation of the brush 122 which represents that the mirror 72 has just reached the uppermost position. This is detected as follows. As the mirror drive gear 120 rotates along with the brush 122 in the clockwise direction from the position of FIG. 4(a), when the brush 122 moves away from the terminal end of the pattern in the second track 162, or when the position of FIG. 4(b) is reached, the potential at the land 162a changes from the ground level to the initial level (usually H level). Thus, that the upping of the mirror is complete is detected. About even this detection a more detailed explanation should be made. When the brush 122 lies ahead the position of FIG. 4(b) (which may otherwise be seen as the brush 122 is turned backward or counter-clockwise from the position of FIG. 4(b)), the brush 122 contacts with both electrically conductive patterns of the first and second tracks 161 and 162. Therefore, the output of the land 162a supplies the signal of ground level to the camera control circuit. From here, the mirror drive gear 120 further rotates in the clockwise direction and at the same time the brush 122 also rotates in the clockwise direction, reaching the position of FIG. 4(b) where the brush 122 is out of contact with the pattern 162. The potential of the aforesaid pattern 162 changes from the ground level to the initial level. The aforesaid camera control circuit detects the mirror up completion state, and controls the stoppage of the rotation driving of the aforesaid first motor M1. For note, the reason why the position of the brush 122 of FIG. 4(b) is different from that of the brush 122 of FIG. 3(b) is that though the stoppage control (braking) of the first motor M1 is made in the position of FIG. 4(b), the first motor M1 cannot suddenly stop, overrunning some distance. FIG. 3(b) illustrates the stopped position of the first motor M1 after said overrunning has taken place. Yet, the stopped position of the mirror drive gear 120 (brush 122) is shown on assumption that the aforesaid overrun distance becomes the maximum by calculation for the purpose of better understanding of the explanation. In actual practice, the distance the mirror drive gear 120 overruns before it stops can often be somewhat shorter than the maximum. For note, as is obvious from FIG. 3(b), the mirror drive cam 121 is formed with the flat camming surface 121b for continuing the mirror up completion state by taking into account the aforesaid overrun of the first motor M1. This copes with that overrunning.

Here, we explains about how the mirror drive mechanism and the shutter charging mechanism are coordinated with each other on the whole. At first, what is important is that all the operations, namely, charging the shutter, mirror upping, removing the charging force from the shutter and allowing for mirror down, are performed in one and the same direction of rotation of the first motor M1. That is, the counter-clockwise direction of rotation of the first motor M1 (the pinion 102) first sets the planetary gear 105 in engagement with the transfer gear 106, as shown in FIG. 5(a). It is in this state that all the operations are then performed. And, the first motor M1 rotates the mirror drive gear 120 in the clockwise direction and the shutter charge gear 140 in the counter-clockwise direction. And, further, while the cam 121 on the mirror drive gear 120 takes a position to allow for the mirror downing (FIG. 3(a)), the cam 141 on the shutter charge gear 140 assumes a position to start charting of the shutter (FIG. 3(a)). Also, while the mirror drive cam 121 takes a position to start upping of the mirror (FIG. 3(b)), the shutter charge cam 141 assumes a position to terminate the charging operation (FIG. 3(b)). And, while the above-described procedure is going on, the energization and de-energization of the first motor M1 is recycled depending on the output of the position detector as follows: When the preceding cycle of charging of the shutter is complete (FIG. 3(a)), it stops for a time. After that, when the camera control circuit detects an actuation of camera release, it rotates again in the same direction. Then, when the upping of the mirror is complete (FIG. 3(b)), it stops for a time. After that, when the camera control circuit detects the closure of the shutter, it rotates again in the same direction. When the present cycle of charging of the shutter is complete, it stops for a time. Such a sequence is recycled for every one shot. For note, when the first motor M1 overruns a longer distance than the prescribed maximum from the position where either the termination of the shutter charging operation of FIG. 4(a) or the termination of upward movement of the mirror of FIG. 4(b) has been detected, the potential at the third land 163a changes from the ground level to the initial level. Thus, the position detector produces a signal representing that an excessive overrunning has taken place.

Next, the construction of the shutter unit 300 to be assembled with the mirror box 60 is described by reference to FIGS. 6(a) and 6(b).

For note, the shutter unit 300 used in the embodiment of the present invention has already been filed itself as Japanese Utility Model patent application No. Sho 61-39629.

FIG. 6(a) shows an operative position where the shutter is charged, and FIG. 6(b) another operative position where it is released.

In these figures, a shutter base plate 301 constituting the before-described support frame has its exposure aperture 301a.

A charge lever 302 in the shutter unit 300 is to charge trailing and leading blade drive levers 303, 304 (hereinafter abbreviated to "drive" levers). These parts constitute shutter drive means. The above-described trailing drive lever 303 is to cause a trailing blade group 351 to run, and the above-described leading blade drive lever 304 is to cause a leading blade group 352 to run.

A seesaw lever 305 for charging up the shutter unit is pivotally mounted on a pin 335 secured to the shutter base plate 301. Its one end 305a is in engagement with the roller 152 of the shutter charge lever 150 of the shutter charge mechanism shown in FIG. 3. When it receives a rotative driving force of direction indicated by arrow, the other end 305b turns in a counter-clockwise direction of FIG. 6(b). Such movement is transmitted through a link lever 306 to turn the foot 302c of the above-described charge lever 302 in the clockwise direction, thereby the shutter is moved from the position of FIG. 6(b) to the position of FIG. 6(a), terminating the charging operation.

Leading and trailing latch levers 307 and 308 hold the leading and trailing drive levers 304 and 303 in their charged positions by the charge lever 302 until the camera control circuit to be described later produces a shutter release signal. A pair of arms 321 and 322 hold the trailing blade group 351 in parallel link and turn about respective pivot pins 326 and 327 to run down the trailing blade group 351. A pair of arms 323 and 324 hold the leading blade group in parallel link and turn about respective pivot pins 328 and 329 to run down the leading blade group 352.

And, it is in the embodiment of the present invention that, in addition to the above-described constituent elements, there is a light shielding device comprising a pair of blades 341 and 342 arranged to move from a retracted position of FIG. 6(b) upward to a light shielding position of FIG. 6(a) when the seesaw lever 305 turns to charge up.

In the light shielding device of this example, the two light shielding blades 341 and 342 are formed to letter "L" shape. Their vertical portions are in pin-and-slot connection with the shutter base plate 301 so that the upward or downward movement is guided. Their horizontal portions 341a and 342a are in drive connection with the seesaw lever 305 through pivot pins 331 and 332 so that the upward or downward movement is driven.

The above-described guide mechanism is constructed with a guide pin 371 secured to the shutter base plate 301 and engaging in fitted long slots 341b and 342b of almost vertical direction formed in the vertical portions 341c and 342c of the light shielding blades 341 and 342.

By the above construction, the light shielding blades 341 and 342 perform upward movement from FIG. 6(b) to FIG. 6(a) while preserving almost the same attitude as that shown in the figures by the guide mechanism when the seesaw lever 305 turns in the counter-clockwise direction as viewed in the figures, and perform downward movement from FIG. 6(a) to FIG. 6(b) when the seesaw lever 305 turns in the clockwise direction. Moreover, the connecting positions of the individual light shielding blades 341 and 342 with the pivot pins 331 and 332 of the seesaw lever 305 are made different from each other by a certain amount so that their strokes of upward or downward movement differ from each other with the result that in the retracted position they overlap each other to reduce the accommodation space, and in the light shielding position they are spread so wide as to cover a light shielding area of prescribed size. For note, a spring member 360 urges the seesaw lever 305 always in the clockwise direction (charge releasing direction).

Figure 7:
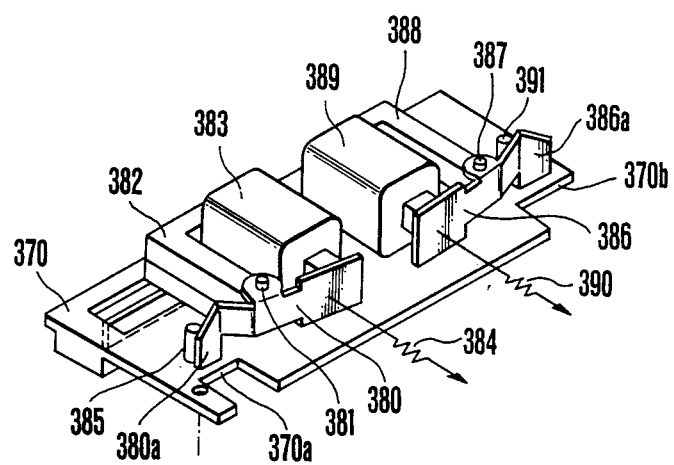
FIG. 7 is a perspective view of a mechanism for controlling the running operation of the shutter of FIGS. 6(a) and 6(b).

In FIG. 7 there is shown a latch release structure. This latch release structure itself uses the feature disclosed in a preceding Japanese Laid Open patent application Sho 57-17936 assigned to the present patent applicant.

In the figure, a base plate 370 of the latch release structure carries electromagnetically controlled members. For note, this base plate 370 is to be assembled with the shutter base plate 301 of FIG. 6. Armature levers 380 and 386 for the leading and trailing blades respectively are pivotally supposed at respective pins 381 and 387 on yokes 382 and 388 and are urged by springs 384 and 390 in clockwise and counter-clockwise directions respectively. The initial angular positions of the armature levers 380 and 386 are limited by respective stopper pins 385 and 391 planted on the base plate 370. One end portion 380a of the armature lever 380 turns a prescribed distance in the counter-clockwise direction from the initial angular position shown in FIG. 7 to strike a pin 307a of a leading latch lever 307, thereby the latching is released. Also, one end portion 386a of the armature lever 386 turns a prescribed distance in the clockwise direction from the initial angular position shown in FIG. 7 to strike a pin 308a of a trailing latch lever 308, thereby the latching is released. Solenoids 383 and 389 when energized turn respectively the armature levers 380 and 386 by attraction against the springs 384 and 394. For note, in the figure, a cutout 370a receives the pin 307a of the leading latch lever 307 when in the shutter charged position (FIG. 6(a)). For note, though not shown in FIG. 6 for the purpose of clarity, a weak spring urges the leading latch lever 307 to turn in the counter-clockwise direction until the above-described pin 307a abuts on the inner edge of the above-described cutout portion 370a. Also, in the figure, 370b is another cutout to receive the pin 308a of the trailing latch lever 308 when in the shutter charged position (FIG. 6(a)). For note, though not shown in FIG. 6 for the purpose of clarity, a weak spring urges the trailing latch lever 308 to turn in the clockwise direction until the above-described pin 308a abuts on the inner edge of the above-described cutout portion 370a. For note, in FIG. 2, the dust-proof casing 392 also serves as an electromagnetic shield cover.

The shutter unit described above operates in such a manner as follows: The camera is assumed to be in the position of FIG. 6(b) just after the shutter has been released.

Then, to ready the camera for making the next shot, a charging operation is immediately started.

This charging operation is performed by driving the shutter charge lever 150 shown in FIGS. 2 and 3 to turn in the counter-clockwise direction.

The roller 152 of the shutter charge lever 150 acts on the free end 305a of the seesaw lever 305 in the direction indicated by arrow shown in the figure, and the charge lever 302 reacts through a link rod 306 between a pin 305b on the other end of the seesaw lever 305 and the pin 302c on the charge lever 302 to turn in the clockwise direction as viewed in the figure.

As the charge lever 302 turns, its foot portions 302a and 302b abut on the rollers 303a and 304a of the drive levers 303 and 304 respectively, giving rotative movement to the drive levers 303 and 304.

When the drive levers 303 and 304 turn, rotative movement is given to each of the arms 321 and 323 through the respective pin 303b, 304b-and-hole 321a, 323a to run the trailing and leading blades, thereby the trailing blade group 351 and the leading blade group 352 linked to the respective arms are moved upward as viewed in the figures.

As the charging advances in such a manner, when the projected portions 303c and 304c of the drive levers 303 and 304 reaches positions where they becomes engageable with the latch levers 307 and 308, the charging of the shutter is complete and the actuation of the next camera release is waited for in the position of FIG. 6(a).

Here, in the process for charging the seesaw lever 305, the two light shielding blades 341 and 342 pivotally mounted about the pins 331 and 332 on the seesaw lever 305 are moved upward as viewed in the figures. During this time, because the long slots 341b and 342b of the light shielding blades 341 and 342 are engaging on the guide pin 371, their attitudes are regulated by the guide pin 371 to almost horizontal parallelism with each other and with the exposure aperture 301a. As they move upward, when the charging is complete, they take the position of FIG. 6(a) where the exposure aperture 301a is covered in a lower portion thereof.

The shutter waits in this charged position of FIG. 6(a) until the next camera release is actuated.

We next explain about the releasing operation.

When the release button 12 is pushed down, the mirror 71 is moved upward as has been described in connection with FIG. 3, and at the same time the shutter charge lever 150 is retracted from the position of FIG. 6(a) to the position of FIG. 6(b). Then, the seesaw lever 305 is turned in the clockwise direction by the spring 360, causing the charge lever 302 to turn in the counter-clockwise by the link rod 306 from the position of FIG. 6(a) to the position of FIG. 6(b).

Such movement of the seesaw lever 305 also causes the light shielding blades 341 and 342 pivotally mounted thereon at the pins 331 and 332, while holding their attitude almost horizontal as their guide long slots 341b and 342b are regulated by the guide pin 371, to move from the position of FIG. 6(a) to the position of FIG. 6(b) where they are retracted to the outside of the exposure aperture 301a of the shutter base plate 301.

When the above procedure ends, the camera control circuit detects that the upping of the mirror 71 is complete or that in the position of FIG. 4(b) the potential of the mirror up detecting pattern 162 has changed from the ground level to the initial level. By that camera control circuit, at first, the solenoid 383 of FIG. 7 is supplied with current and the the armature lever 380 is attracted to the confronting face of the yoke 382, turning in the counter-clockwise direction against the spring 384. And, by this attraction-driven rotation of the armature lever 380, its one end 380a pushes the pin 307a, thereby the leading latch lever 307 is turned in the clockwise direction to disengage from the projected portion 304c. Then, the leading drive lever 304 turns in the clockwise direction, thereby the arm 323 is turned in the same direction to run the leading blade group 352 (downward as viewed in the figures), initiating an exposure. After a prescribed shutter time has elapsed, the camera control circuit energizes the solenoid 389 of FIG. 7, thereby the armature lever 386 is attracted to the confronting face of the yoke 388, turning in the clockwise direction against the spring 390. By this attraction-driven rotation of the armature lever 386, its one end 386a pushes the pin 308a, causing the trailing latch lever 308 to turn in the clockwise direction to disengage from the projected portion 303c. The trailing drive lever 303 turns in the clockwise direction, thereby the arm 321 is turned in the same direction to move the trailing blade group 351 downward as viewed in the figure, thus terminating the exposure.

Besides the mirror drive mechanism 100 incorporated in the mirror box 60 and the shutter unit 300 which have so far been described, the first motor M1 is used for automatically rewinding the film.

Figure 5:
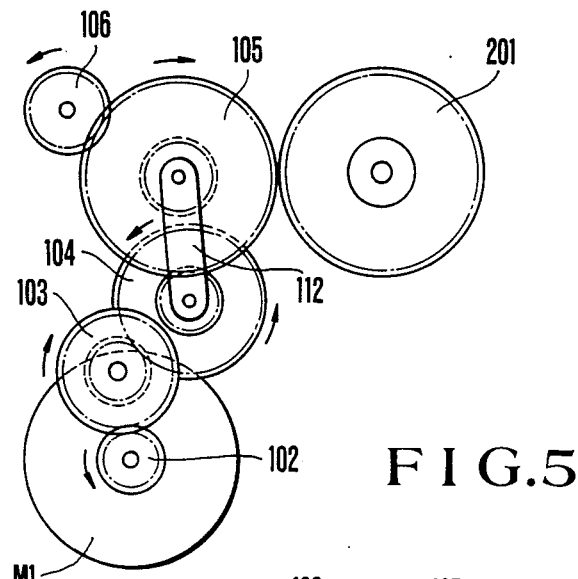
FIGS. 5(a) and 5(b) are top views of the transmission changeover mechanism of FIGS. 3(a) and 3(b) in the corresponding operative positions.
Figure 5:
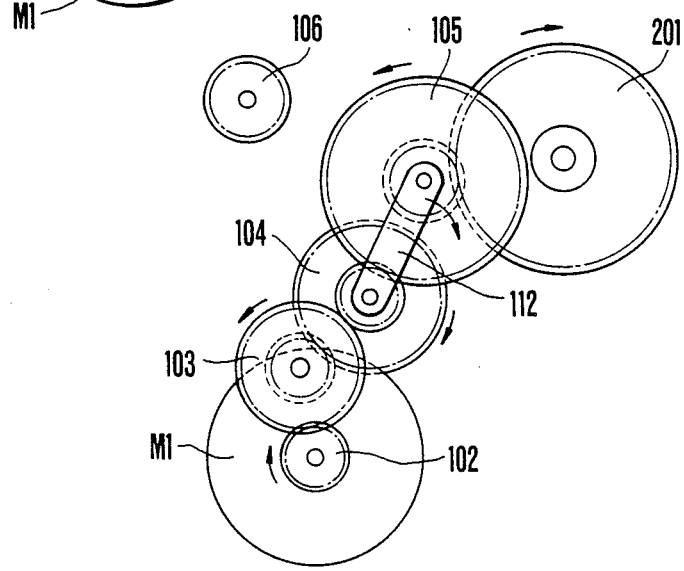

Referring to FIGS. 2, 3 and 5, a film rewind drive mechanism 200 includes a first base plate 210 used to unify the film rewind drive mechanism 200, and a rewind gear 201 rotatably supported in a hole of the first base plate 210 on a boss 212a of a second base plate 212. For note, the first base plate 210 is installed as the ceiling of the cartridge of FIG. 2 on the framework 40 of the camera. Under this condition, with the mirror box 60 assembled with the framework 40, the rewind gear 201 is engageable with the before-described planetary gear 105 when it revolves in the clockwise direction. A drive connection member 204 is fixedly secured to the lower portion 210a of the rewind gear 201 by a screw fastener 205. A rewind fork 202 is arranged to rotate along with the drive connection member 204, but to be able to move in the thrust direction independently of the latter. A coil spring 203 urges the rewind fork 202 normally downward When to insert the cartridge 50 into the chamber 44, the rewind fork 202 is retracted against the coil spring 203. The rewind fork 202 has two fingers 202a engaging in the hub 51 of the supply spool in the cartridge 50.

The operation of this film rewind drive mechanism 200 is described below. The first motor M1 used as the drive source of the mirror drive mechanism 100 is the same as that used as the drive source of the film rewind drive mechanism 200. But, for this case, the first motor M1 rotates in the different or clockwise direction as shown in FIG. 5(b). Motion of the first motor M1 is transmitted through the pinion 102 and the speed reduction gear assembly 103 to rotate the sun gear 104 in the clockwise direction. Responsive to this, the planetary gear 105 revolves in the clockwise direction by the friction of the coil spring 111, until it engages with the rewind gear 201.

After the meshing engagement of the planetary gear 105 with the rewind gear 201 has been established, the driving force overcomes the frictional force of the coil spring 111 so that the planetary gear 105 rotates about its own axis in the counter-clockwise direction, while slipping on the planetary shaft 110. Thus, the driving torque of the first motor M1 is transmitted to the rewind gear 201. Clockwise movement of the rewind gear 201 is then transmitted through the drive connection member 204 to the rewind fork 202. By this rotating rewind fork 202, the supply spool 51 of the film cartridge 50 rotates in the rewinding direction (clockwise direction). Thus, rewinding of the film 52 is performed.

Figure 8:
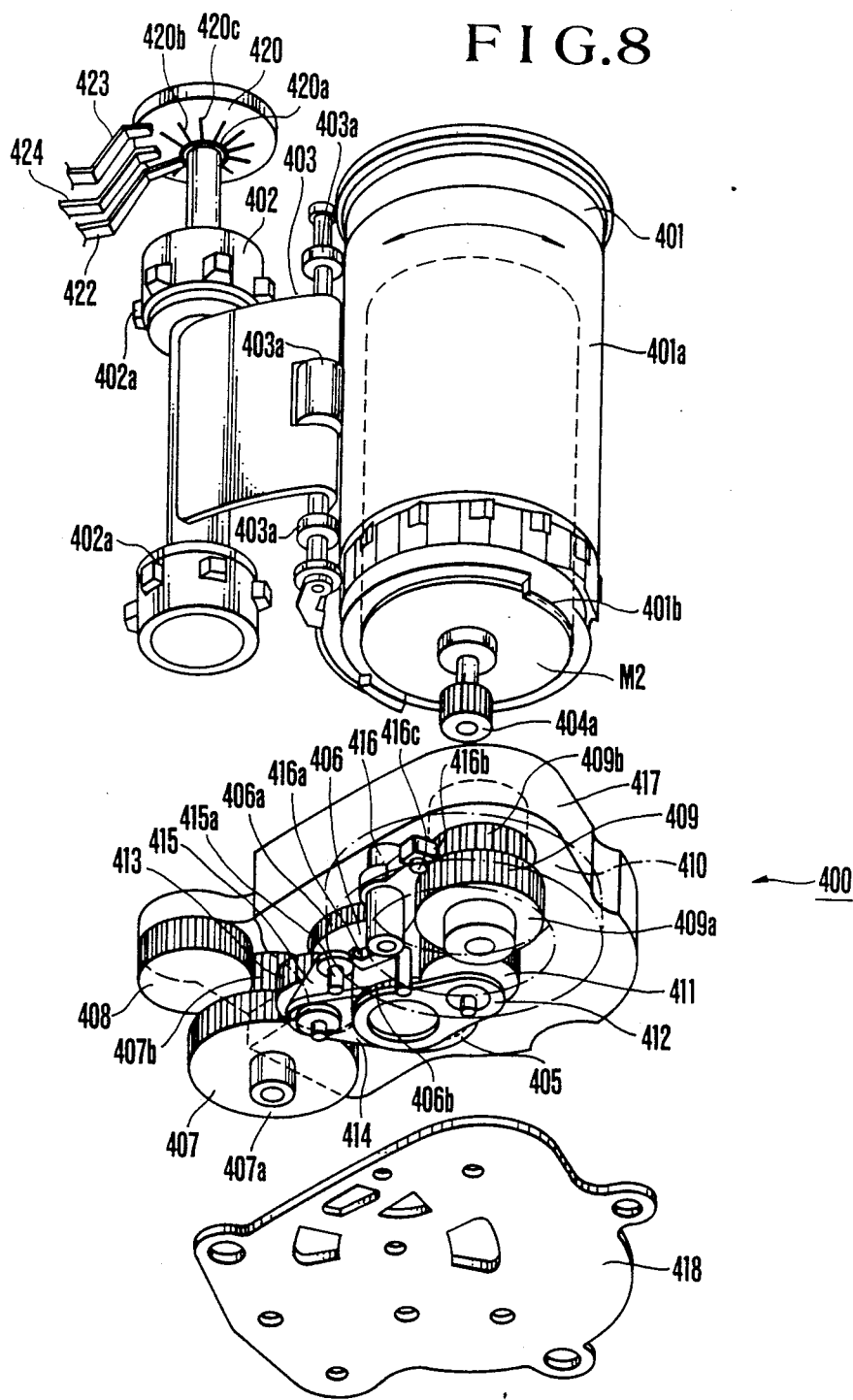
FIG. 8 is an exploded perspective view illustrating the structure of the film windup drive mechanism of FIG. 2.
Figure 9:
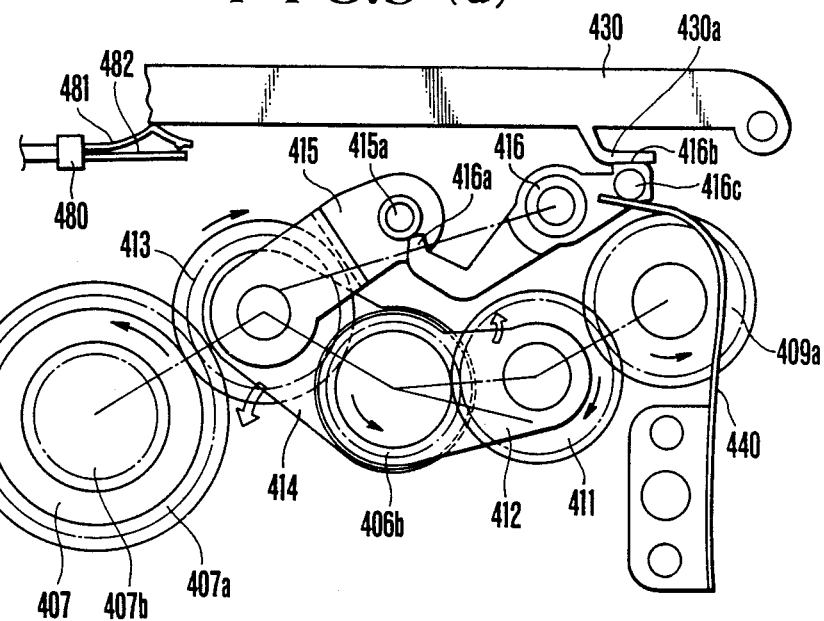
FIGS. 9(e) to 9(e) are top views of the film windup drive mechanism of FIG. 8 in successive operative positions.
Figure 9:
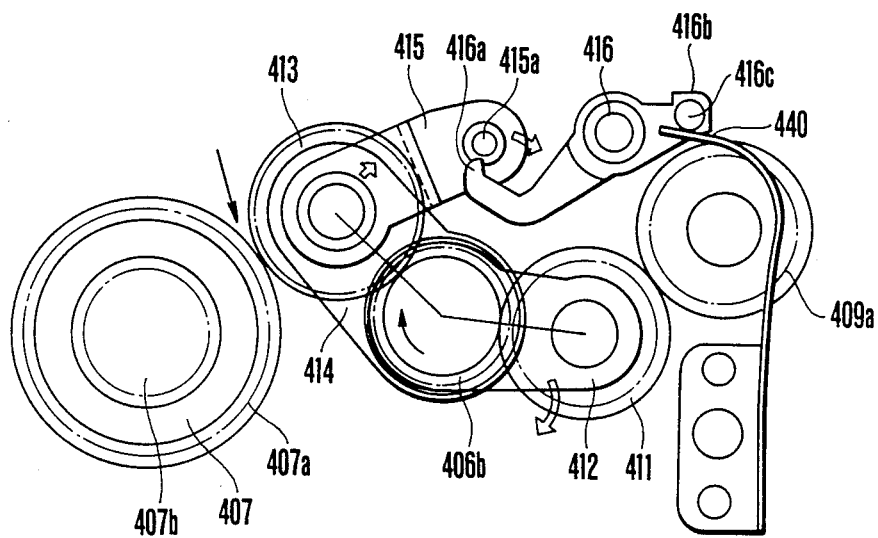

We next describe the film windup drive mechanism 400 by reference to FIGS. 8 and 9.

FIG. 8 in exploded perspective view illustrates the entire structure of the film windup drive mechanism 400. A spool 401 is of cylindrical form. Its peripheral surface is coated with a rubber layer to facilitate adhesion of the film leader, and its lower edge has a projected portion 401b to engage with a gear 410. A sprocket 402 has a plurality of pawls 402a on either end thereof to engage in the perforations 54 of the film. A film guide 403 is formed to a curved plate with three rollers 403a freely rotatable on a shaft. A second electric motor M2 is arranged in the interior of the spool 401 and has an output shaft on which is mounted a pinion 404a meshing with a transmission gear 405 A sun gear 405 common to two planetary clutches to be described later is constructed in 2-stage gear form with the large one 406a meshing with the transfer gear 405 and the small one 406b always meshing with two planetary gears 411 and 413. A spool side or first planetary lever 412 is pivotally mounted on a common shaft of the sun gear 406 and is frictionaly connected to the latter by a coil spring or the like, so that it is caused to turn in the same direction as that of rotation of the sun gear 406. The first planetary gear 411 is rotatably mounted on the free end of this planetary lever 412. A sprocket side or second planetary lever 414 is pivotally mounted on the common shaft of the sun gear 406 and is frictionally connected to the latter by a coil spring or the like, so that it is caused to turn in the same direction as that of rotation of the sun gear 406. The second planetary gear 413 is rotatably mounted on the free end of this planetary lever 414. A spool side or first transfer gear 409 has large and small gears 409a and 409b of which the large gear is arranged to engage with the first planetary gear 411 when the first planetary lever 412 turns in the counter-clockwise direction as the sun gear 406 changes its rotation to the counterclockwise direction and to disengage when the rotation of the sun gear 406 is reversed, and the small gear meshes with the spool gear 410. The latter when rotating in one direction drivingly engages the projected portion 401b of the spool 401.

A sprocket side or second transfer gear 407 has its large and small gears 407a and 407b arranged so that the large gear 407a engages the second planetary gear 413 when the second planetary lever 414 turns in the counter-clockwise direction as the sun gear 406 changes its rotation to the counter-clockwise direction, and disengages therefrom when the rotation of the sun gear 406 is reversed. The small gear 407b meshes with a gear 408 secured to the shaft of the sprocket 402. A lock lever 416 for holding the second planetary gear 413 in the disengaged position from the large second transfer gear 407a has a nose 416a arranged to engage a pin 415a on an extension 415 from the second planetary lever 414 when a back cover 430 of the camera housing is closed, and a tail 416c urged to abut on a resilient presser 430a of the back cover by a leaf spring 440 in engagement with a pin 416c thereon. The above-described gears and levers all are housed in a casing having a side wall 417 and a bottom or base plate 418 fixedly secured to the framework 40 at a location adjacent to the bottom of the spool chamber 43 in FIG. 2. Above its ceiling, there is a sensor-indexer for detecting the speed of rotation of the sprocket 402 and indexing each of its revolutions It includes an insulating disc 420 fixedly mounted on the shaft of the sprocket 402 and having three circular tracks of which the innermost or first is an integral ring-like pattern 420a of electrical conductivity, the second comprises a plurality of evenly-spaced electrically conductive stripes 420b contiguous to the innermost pattern 420a, and the third comprises only one radial stripe 420c contiguous to one of the stripes 420b.

Three sliders or brushes 422 to 424 are in contact with the first to third tracks 420a to 420c respectively. Though no detailed wirings are shown in FIG. 8, for example, a battery voltage is applied to the first brush 422 so that the second brush 423 produces a pulsated signal with a frequency depending on the speed of rotation of the sprocket 402 and the third brush 424 produces a signal representing that the film has advanced one frame for each revolution of the sprocket 402.

It should be recognized that the film windup drive mechanism 400 described in connection with FIG. 8 is made constructed with inclusion of two transmission systems of which the first begins with the sun gear 408, goes through the first planetary and transfer gears 411 and 409 and terminates at the gear 410 by which the spool 401 is driven to rotate, and the second begins with the same sun gear 406, goes through the second planetary and transfer gears 413 and 407 and terminates at the gear 408 by which the sprocket 402 is driven to rotate. The speed reduction ratios of the first and second transmission systems are so determined that the peripheral speed of the spool 401 is slightly faster than that of the sprocket 402 in order to prevent any slack loop of the film leader from being formed on the takeup spool 401 when AL is performed. It should also be recognized that the parts 406, 406, 411 and 412 constitute a first planetary clutch for the first windup transmission system, and the parts 406, 407, 413 and 414 constitute a second planetary clutch for the second windup transmission system.

The operation of the film windup drive mechanism 400 is next described by reference to FIGS. 9(a) to 9(e).

FIG. 9(a) illustrates the early stage of AL in a short time after the back cover 430 is closed with the lower first perforation of the film leader on the sprocket tooth 402a as shown in FIG. 2. The closure of the back cover 430 is detected by a switch 480 having a movable member 481 and a fixed member 482 in contact with each other to start counter-clockwise rotation of the second motor M2 along with counter-clockwise rotation of the small sun gear 406b. This causes both planetary levers 412 and 414 to turn in the counter-clockwise direction from their positions of FIG. 9(e), bringing the planetary gears 411 and 413 respectively into engagement with the transfer gears 409 and 407 (large gears 409a and 407a), as shown in FIG. 9(a). Hence, the spool 401 and the sprocket 402 start at the same time being driven to rotate in the winding-up direction. Whether or not the film leader 56 moving out of the sprocket 402 is taken up on the spool 401 successfully should then be examined after a prescribed number of first frames, for example, three frames, have been advance in vain by the sprocket.

For this purpose, the second motor M2 is once stopped to reverse its rotation to the clockwise direction. Thereby, both planetary levers 412 and 414 are turned to the clockwise direction, taking the first and second planetary gears 411 and 413 out of engagement with the first and second transfer gears 409a and 407a respectively as shown in FIG. 9(b) in a short time from the start of clockwise rotation of the motor M2. Such clockwise movement of the second or sprocket side planetary lever 414 also causes the detent pin 415a on the extension 415 to move in the direction indicated by arrow over the nose 416a of the lock lever. For note, during this time, the lock lever 416 may be turned some angle in the counter-clockwise direction. On this account, the resilience of the pressor 430a though stronger than the bias force of the leaf spring 440 is predetermined so weak as to allow for such movement of the lock lever 416.

Figure 9C:
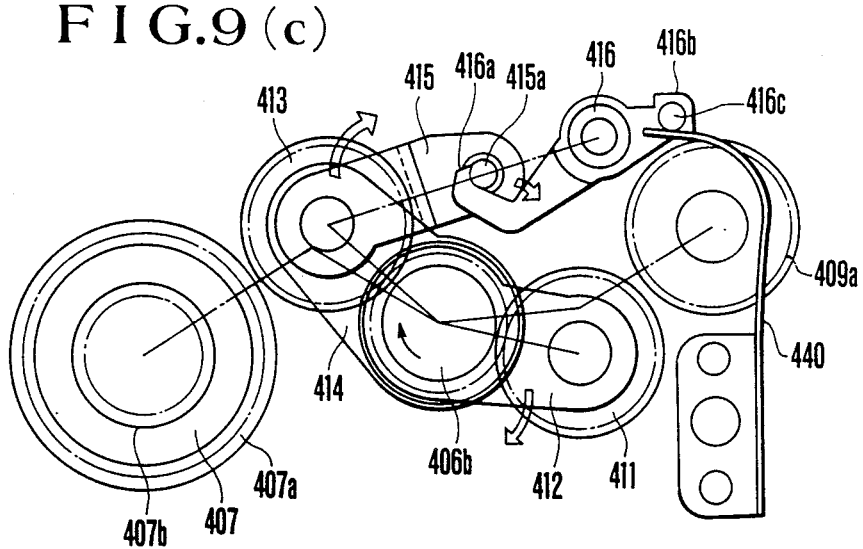

As the clockwise rotation of the motor M2 goes on, the planetary levers 412 and 414 are further turned until the detent pin 415a fully enters the recess behind the nose 416a, as shown in FIG. 9(c). Thus, the sprocket side planetary lever 414 is locked in the illustrated position from turning back even when the rotation of the sun gear 406 is later reversed to the counter-clockwise direction again.

Figure 9D:
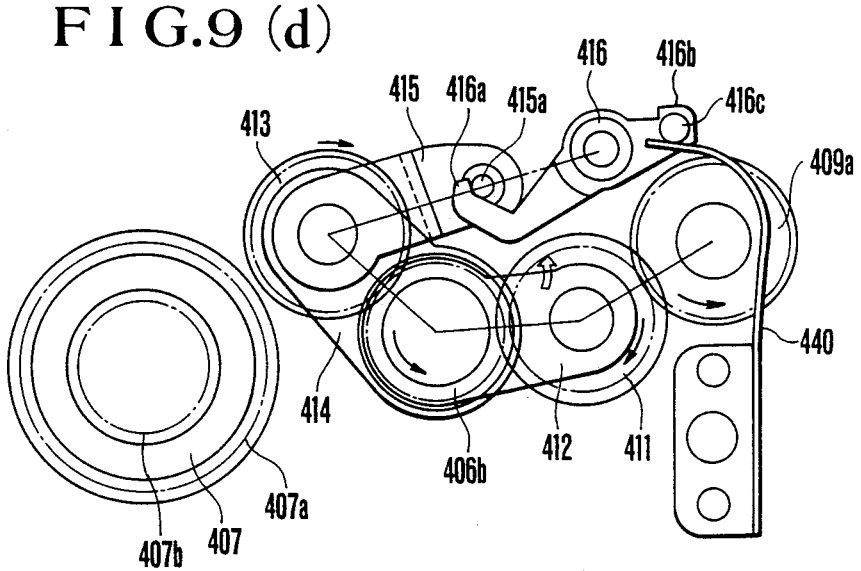

To advance the film by one more blank frame, or the fourth frame, in the final stage of the AL, a counter-clockwise rotation of the motor M2 is started again. This causes counter-clockwise rotation of the small sun gear 406b which in turn causes the spool side planetary lever 412 to turn in the counter-clockwise direction until the spool side planetary gear 411 engages the spool side large transfer gear 409a to drive the takeup spool 401 to rotate in the winding-up direction, while leaving the sprocket side planetary lever 414 stationary in the locked position where the sprocket side planetary gear 413 is out of engagement with the sprocket side transfer gear 403 as shown in FIG. 9(d). As a result, the sprocket 402 is rendered freely rotatable. In the operative position of FIG. 9(d), therefore, if the film leader 56 of the film 52 is adhesively convoluted on the outer periphery 401a of the spool 401, the performance of the last cycle of winding operation for the AL will result in rotation of the sprocket 402 by the moving film because its pawls 402a engage in the perforations 54. If otherwise, or the spool 401 fails to grasp the film leader 56, the driving of the spool 401 alone cannot result in movement of the film 52 and, therefore, rotation of the sprocket 402. Hence, whether or not the sprocket 402 rotates exactly one revolution as detected by the camera control circuit to be described later may be adopted as a criterion for discriminating between the success and failure of AL.

After all the frames of film have been exposed and are rewounded, when the back cover 430 is opened to replace the film cartridge by new one, the lock lever 416 is released from the depression of the pressor 430a, and turned in the counter-clockwise direction by the bias force of the spring 440 to take its nose 416a out of engagement with the detent pin 415a, thereby the latter is slightly turned back. Therefore, when the back cover 430 is closed again for the next AL, the second planetary clutch is returned along with the first one to the initial positions of FIG. 9(a).

It will be appreciated that one of the features of the invention is that the AL process is made to comprise two steps of which the early step is to drive both of the spool 401 and the sprocket 402 at the same time so that the sprocket 402 can feed the film leader 56 to the spool 401 to permit concentration of the operation of the latter in convoluting it, and the later step is to drive the spool 401 only, leaving the sprocket 402 freely rotatable to permit test of whether or not the AL is successful to be performed easily by detecting that the sprocket 402 is driven to rotate by the film 52 or remains stationary. Therefore, this produces an advantage that the indexer 420 cooperating with the sprocket 402 can be utilized as the means for checking whether the AL has succeeded or failed. Hence, the incorporation of the checking means does not involves any increase in the complexity of mechanical structure. In this respect, according to the prior art, such a checking means had to be otherwise formed by using an additional wheel arranged to be driven by the film, or a photo-electric transducer positioned across the path of the perforations of film.

Figure 10:
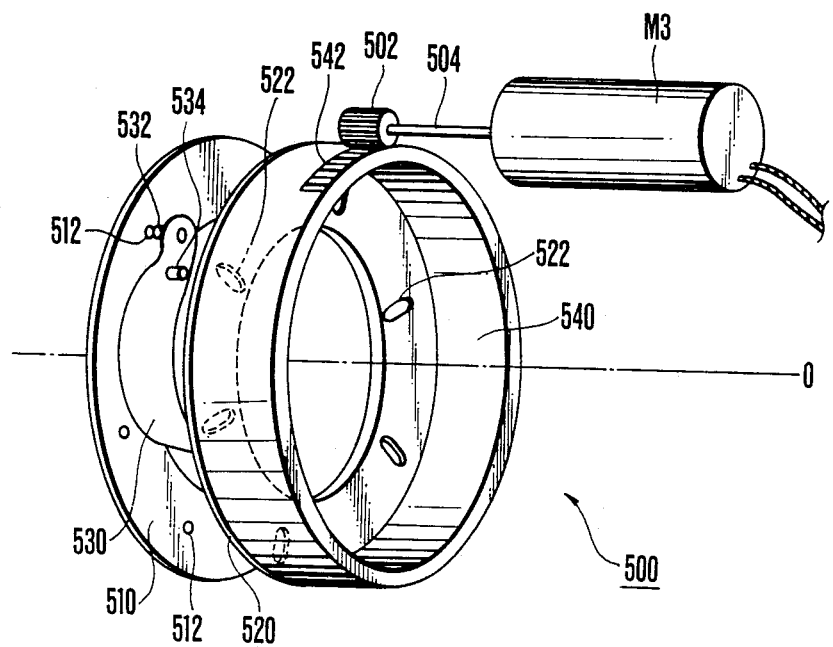
FIG. 10 is a perspective view of a diaphragm drive mechanism in the photographic lens mounting.

Referring next to FIG. 10 there is shown a motorized diaphragm mechanism 500 incorporated in the mounting unit for the photographic lens 20 of FIG. 1. A third motor M3 is fixedly secured to the body tube of the mounting unit. A fixed disc 510 of ring shape has six evenly-spaced holes 512 formed therein in a common circle with its center at an optical axis O. A diaphragm drive disc 520 of ring shape is rotatably supported and has six evenly-spaced radially elongated camming slots 522 formed therein. Six diaphragm blades 530 lies in a space between the fixed and drive discs 510 and 520 and each have pins 532 and 534 fixedly mounted on either side thereof and extending into the hole 512 of the fixed disc 510 and the camming slot 522 of the diaphragm drive disc 520. A geared ring 540 is rotatably supported and fixedly carries the diaphragm drive disc 520. An external gear 542 on the ring 540 meshes with a pinion 502 fixed to the output shaft 504 of the third motor M3.

The operation is as follows. The diaphragm blades 350 are assumed to be fully open. When the third motor M3 rotates in the counter-clockwise direction, the gear ring 540 is rotated in the clockwise direction. Responsive to this, the diaphragm drive disc 520 turns the diaphragm blades 530 about the pivot pins 532 by the pin 534-and-slot 522 connections in a direction (counter-clockwise) to close the aperture opening.

Meanwhile, when the third motor M3 rotates in the reverse or clockwise direction, the gear ring 540 is rotated in the counter-clockwise direction. Responsive to this, the diaphragm drive disc 520 turns the blades 530 in the clockwise direction. That is, the diaphragm is driven in the direction from the closed-down position to the fully open position.

We next describe about a practical example of the construction and arrangement of circuit elements for controlling all the above-described mechanisms based on illustrations.

FIG. 11 is an electrical circuit diagram illustrating the entire structure of a camera control circuit. In FIG. 11, the circuit includes an electrical power source or battery BAT, a DC/DC converter CON and a first microcomputer MC1. The DC/DC converter CON is supplied at its input terminal IN with an unstable voltage ranging 4 to 6 volts from the battery BAT, and produces a constant voltage of 5 volts at its output terminal OUT, when a control signal at its terminal CNT is high level. This terminal CNT is connected to an output terminal P4 of the microcomputer MC1. When it is low level, the voltage conversion is stopped and zero volt is produced.

A circuit for checking the battery voltage comprises a voltage divider of resistors R1 and R2 connected in series to each other across the battery BUT and an A/D converter AD1 receptive of the output of the voltage divider for producing an output in digital form which is applied through a bus line BUS1 to a second microcomputer MC2 capable of high speed computation and having a non-volatile memory E$^2$PROM incorporated therein.

A light metering circuit comprises a silicon photo-diode SPD positioned to receive light coming from an object to be photographed and entering through the lens 20, an amplifier AMP for amplifying the output of the silicon photo-diode SPD with temperature compensation, and A/D converter AD2 having an input terminal IN connected to the output terminal OUT of the amplifier AMP. The A/D converter AD2 communicates with the second microcomputer MC2 through a bus line BUS2. Hence, the information representing the object brightness in digital form is sent from the A/D converter AD2 to the microcomputer MC2.

The A/D converters AD1 and AD2, amplifier AMP and microcomputer MC2 are rendered operative by the supply of the stabilized voltage of 5 volts as their power sources from the DC/DC converter CON. When the DC/DC converter stops conversion of the voltage, therefore, the battery checking and light metering circuits are rendered inoperative.

A switch SBP for sensing the back cover of the camera (corresponding to the switch 480 in FIG. 9) is arranged as shown on circuit to turn off when the back cover is closed, and to turn on when it opens. A switch SRW cooperates with a rewind release button 14 (see FIG. 1). It is normally open but turns on when the button 14 is pushed down.

Another switch SW2 which cooperates with the release button 12 (see FIG. 1) is normally open, but turns on when the button 12 is pushed down.

A switch SCN2 is arranged to turn on when the running down of the trailing curtain of the shutter is complete.

The outputs of the switches SBP, SRW and SW2 are connected respectively to input ports P1, P2 and P3 of the first microcomputer MC1 and also respectively to input portions P5, P6 and P7 of the second microcomputer MC2 so that both microcomputers MC1 and MC2 can detect independently of each other the ON or OFF states of these switches. On the other hand, the ON or OFF state of the switch SCN2 is detected by only the second microcomputer MC2 at its input port P8.

The first and second microcomputers MC1 and MC2 communicate with each other through a bus line BUS3. Informations representing the computed exposure value, i.e. shutter time or aperture, and operating conditions of the camera are sent from the second microcomputer MC2 through a bus line BUS4 to a driver DR in the form of an integrated circuit (hereinafter referred to as "IC") for a display device DISP of, for example, the liquid crystal-shutter type.

The first microcomputer MC1 and the display driver DR are supplied with their power from either of the battery BAT and the DC/DC converter CON through respective diodes DI1 and DI2. Therefore, so long as the battery BAT lies in the camera, they are always in operation.

MG31 and MG32 are the solenoids (shown in FIG. 7 respectively at 383 and 389) for controlling the starts of the leading and trailing curtains of the shutter respectively.

The solenoids MG31 and MG32 are connected at their one ends to the collectors of transistors TR1 and TR2 respectively, the opposite ends of which are connected to the positive terminal of the battery BAT. The base electrodes of the transistors TR1 and TR2 are connected through respective resistors R3 and R4 to the second microcomputer MC2 at its output ports P13 and P14 respectively. The microcomputer MC2 controls the timing of production of signals from its output ports P13 and P14 so that the shutter time is adjusted to the computed value.

Also, the solenoids MG31 and MG32 are to be used as the real load resistor for the battery BAT when its voltage is checked. Even for this purpose, the microcomputer MC2 can control its output signals at the ports P13 and P14.

A drive circuit for the second motor M2 (see in particular FIGS. 8 and 9) comprises pnp and npn transistors TR15 and TR16 respectively whose collectors are connected to one end of the winding of the motor M2, the opposite end of which is connected to the collectors of pnp and npn transistors TR18 and TR17 respectively and resistors R15 to R18 through which the bases of the transistors TR15 to TR18 are connected to output ports P15 to P18 of the second microcomputer MC2.

The emitters of the transistors TR15 and TR18 are connected to the plus terminal of the battery BAT, and the emitters of the transistors TR16 and TR17 are connected to the minus terminal of the battery BAT.

The microcomputer MC2 can control the operation of the drive circuit for the second motor M2 with selection of the normal and reverse direction of rotation depending on the signals from the output ports P15 to P18 thereof. For example, when the signals from the output ports P15 and P16 are high level, and the signals from the output ports P17 and P18 are low level, the transistors TR16 and TR18 are conducting and the transistors TR15 and TR17 are non-conducting. As a result, current flows from the left to the right through the winding of the motor M2. Hence, the motor M2 rotates in the normal direction.

Conversely when the signals from the output ports P15 and P16 are low level and the signals from the output ports P17 and P18 are high level, the transistors TR16 and TR18 turn off, and the transistors TR15 and TR17 turn on, allowing current to flow from the right to the left. Hence, the motor M2 rotates in the reverse direction.

A drive circuit for the first motor M1 which drives the charging of the shutter and the upping of the mirror comprises pnp and npn transistors TR19 and TR20 respectively whose collectors are connected to one end of the winding of the motor M1, the opposite end of which is connected to the collectors of pnp and npn transistors TR22 and TR21 respectively, and resistors R19 to R22 through which the bases of the transistors TR19 to TR22 are connected to the second microcomputer MC2 at its output ports P19 to P22 respectively.

The emitters of the transistors TR19 and TR22 are connected to the plus terminal of the battery BAT, and the emitters of the transistors TR20 and TR21 are connected to the minus terminal.

The second microcomputer MC can control of the operation of the drive circuit for the first motor M1 in a similar manner to the second motor M2 with selection of the normal and reverse directions of rotation.

The spatial encoder (shown in FIG. 8 at 420 for the disc and 420a to 420c for the patterns thereon) is denoted by SM1. The second and third sliders 423 and 424 cooperative with the encoder 420 are electrically connected respectively to input ports P9 and P10 of the second microcomputer MC2. Therefore, the microcomputer MC2 can receive informations representing the speed of the sprocket 402 and the termination of each cycle of winding operation.

The position detector (shown in FIGS. 3 and 4 at 122 for the slider and 160 for the spatial encoder) is denoted by SM2. The second and third tracks 162 and 163 are electrically connected also to the second microcomputer MC2 at its input ports P12 and P11 respectively. Therefore, the microcomputer MC2 can receive informations representing which event, the up-and-down movement of the mirror or the charing of the shutter, is occurring.

A switching transistor TR3 for controlling the current supply to the third motor M3 as the drive source of the diaphragm device in the lens mounting has its collector connected to an interconnection terminal in the lens mount on the camera body, its emitter connected to the plus terminal of the battery BAT, and its base connected through a resistor R6 to an output port P23 of the second microcomputer MC2. Another resistor R5 is connected between the emitter and base of the transistor TR3 through the resistor R6 so that when the DC/DC converter CON is in off state to cut off the current supply to the second microcomputer MC2, the switching transistor TR3 is turned off.

A third microcomputer MC3 is positioned within an interchangeable lens mounting to control a drive circuit for the third motor M3 whose output shaft is operatively connected to the diaphragm blades (see FIG. 10).

The drive circuit for the third motor M3 comprises pnp and npn transistors TR23 and TR24 respectively whose collectors are connected to one end of the winding of the motor M3, the opposite end of which is connected to the collectors of pnp and npn transistors TR26 and TR25 respectively, and resistors R23 to R26 through which the bases of the transistors TR23 to TR26 are connected to output ports P23 to P26 of the third microcomputer MC3 respectively.

The emitters of the transistors TR23 and TR26 are connected to a common interconnection terminal on the lens mounting which is to be in contact with the one of the terminals on the camera body which is connected to the collector of the switching transistor TR3, and the emitters of the transistors TR16 and TR17 are connected to a common interconnection terminal on the lens mounting which is to be in contact with the one of the terminals on the camera body which is connected to the minus terminal of the battery BAT.

The third microcomputer MC3 can control the operation of the drive circuit for the third motor M3 with selection of the normal and reverse directions of rotation depending on the signals from the output ports P23 to P26.

BUS5 is a bus line through which the second microcomputer MC in the camera body communicates with the third microcomputer MC in the lens mounting. In this bus line there is a pair of interconnection terminals to be in contact with each other, one of which is in the lens mount on the camera body and the other in the ferrule on the lens mounting respectively. With these terminals in contact, the second microcomputer MC2 in the camera body can command the third microcomputer MC3 in the lens mounting such that the third motor M3 be driven so as to close the diaphragm blades down to a preset aperture value, or the rotation of the third motor M3 be reversed to return the diaphragm blades to the full open position.

The third microcomputer MC3 is supplied with its power from either the battery BAT or the DC/DC converter CON through the respective diode D11 or D12 and through a pair of interconnection terminals when in contact with each other.

SCI is a bus line through which the second microcomputer MC2 communicates with the outside of the camera body. An external end of this bus line SCI may be accessible either directly from the outside of the camera housing or indirectly through the casing of the finder. By using this bus line SCI, it is made possible that the data stored in the $E^2PROM$ are rewritten so as to introduce or inhibits the motorized film rewinding capability into or from the camera.

The operation of the control circuit for the camera of such structure is described below based on the flow charts.

Figure 12:
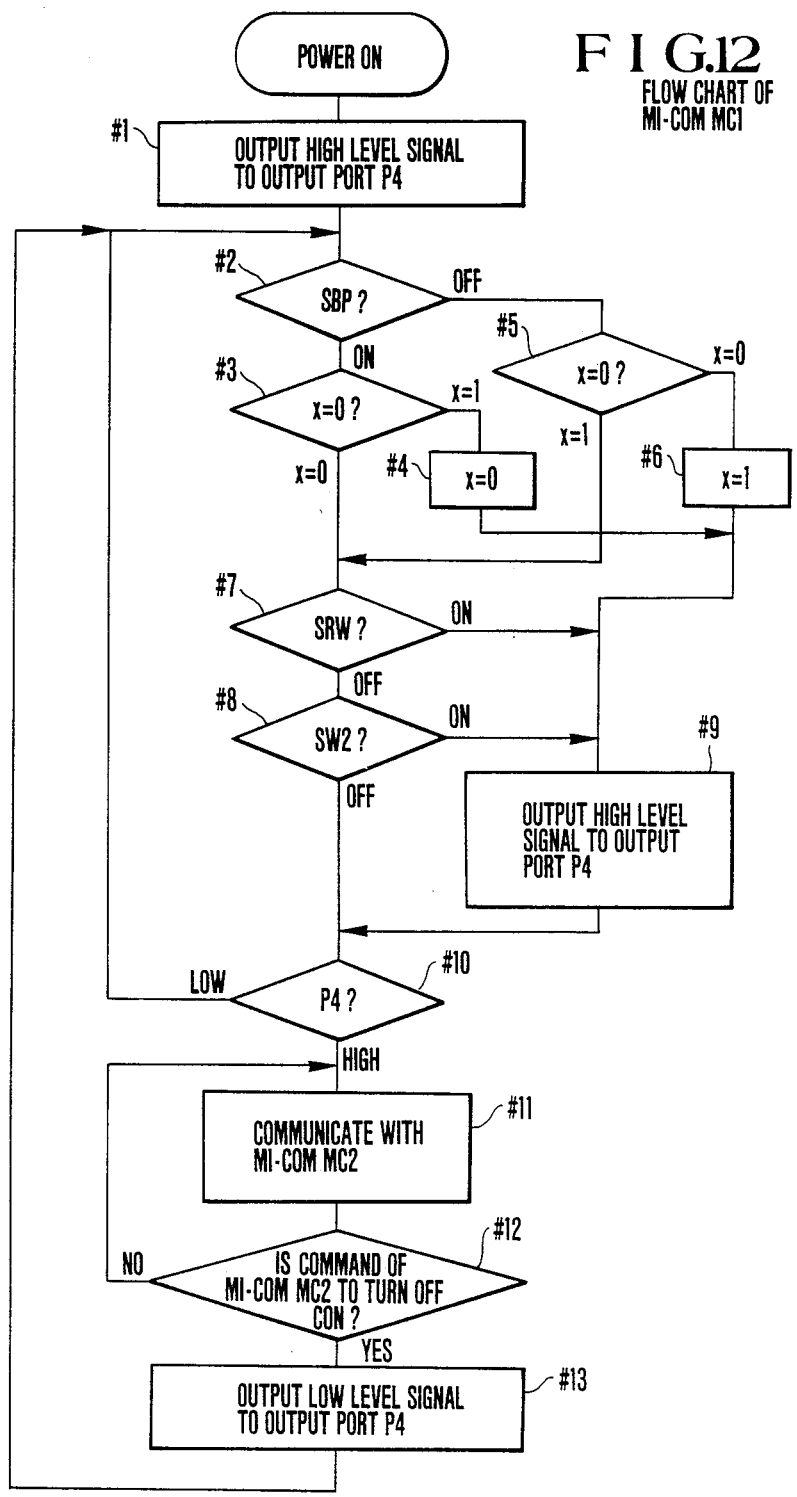
FIG. 12 is a main flowchart for the operation of the circuit of FIG. 11.

FIG. 12 illustrates how the first microcomputer MC1 proceeds through a program.

When the electrical power source or battery BAT is thrown, power-on resetting of the microcomputer MC1 is effected, and the program execution begins with a step #1. In the following, explanation is made according to the flowchart.

Step #1: Produce a signal of high level at the output port P4, and a constant voltage of 5 volts from the DC/DC converter CON, and supply the electrical power to the microcomputer MC2, the light metering amplifier AMP and the A/D converters AD1 and AD2.

Two loops are then encountered. The first loop is to test for a change of the open or closed state of the back cover 430 and an actuation of either the shutter button 12 or the rewind-release button 14. The second loop will be seen later.

Step #2: Read in the back cover sensor or switch SBP to check whether or not the back cover 430 is open. If so, in other words, if the switch SBP is on, then advance to a step #3. If not, branch to a step #5.

Step #3: Check a flag X that memorizes the open or closed state of the back cover checked in the preceding cycle of execution of the first loop. The flag X has 0 for the opening of the back cover. If it is 0, then advance to a step #7. If 1, then branch to a step #4. The throwing of the electrical power source results in setting the flag to 0 or 1 with an equal probability.

Step #4: Set the flag X to 0 to memorize the fact that the back cover is open. After that, a step #9 follows.

Step #5: Test for the flag X. If it is 1, then advance to a step #7. If 0, then branch to a step #6.

Step #6: Set the flag X to 1 to memorize that the back cover is closing. After that, the step #9 follows.

Step #7: Read in the state of the switch SRW to check whether or not the rewind-release button 14 is actuated. If so, then branch to the step #9. If not, then advance to a step #8.

Step #8: Read in the state of the release switch SW2 for checking whether or not the release button 12 is actuated. If so, or the switch SW2 is on, then branch to the step #9. If off then advance to a step #10.

Step #9: Similarly to the step #1, turns on the DC/DC converter CON.

Step #10: Test for the DC/DC converter CON is by now in operation. If not so, then return to the step #2. Such a procedure repeats itself until the open or closed state of the back cover changes or the switch SRW responsible for the rewind-release button 14 or the release switch SW2 is turned on.

Step #11: Communicate with the second microcomputer MC2 to receive commands therefrom.

Step #12: Test if the command from the microcomputer MC2 is to turn off the DC/DC converter CON. If so, then advance to a step #13. If not, then return to the step #11 and wait until the command of turning off the DC/DC converter CON comes.

Step #13: Produce a signal of low level at the output port P4 to turn off the DC/DC converter CON. Thus, the DC/DC converter CON stops producing of the stabilized voltage of 5 volts.

The procedure of operation of the first microcomputer MC1 is as such. As can be understood from this flowchart, the microcomputer MC1 responsive to either throwing of the electrical power source, or change of the state of the back cover sensor switch SBP from on to off or from off to on, or closure of the rewind switch SRW or the release switch SW2 renders the DC/DC converter CON operative to supply electrical power to the second microcomputer MC2, the light metering amplifier AMP and the first and second A/D converters AD1 and AD2. After the start of power supply, the microcomputer MC1 sustains the DC/DC converter CON in the "on" state until it receives the command of turning off the DC/DC converter CON. At a point in time when this command arrives at the first microcomputer MC1, it stops the production of the stabilized voltage.

We next describe the operation of the second microcomputer MC2 that follows the start of operation of the DC/DC converter CON. For note, whilst the first microcomputer MC1 is allowed to operate so long as the electrical power source or battery is being thrown, the period of operation of the second microcomputer MC2 is limited to only when the DC/DC converter CON is in operation. This is because the first microcomputer MC1 is assumed to be of low power consumption, slow speed type for it does no more works than to check the switches, and because the second microcomputer MC2 is assumed to be of the high speed type and to consume a greater amount of electrical energy.

FIGS. 13A to 13E are flowcharts of the procedure of operation of the second microcomputer MC2 after the supply of electrical power thereto.

Step #14: Read in the back cover sensor or switch SBP. if the back cover is open, then advance to a step #15. If it is closed, then branch to a step #18.

Step #15: Check the flag I that memorizes the open or closed state of the back cover checked in the preceding cycle of execution of the aforesaid first loop. If it is 0 representing that the back cover is opening, then advance to a step #20. If 1, then branch to a step #16.

For note, regarding the keeping of the records in the memory of the microcomputer MC2, because use is made of the E$^2$PROM (non-volatile ROM), no problem arises when the power supply is cut off. If the memory is not of that type, the conventional backup technique by using a button type lithium battery releasably attached from the outside, which is known to those skilled in the art, should be employed so that even when the DC/DC converter CON stops supplying the electrical power, at least the records in the memory can be kept.

Step #16: Since the back cover has changed from the open to the closed state, in order to memorize the fact that the back cover is opening, set the flag I to 0.

Step #17: Clear that register in the memory on which the content of a film frame counter is to be stored.

Step #18: Check the flag I that is memorizing the previous open or closed state of the back cover. If it is 1, then jump back to a step #20. If 0, branch to a step #19.

Step #19: Since the back cover has changed from the open state to the closed state, in order to memorize that the back cover is closing, set the flag I to 1. Then, a jump to AL subroutine beginning with a step #23 shown in FIG. 13B occurs.

Step #20: Read in the switch SRW to check whether or not the rewind-release button is actuated. If so, jump to REWIND subroutine shown in FIG. 13D. If not, then advance to a step #21.

Step #21: Read in the switch SW2 to check whether or not the release button 12 is actuated. If not, then advance to the next step #176. Otherwise, jump to RELEASE subroutine shown in FIG. 13F.

Step #176: Communicate with the external device or host computer through the bus line SCI.

Step #177: Test if the command received from the external device is to rewrite the flag Z of the E$^2$PROM If so, go to a step #178. If not, or if the host computer is not as yet connected thereto, then advance to a step #22.

Step #178: Examine whether the flag Z is to be set to 0 or 1 in order to allow for or inhibit the automatic rewind mode. For the flag Z=1, branch to a step #179, or for Z=0, to a step #180.

Step #179: Set the flag Z of E$^2$PROM to 1. Then jump back to the step #22.

Step #180: Set the flag Z of E$^2$PROm to 0. Then jump back to the step #22.

Step #22: Exit the routine. For this purpose, the second microcomputer MC gives the first microcomputer MC1 the command of stopping the operation of the DC/DC converter CON. When the DC/DC converter CON is then rendered inoperative by the first microcomputer MC1, the power supply to the second microcomputer MC2 is cut off. Thus, all the mainline flowchart has been processed.

Figure 13:
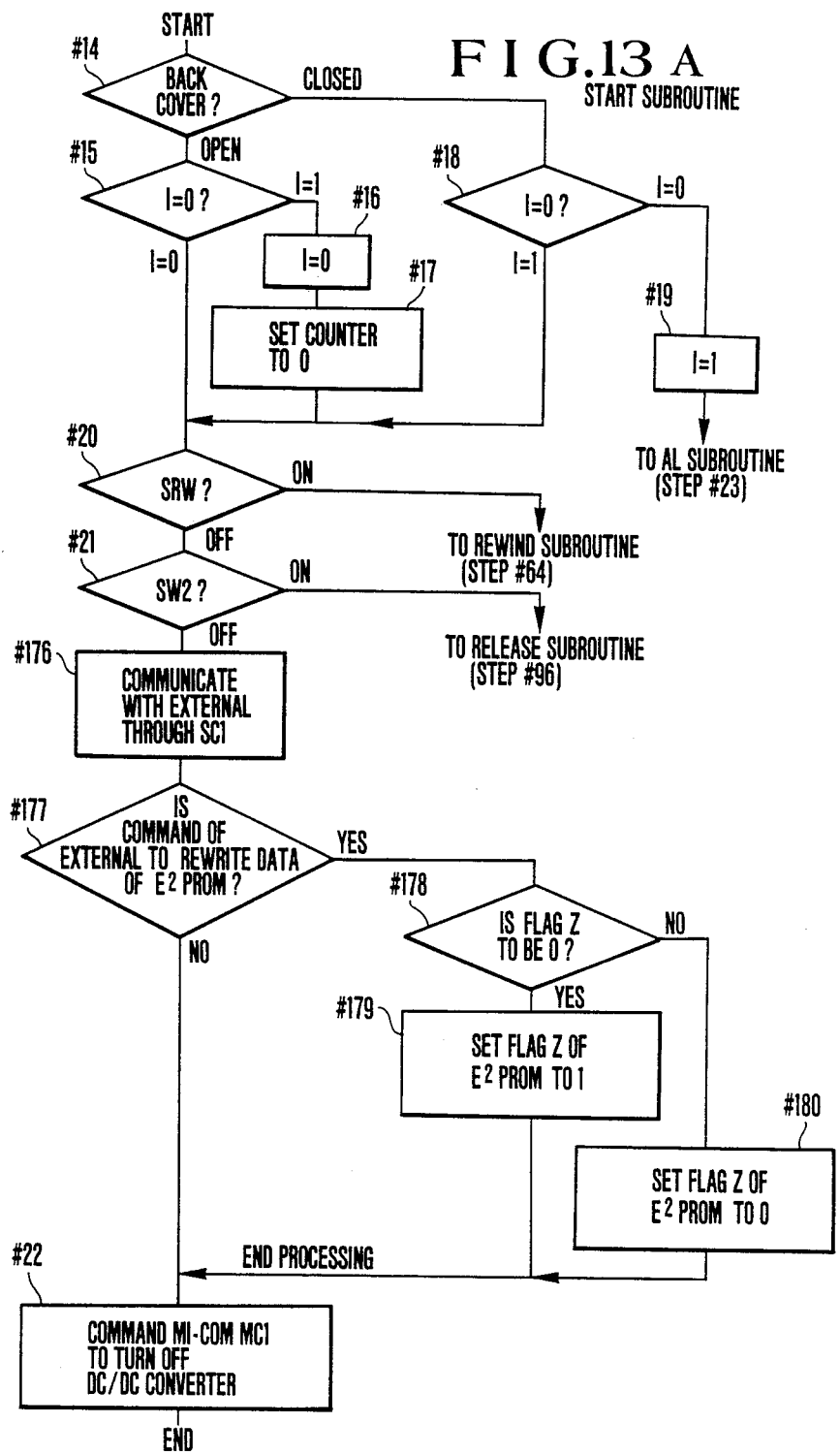
FIG. 13A–13E with FIGS. 13E(1)–13E(4) are subroutine flowcharts for the operation of the circuit of FIG. 11.
Figure 13:
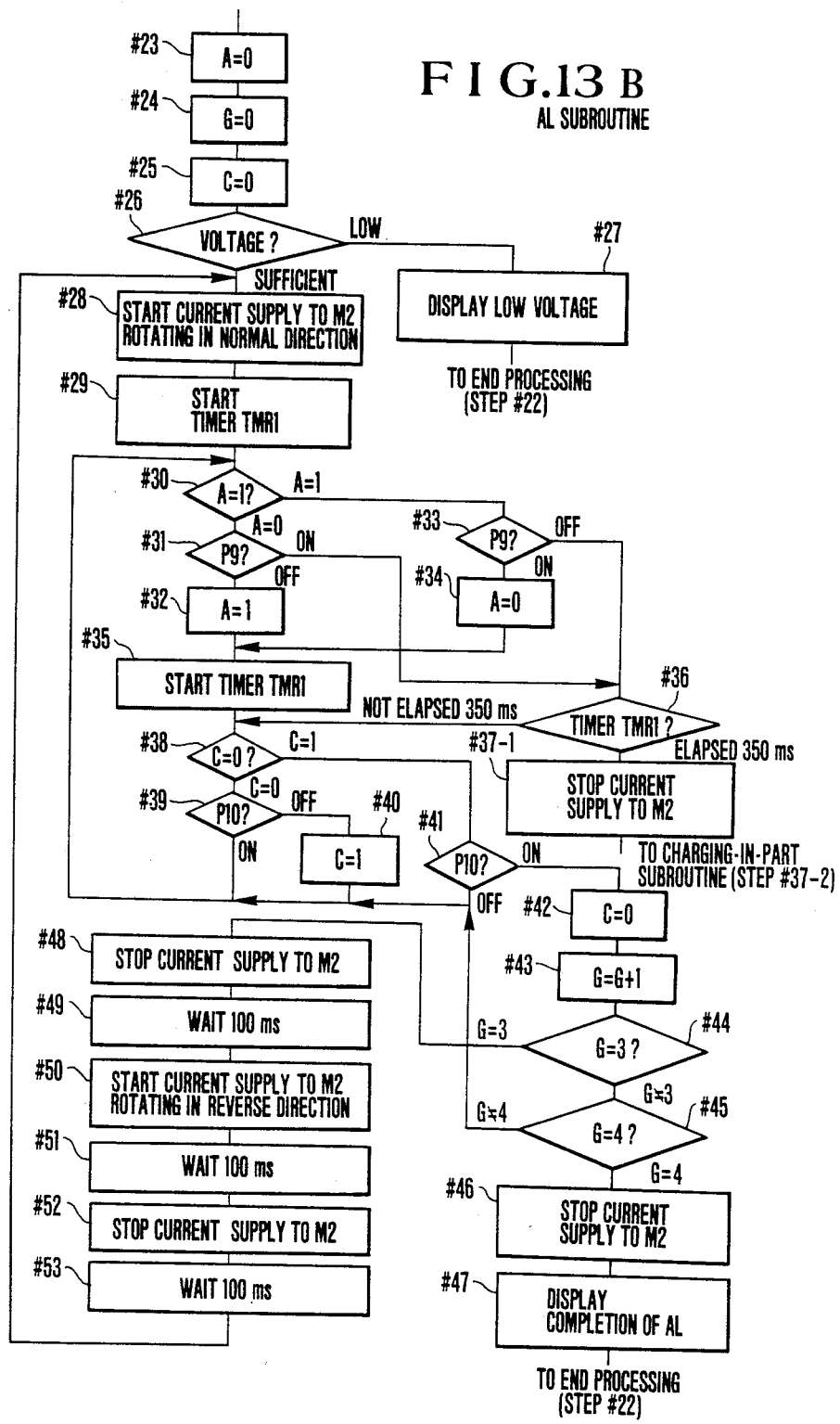

A subroutine flowchart, referred to as AL for (automatic loading), is shown in FIGS. 13B and 13C. As has been described above, the jump from the mainline to this subroutine occurs when the back cover is first open and then closed.

Steps #23, #24 and #25: Set the flags A, G and C respectively to 0 in sequence.

Step #26: Check the battery voltage. For this purpose, current from the battery BAT is allowed to flow through the shutter control solenoids MG31 and MG32 for a time of 10 milliseconds. In this time, whether or not the battery voltage in the form of the output of the A/D converter AD1 is above the satisfactory operating level is determined. A procedure of this operation is not shown for the purpose of clarity of the flowchart. If the actual battery voltage is below the level, then jump to a step #27. If above it, then advance to a step #28.

Step #27: Display a warning signal that the battery voltage has fallen below the level. Then, jump back to the step #22 described above to perform END treatment.

Step #28: Start rotation of the second motor M2 in the normal direction (the counter-clockwise direction of rotation of the sun gear 406 as shown in FIGS. 8 and 9(a)) to initiate an automatic loading operation. The selection of the normal direction is controlled by the combinations of the levels of the signals produced from the output ports P15 to P18 as has been described above.

Step #29: Start a timer TMR1 for counting the time of current supply to the second motor M2.

Step #30: Check the flag A that is memorizing the previous state of the input port P9. The value of A=0 or 1 represents that the previous state of switching is "on", or "off" respectively. For note, the signal appearing at the input port P9 comes from the slider or brush 424 shown in FIG. 8) cooperating with the sprocket 402, and comprises a plurality of pulses (for example, 12 pulses) for every one frame of film advanced. If this signal is pulsating, the microcomputer MC2 takes it that the sprocket 402 is rotating. If the pulsation does no longer occur, the microcomputer MC2 determines that the sprocket 402 has stopped. For A=0 or 1, the present step #30 is followed by a step #31 or #33 respectively. Since the flag A has been set to 0 in the step #23 just after the start of execution of the AL subroutine, then advance to the step #31.

Step #31: Compare the present state of the input port P9 with the previous one. If they differ, then advance to a step #32. Otherwise branch to a step #36.

Step #32: Change the flag A to 1, and advance to the step #35.

Step #33: Similarly to the step #31, compare the present state of the input port P9 with the previous one. If there is a change, then advance to a step #34. If not so, then branch to a step #36.

Step #34: Change the flag A to 0 and advance to the step #35.

Step #35: Reset and start the timer TMR1 having the function of counting the time of current supply to the second motor M2. Then advance to a step #38.

Step #36: Because the input port P9 remains unchanged, the timer TMR1 which is counting the time of current supply to the second motor M2 is to be checked. If no change of the input port P9 occurs in the prescribed period (for example 350 milliseconds), as the sprocket 402 is stopping, then branch to a step #37-1. If the period of 350 milliseconds is in progress, then jump back to the step #38.

Step #37-1: Stop a current supply to the second motor M2, and jump to a charging-in-part subroutine (step #37-2) to be described later.

Step #38: Check the flag C that is memorizing the previous state of the input port P10. The value of C=0 or 1 represents that the previous state of switching is "on" or "off" respectively. For note, the signal appearing at the input port P10 comes from the slider or brush 423 shown in FIG. 8 cooperating with the sprocket 402. At a point in time when the film has been wound up by one frame, the switch turns on (the output of the sliding brush 423 changes to the ground level). Then, as soon as the next cycle of film winding operation starts, the switch turns off (the output of the sliding brush 423 changes from the ground level to the initial level). Also, when this cycle is complete, the switch turns on again. Depending on this signal, therefore, the microcomputer MC2 can control the one-frame advancement of the film. For C=0 or 1, the present step #38 is followed by a step #39 or #41 respectively. Since the flag C has been set to 0 in the step #25 just after the start of execution of the AL subroutine, then advance to the step #39.

Step #39: Compare the present state of the input port P10 with the previous one. If there is a change, then branch to a step #40. Otherwise, return to the step #30, terminating one cycle of execution of the loop.

Step #40: Since the input port P10 has thus changed, the flag C is now changed to 1. After that, return to the step #30 occurs. Thus, the first cycle of film winding operation in the auto-load mode is initiated.

Step #41: Compare the present state of the input port P10 with the previous one. If there is a change, then advance to a step #42. Otherwise, return to the #30, continuing the first cycle of winding operation.

Step #42: Since the input port P10 has changed at the termination of the first cycle of winding operation, the flag C is now set to 0. Then advance to a step #43.

Step #43: Increment the memory G in which a digit representing the number of fed blank frames of film is stored.

Step #44: Check if that digit is 3. If so, then advance to a step #48. Otherwise, branch to a step #45.

Step #45: Check if the number of fed blank frames of film has reached a prescribed value, in this instance, four. If so, then advance to a step #46. If not, then return to the step #30, recycling the automatic loading operation.

Step #46: Since the fourth blank frame of film has been wound up, the second motor M2 is stopped.

Step #47: Display that the automatic loading is complete. After that, the jump to the step #22 occurs.

Steps #48 to #53: This sequence determines transition of the operation of the film drive mechanism from one mode to the other. In the step #48, the second motor M2 is once stopped from rotation in the windup direction.

Step #49: Wait 100 milliseconds for the termination of inertial rotation of the motor M2.

Step #50: Energize the motor M2 to rotate in the reverse direction (the clockwise direction of the sun gear 406 in FIGS. 8 and 9(b)).

Step #51: Maintain the energization for 100 milliseconds until the position of FIG. 9(c) is reached.

Step #52: Stop the reverse rotation of the motor M2.

Step #53: Wait 100 milliseconds for the termination of inertial rotation of the motor M2. After that, return to the step #28, initiating the fourth cycle of winding operation in the auto-load mode.

In more detail, the second motor M2 starts to rotate in the normal direction again. For now, the rotation of the motor M2 is not transmitted to the sprocket 402 as shown in FIG. 9(d), but only to the spool 401. With the sprocket 402 rendered freely rotatable, therefore, if, as the film 52 is actually moved in the windup direction with its perforations 54 in engagement with the teeth of the sprocket 402 by virtue only of the rotating spool 401, the sprocket 402 is driven to rotate, it implies that the automatic loading is successful. If the sprocket 402 stands still, determination can be made that the automatic loading has failed due to, for example, improper convolution of the film leader 54 on the spool 401.

A charging-in-part subroutine is next described by reference to a flow chart of FIG. 13C. Jump to this subroutine occurs not only from the automatic loading one described in connection with FIG. 13B, but also from a rewinding one to be described with reference to FIG. 13E.

Step #37-2: Energize the first motor M1 t rotate in the formal direction (the counter-clockwise direction along with the sun gear 104 in the same direction as shown in FIG. 3(a), 3(b) and 5(a)). Hence the mirror starts to move upward.

Step #54: Start a timer TR2 which counts the time of current supply to the first motor M1.

Step #55: Wait 15 milliseconds. Otherwise, a chattering will affect.

Step #56: Check the input port P11 (the signal at the output of the track 162 of the position detector shown in FIGS. 3 and 4). This signal changes its level depending on the difference between the phases of rotation of the mirror drive gear 120 and the shutter charging gear 140 (or the cams 121 and 141 respectively), as the sliding brush 122 across the first track 161 always grounded, and the second track 162 moves rotatively.

In more detail, when the charging of the shutter is complete (leaving the mirror 70 in the down position), the potential at the input port P11 changes from the initial level to the ground level, in other words, turns on. When the upping of the mirror 70 is complete, it changes from the ground to the initial level, or turns off.

And, this step #56 is made followed by a step #60 in response to completion of the mirror-up, or by a step #57 if the upping of the mirror is in progress.

It is to be noted here that the signal at the input port P11 when in combination with a signal at the input port P12 plays another role. In this connection, an explanation should be made. The input port P12 receives the signal from the overrun detecting track 163 in FIGS. 3 and 4. Depending on its level, whether or not the distance the first motor M1 has overrun after the completion of charging of the shutter or the completion of upping of the mirror (during the time from the moment at which the motor M1 has been deenergized to the moment at which it stops) falls within the respective one of the prescribed allowable maximum ranges can be determined. So, if the potential at the input port P12 remains the initial level or off at a time when the charging of the shutter is complete, the actual overrunning is determined not to have exceeded the limit. Otherwise, or if a change from the initial to the ground level occurs, the fact that the shutter charge mechanism has excessively overrun can be detected. Also, if the input port P12 remains on at a time when the upping of the mirror is complete, the overrun distance is determined to have fallen within the range. Otherwise, occurrence of excessive overrunning can be detected.

Under the normal conditions, for the time of completion of the charging of the shutter (with the mirror in the down position) the input ports P11 and P12 are on and off respectively; for a time soon after the start of upward movement of the mirror 70, both of them are on; for the time of completion of mirror upping (with the release of the shutter from the charging connection) they are off and on; and for an intermediate time during the charging operation of the shutter (with the downward movement of the mirror 70), both of them are off.

Step #57: Check the timer TMR2 that has been counting the time from the start of current supply to the first motor M1. If it has passed 500 milliseconds, then branch to a step #58. Otherwise, the step #56 is repeated.

Step #58: Since the mirror is not capable of reaching the uppermost position within the prescribed time, for it is taken as an accident, the energization of the motor M1 is stopped.

Step #59: Display the accident and jump back to the step #22.

Step #60: Since the upping of the mirror has been completed, for, as the exposure is terminated, it is moved downward, or charging of it with the shutter is carried out, the timer TMR2 is reset and started.

Step #61: Since, as has been described in connection with the step #56, the input port P11 becomes on in the phase of the mirror down (the completion of charging of the shutter), the input port P11 is checked here. If the mirror is in the down position (with the completion of charging of the shutter), then advance to a step #63. Otherwise, branch to a step #62.

Step #62: Check the timer TRM2. If the time from the start of current supply to the first motor M1 has passed 1 second, then advance to a step #58. Otherwise the step #61 is repeated.

Step #63: Since the charging of the mirror and the shutter has normally been completed, the energization of the first motor M1 is stopped. Then jump back to the step #22. Thus, the charging-in-part subroutine exits.

A rewind subroutine is next described by reference to a flowchart of FIG. 13D. Jump to this subroutine occurs not only from the mainline at the time of actuation of the rewind-release button 14, but also from a subroutine for automatically switching the camera from the windup to the rewind mode when the film is tensioned.

Step #64: Clear the flags A and C which are to be used in those of the steps which follow a step #65.

Step #66: Check the battery voltage BAT. The manner is similar to that described in connection with the step #26 in the AL subroutine. So, a more detailed explanation is omitted here. If it is above the satisfactory operating level, then advance to a step #68. Otherwise branch to a step #67.

Step #67: display the warning signal that the battery voltage BAT has fallen, and jump back to the step #22. Thus, the automatic rewinding is prohibited.

Step #68: Check if the mirror lies right in the down position or the charging of the shutter is complete. If so, then advance to a step #76. If the mirror is stopping somewhere away from the right down position, or the charging of the shutter is interrupted, then branch to a step #69.

Step #69: start rotation of the first motor M1 in the normal direction to bring the mirror and shutter to the fully charged positions.

Step #70: Start the timer TMR2 to count the time of current supply to the first motor M1.

Step #71: Check the input port P11. For, as has been described in connection with the step #56, the switch for the input port P11 turns off in synchronism with the mirror down (completion of the charging of the shutter), when the downward moving of the mirror (the charging of the shutter is complete, the next step #75 follows. If it is not yet completed, then branch to a step #72.

Step #72: Check the timer TMR2. If the time from the start of energization of the first motor M1 has passed 1 second, then branch to a step #73. Otherwise, the step #71 is repeated.

Step #73: Since the charging of the mirror has not been completed in 1 second, for it is taken as an accident, the energization of the first motor M1 is stopped.

Step #74: Display the accident and jump back to the step #22. Thus, the automatic rewinding does not proceeds.

Step #75: Stop the first motor M1 since the charging of the mirror and shutter is normally completed. Thus, the rewind drive mechanism is readied to operate.

Step #76: Start rotation of the second motor M2 in the reverse direction in order that the spool side planetary gear 411 escapes from the engagement with the spool side transfer gear 409 shown in FIG. 9(d) or that the spool 401 is freed from the drive connection.

Step #77: Wait 100 milliseconds in order to insure that the spool side planetary gear 411 is out of that engagement.

Step #78: Start rotation of the first motor M1 in the reverse direction. Simultaneous rotation of the sun gear 104 in the clockwise direction shown in FIG. 5(b) brings the planetary gear 105 into engagement with the rewind gear 201, thereupon the film starts to be rewound.

Step #79: Start the first timer TMR1 to count the time of current supply to the first motor M1.

Step #80: Check the flag A that is memorizing the previous state of the input port P9.

The value of the flag A=0 or 1 represents that the memorized previous state of the switch for the input port P9 is on or off respectively. For note, the signal appearing at the input port P9 is, as has been described above, pulsated at a frequency, for example, 12 times per one frame of film, as the sprocket 402 is rotating. If such a pulsation goes on, the second microcomputer M2 determines that the film leader does not yet come on the sprocket 402. Otherwise, it detects when the film is all rewounded. If A=1, then branch to a step #83. If A=0, then advance to a step #81.

Step #81: Compare the present state of the input port with the previous one. If they differ, then advance to a step #82. Otherwise, branch to a step #86.

Step #82: Change the flag A to 1.

Step #83: Similarly to the step #81, compare the present state of the input port P9 with the previous one. If they differ, then advance to a step #84. Otherwise, branch to a step #86.

Step #84: Change the flag A to 0 again.

Step #85: Reset and stat the first timer TMR1.

Step #86: Check the first timer TMR1. If 350 milliseconds have passed before the input port changes, for it is taken as a stoppage o the sprocket 402, then branch to a step #87. Otherwise, advance to a step #90.

Step #87: Stop the current supply to both first and second motors M1 and M2. After that, advance to a step #88.

Step #88: Check if the film all has been rewounded. For this purpose, the content of the frame counter is checked. If it is 0, a jump to the before-described charging-in-part subroutine. If it is higher than 0, then advance to a step #89.

Step #89: Display a warning signal that the film gets stopped from being further rewound, and jump back to the step #22. Thus, the rewinding operation is automatically interrupted.

Step #90: Check the flag C. The value of the flag C=0 or 1 represents that the memorized previous state of the switch for the input port P10 is on or off respectively. For note, this switch in cooperation with the sprocket 402 turns on each time the film moves to the end of one frame past it, and off at the start of the next frame. If C=0, then advance to a step #92. If C=1, then branch to a step #93.

Step #91: Compare the present state of the input port P10 with the previous one. If they differ, then advance to a step #92. Otherwise, skip the step #92 and return to the step #80. Thus, the rewinding continues within the same frame of film.

Step #92: Change the flag C to 1, and jump back to the step #90. Thus, the rewinding continues moving the present frame of film past the sprocket 402.

Step #93: Compare the present state of the input port P10 with the previous state. If they differ, then advance to a step #94. Otherwise, the loop beginning with the step #80 is repeated.

Step #94: Change the flag C to 0.

Step #95: Since the signal at the input port P10 changes from off to on, for the distance the film has moved in the rewinding direction reaches the length of one frame, that register in the memory which has a digit or digits representing the number of frames of film left not rewound yet is decremented one. After that, return to the step #80. Such a procedure repeats itself until the content of that register decreases to zero.

We next describe a subroutine for camera release by reference to a flowchart of FIGS. 13E(1) to 13#(3). Jump to this subroutine occurs from the mainline when the shutter button 12 is actuated.

Step #96: Communicate with the second A/D converter AD2 and read in the output of the light metering circuit in digital form.

Step #97: Display an exposure value, i.e. the computed value of shutter time or aperture size based on the object brightness.

Step #98: Check the battery voltage. If it is above a critical level, then advance to a step #100. Otherwise, branch to a step #99. The term "critical" herein used means whether or not the battery BAT is capable of releasing the camera. This level is set to, for example, 3 volts. Therefore, if the actual battery voltage $V_O$ is equal to or higher than 3 volts, then advance to the step #100. Otherwise, branch to the step #99.

Step #99: Display a warning signal that the battery voltage has dropped.

Step #100: Compare the battery voltage with a reference level taken at, for example, 4 volts. If it is higher than this level, then advance to a step #101. Otherwise, branch to a step #102. For the voltages between the critical and reference levels or 3 and 4 volts, through the camera can be released, but the starts of energization of any two of the three motors M1 to M3 must be displaced in time. Or otherwise the required accuracy of motor control could not be assured.

Step #101: Set the flag E to 1 representing that the actual battery voltage is high enough.

Step #102: Set the flag E to 0 representing that it is somewhat low.

Step #103: Start energization of the first motor M1 to move the mirror upward.

Step #104: Start the second timer TMR2 to count the time of current supply to the first motor M1.

Step #105: Wait 15 milliseconds until the rush current at the start of current supply disappears.

Step #106: Check if the actual battery voltage is high enough or E=1. If so, then advance to a step #108. If E=0, then branch to a step #107.

Step #107: Wait 15 milliseconds to recover a rush current when the voltage is somewhat low.

Step #108: Output a signal of high level from the port P23 to supply current to the third motor M3 for the diaphragm in the lens mounting. After that, the second microcomputer MC2 gives the third one in the lens mounting the command of closing down the diaphragm to a position for the computed aperture value.

Step #109: Check the input port P11. If the upping of the mirror is complete, then advance to a step #111. Otherwise, branch to a step #110.

Step #110: Check the second timer TMR2. If 500 milliseconds have passed from the start of energization of the first motor M1, then branch to a step #112. Otherwise, return to the step #109 and wait for the completion of upping of the mirror.

Step #112: Since the upping of the mirror has not been completed in 500 milliseconds, for it is taken as an accident, the energization of the first motor M1 is stopped.

Step #113: Display a warning signal of the accident and jump back to the step #22. Thus, the actuating of the camera release is interrupted.

Step #111: Stop the energization of the first motor M1, since the input port P11 becomes off as the upping of the mirror is completed (the shutter is released from the connection with the charge mechanism).

The following discussion is made in the recourse to steps #200 to #203, for it is assumed that the first motor M1 has overrun a longer distance than the prescribed limit after the upping of the mirror was completed.

Step #200: Wait 3 milliseconds necessary for the maximum acceptable overrunning to take.

Step #201: Check the input port P12. As has been described in detail in connection with the charging-in-part subroutine (FIG. 13C), if the overrun distance after the completion of upping of the mirror falls within the prescribed range, or the input port P12 is on, then advance to a step #114. Hence, this subroutine goes straightforward, as it is normal. If the overrun distance exceeds the prescribed limit, or the input port P12 becomes off, then branch to a step #202 to avert the abnormal condition. Here, we explain about what problem arises when the prescribed range of overrun distances is exceeded In this case, the mirror drive gear 120 is caused to further rotate in the clockwise direction past the position of FIG. 3(b). At the worst, the sliding contact of the mirror drive lever end 131 on the flat camming surface 121b is broken, and this end 131 gets contact with the downward cammming surface 121c. Hence it happens that the mirror returns to the down or viewing position, hindering the film 52 from being exposed correctly.

Step #202: Re-energize the first motor M1 to rotate in the normal direction. Thereby, the mirror drive gear 120 rotates again in the clockwise direction, permitting the mirror 70 to once return to the down position by the action of the mirror drive cam 121 in cooperation with the mirror drive lever 130. And, continuously it moves upward again. Also, the shutter charge gear 140 rotates again in the counter-clockwise direction, rotating the shutter charge lever 150 in the charging direction and releasing it from the connection with the shutter drive mechanism. For note, even though the shutter charge lever 150 turns, the shutter unit 300 is charged only in vain and given no bad influence.

Step #203: Wait 50 milliseconds necessary for the brush 122 to move over at least the length of the operation end detecting pattern in the track 162 shown in FIG. 4 by the recycling of the operation of the first motor M1. And, after that, return to the step #109 again. When the upping of the mirror is complete, or the input port P11 is off, the rotation of the first motor M1 is stopped in the step #111. If, in this state, the overrun distance falls with in the prescribed range, then advance to the step #114.

Step #114: Communicate with the third microcomputer MC3 in the lens mounting, and test if the diaphragm blades 530 have been closed down to the prescribed position. If so, then advance to a step #115. Otherwise, this step is repeated until that position is reached.

Step #115: Output a signal of high level for 10 milliseconds from the port P13 to energize the solenoid 383 controlling the leading curtain of the shutter. As it has run down, an exposure operation of the film is initiated.

Step #116: Wait for the termination of duration of the shutter time.

Step #117: Output a signal of low level for 10 millisecond from the port P14 to energize the solenoid 389 controlling the trailing curtain of the shutter. Thereby, the exposure operation of the film is terminated.

Step #118: Test if the switch SCN2 responsible for the completion of running down of the trailing curtain is on. If not so, then stay in this step and wait until it turns on. If so, for it implies that the trailing curtain has run down, then advance to a step #119.

Step #119: Check the flag E that is memorizing the high or low state of the voltage. If it is high, then skip steps #120 to #122. If it is somewhat low, then advance to the step #120.

Step #120: Check the voltage again. This voltage checking has a similar significance to that in the step #100. If the voltage is higher than the reference level (4 volts), then advance to the step #121. Otherwise, branch to the step #122. The voltage checking is performed with the use of the leading and trailing curtain control solenoids MG31 and MG32 as the load. The behavior of the voltage during the current supply period of 10 milliseconds is checked.

Step #121: Set the flag E to 1 to indicate that the voltage is high.

Step #122: Set the flag E to 0 to indicate that the voltage is somewhat low.

Step #123: Start energization of the first motor M1 to return the mirror and charge the shutter.

Step #124: Start the second timer TMR2 to count the time of current supply to the first motor M1.

Step #125: Wait 15 milliseconds until the rush current at the start of the current supply to the motor M1 disappears.

Step #126: Check the flag E that is memorizing the high or low state of the voltage. If the voltage is high, then advance to a step #128. If it is somewhat low, then branch to a step #127.

Step #127: Wait more 15 millisecond for the recovery of the rush current because the voltage is somewhat low.

Step #128: Command the third microcomputer MC3 in the lens mounting that the diaphragm blades be returned to the full open position.

Step #129: Communicate with the third microcomputer MC3 in the lens mounting and check if the diaphragm has reached the full open position. If the diaphragm blades 530 are at full open aperture, then advance to a step #130. If not, return to the step #129 and wait for the full opening of the diaphragm.

Step #130: Energize the second motor M2 to the normal direction of rotation in order to wind up the film by one frame.

Step #131: Start the first timer TMR1 to count time of current supply to the second motor M2.

Steps #132 to #135: Clear the discrimination flags to be used in the following treatment to A=0, B=0, C=0 and F=0.

Step #136: Check the input state of the input port P11. If the input state is on, for it implies that the downward moving of the mirror and the charging of the shutter are complete, then advance to a step #137. If not, for the downward moving of the mirror is not complete yet, then branch to a step #142.

Step #137: Stop the first motor M1 since the downward moving of the mirror and the charging of the shutter are complete.

Step #138: Check the flag B that is memorizing whether the first motor M1 for the mirror drive (shutter charge) is operating alone or together with the second motor M2 for the wind up. If the flag B is 0, then advance to a step #151. If it is 1, then branch to a step #139.

Step #139: Set the condition flag B to 0.

Step #140: The fact that the condition flag B was 1 means that the windup or second motor M2 has been stopped for a time. In this step, therefore, energization of the windup or second motor M2 is started again.

Step #141: Restart the timer TMR1 that is counting the time of current supply to the windup or second motor M2. After that, branch to a step #151.

Step #142: Check the timer TMR2 that is counting the time of current supply to the mirror drive or first motor M1. If 1 second has passed, then advance to a step #143. If not, then branch to a step #145.

Step #143: Since 1 second has passed before the mirror drive or first motor M1 moves the mirror to the down position or completes the charging of the shutter, the windup or second motor M2 is once stopped, leaving the first motor M2 operative alone. Thus, the downward moving of the mirror and the charging of the shutter are first carried out. If, at this time, the windup or second motor M2 has already stopped, then branch to a step #146.

Step #144: Check the flag E that is memorizing the high or low state of the battery voltage BAT. If the voltage is high, then branch to a step #146.

Step #145: Check the condition flag B. If it is 1, or the mirror drive or first motor M1 is in operation, then return to the step #136, and wait until the downward moving of the mirror is complete. If the condition flag B is 0, or the windup or second motor M2, too, is at the same time in operation, then branch to a step #204.

Step #146: Stop energization of the windup or second motor M2 and the mirror drive or first motor M1.

Step #147: Display the accident since the charging has been interrupted.

Step #148: Once stop the windup or second motor M2, since the simultaneous driving of the windup or second motor M2 and the mirror drive or first motor M1 has been impossible.

Step #149: Reset and start the timer TMR2 to count the time of current supply to the mirror drive or first motor M1.

Step #150: Set the condition flag B to 1 to memorize that the energization of the windup or second motor M2 is stopped, because the simultaneous driving of the two motors M1 and M2 has been impossible. After that, return to the step #136, and continuously carry out detection of the completion of downward moving of the mirror (charging of the shutter).

Step #204: Check if the mirror drive (shutter charge drive) or first motor M1 is in operation. If it stands still, then advance to a step #151. If it is operating, then branch to a step #154. This step is followed by steps #205 to #208 constituting an abnormal condition averting sequence. In this sequence, when the condition is abnormal, the mirror drive or first motor M1 is made rotate more one revolution with the result that the termination of operation of the windup or second motor M2 precedes the termination of operation of the first motor M1. To avert this problem, the steps #205 to #208 are inserted.

Step #151: Check if the windup or second motor M2 is in operation If so, then advance to a step #154. If not, then branch to a step #152.

Step #152: Check the memory F in which is stored information representing what number of times the input signal of the input port P9 has changed over between on and off during the time when the film is advanced one frame. If it is no more than 4, for it is taken that in the preceding cycle of winding operation at a time just after (or when) the second motor M2 was stopped by the signal (the input port P10) representing the termination of one cycle of winding operation, the film was tensioned, and that it is in a stage where the driving force of the second motor M2 disappeared that the sprocket 402 was driven to slightly rotate backward or in the rewind direction, then jump to the rewind mode (step #64) described before. Meanwhile, if the on-off changing signal has entered 4 or more times, then branch to a step #205.

The significance of this step #152 is more concretely described below.

The entire length of film 52 differs with different manufacturers and from cartridge to cartridge. For example, the 24-exposure cartridges have generally 25 frames available for exposure, as is well known publicly. Even in one and the same cartridge, this number of frames is caused to vary as the distance the film is advanced in vain varies when the loading is automatically performed. It is also known that the film 52 itself, because of its base being formed to a very thin sheet of synthetic resin, when pulled will stretch to some extent. Accordingly, even if the winding-up of the film 52 by one frame near the filming end has succeeded, it might actually have often occurred that the film 52 started to tension somewhat earlier than the completion of that cycle of winding operation as the film 52 convoluted on the supply spool 51 in the cartridge 50 was all transported toward the takeup spool 401 so that regardless the takeup spool 401 would further more wind up the film 52, no more area of the film 52 could not be pulled out of the cartridge 50. From this reason, there will probably be a case that the performance of the last cycle of winding operation becomes possible due to the stretching of the film 52. For such a case, when the second motor M2 has stopped and the driving torque on the takeup spool 401 has lost, the film 52 is permitted to shrink by its own recovering force, while driving the sprocket 402 to slightly rotate backward by its pawls engaging in the perforations 54 of the film 52. When to carry out the next cycle of winding operation, therefore, according to the prior art, it resulted before its start that the signal representing the completion of one cycle of winding operation entered the input port P10, despite no correct cycle of winding operation had actually been carried out. In the conventional program, it then followed that, even in such a situation, the shutter could be released. This led to make unintentional double exposure Another problem of the prior art is that the tensioning of the film was detected only after the winding operation had been recycled a number of times whatever.

To eliminate the above-described problems, in the embodiment of the invention, the step #152 is introduced. With this, when to wind up the film, even after the signal representing the completion of one cycle of winding operation has been produced and the control for stopping the second motor M2 has been made, if the number of times the signal at the input port P9 changes on and off does not reach the prescribed value (which, though, in this instance, having been set to 4, may theoretically be otherwise determined provided that it is fewer than the number of times per one frame under the normal winding up condition), for it is judged that the film 52 has already tensioned, a jump to the auto-rewind mode (step #64) occurs.

Next, explanation is made about the case in which the overrun distance of the first motor M1 after the completion of charging of the shutter (downward moving of the mirror) exceeds the prescribed limit in steps #205 to #208.

Step #205: Check the input port P12. As has been described in detail in connection with the blank charge sequence (FIG. 13C), if the overrun distance after the completion of the shutter charge (the mirror down) is in the prescribed range, or the input port P12 becomes off, then advance to a step #153 with which the normal sequence begins. But, if the overrun distance exceeds the prescribed limit, then branch to a step #206 with which an abnormal condition avert sequence begins.

Here, a problem arising from the excess of the overrun distance beyond the prescribed range is explained. That is, a situation is encountered that the mirror drive gear 120 further rotates from the position of FIG. 3(a) in the clockwise direction. In the worst case, one end portion 131 of the mirror drive lever 130 comes to contact with the upward camming surface 121a of the mirror drive cam 121, thereby the mirror 70 is turned in the up direction (toward the non-viewing position). Therefore, no proper finder observing state can be obtained. Another problem is produced that the light coming from the object to be photographed is not correctly incident on a photosensitive element for AF (automatic focusing). Also, it is natural that the shutter charge gear 140, too, further turns in the counter-clockwise direction. In the worst case, the sliding contact of the roller 151 of the shutter charge lever 150 on the flat camming surface 141b of the shutter charge cam is broken, and the roller 151 acts on the downward camming surface 141c, causing the shutter charge lever 150 to turn in the charge releasing direction (clockwise direction) which in turn causes the shutter to be released from the latching connection with the charge lever 302 in the shutter unit 300. As a result, an additional problem arises that the anti-shock enduring capability of the shutter unit 300 is lowered.

Step #206: Energize the first motor M1 to rotate in the normal direction. Thereby the mirror drive gear 120 is rotated in the clockwise direction again, moving the mirror 70 first upward by the sliding engagement of the mirror drive lever 130 on the mirror drive cam 121, and then continuously changing its movement to the downward direction. Also, the shutter charge gear 140, too, rotates in the counter-clockwise direction again, releasing the shutter charge lever 150 from the charging connection, and turning it to charge. Yet, even if, in this state, the shutter charge lever 150 turns, no bad influence is given to the shutter unit 300.

Step #207: Wait 15 milliseconds necessary for the brush 122 shown in FIG. 4 to just move away from the operation end detecting pattern 162 since the first motor M1 is operated again.

Step #208: Reset and start the timer TMR2 to count the time of current supply to the first motor M1 for mirror drive (shutter charge).

And, return to the step #136 and the operation that follows the step #136 is performed again.

Step #153: Send the display data that let the completion of one-frame winding-up and the termination of the correct charging operation of the shutter be displayed to the DR of the IC for display drive, and branch to the step #22. Thus, the procedure ends.

Step #154: Check the flag A that stores the previous state of the input port P9. When the flag A is 0, the previous state of the switch memorized in the state of the input port P9 is "on". When the flag A is 1, the previous state of the switch memorized in the state of the input port P9 is "off". For note, the signal to be applied to the input port P9, as has been described above, repeats on and off a plurality of times (for example, 12 times) during the time when the film is wound up one frame. If the on-and-off signal is being repeated, the microcomputer MC2 judges that the sprocket 402 is rotating. If the on-and-off repeating signal is stopping. The microcomputer MC2 judges that the sprocket 402 has stopped. In the step #154, if the flag A is 1, then advance to a step #157. If the flag A is 0, then branch to a step #155. Since the flag A has been set to 0 in the step #132 just after the transportation sequence started, the branch to the step #155 occurs.

Step #155: Compare the present state of the input port P9 with the previous one. If they differ, then advance to a step #156. If they do not differ, then branch to a step #161.

Step #156: Change the flag A to 1 since the input state of the input port P9 has changed.

Step #157: Similarly to the step #156, compare the present state of the input port P9 with the previous one. If they differ, then advance to a step #158. If they do not differ, then branch to a step #161.

Step #158: Change the flag A to 0, since the input state of the input port A has changed.

Step #159: Reset and start the timer TMR1 to count the time of current supply to the second motor M2.

Step #161: Check the timer that is counting the time of current supply to the second motor M2 because there has been no change in the input port P9. If the input port does not change in 350 milliseconds, for it is taken that the the sprocket 402 has stopped, then to a step #167. If the period of 350 milliseconds has not passed yet, then to a step #162.

Step #160: Increment the memory F that is memorizing the number of times the signal at the input port P9 has repeated the on-and-off changeover since the input state of the input port P9 has changed.

Step #162: Check the flag C that stores the previous state of the input port P10. When the flag C is 0, the previous state of the switch memorized in the input port P10 is "on". When the flag C is 1, the previous state of the switch memorized in the input port P10 is "off". For note, the signal to be applied to the input port P10 is responsible for motion of the sprocket 402. When each cycle of winding operation has terminated, the switch turns on. Also, as soon as the next cycle of winding operation starts, it turns off. At the termination of this cycle, it also turns on. Therefore, by the microcomputer MC2 detecting this signal, the control of winding up the film one frame becomes possible. In the step #162, when the flag C is 1, then to a step #165. When the flag C is 0, branch to a step #163. Since, just after the winding operation started, the flag C has been set to 0 in the step #134, branch to a step #163.

Step #163: Compare the present state of the input port P10 with the previous one. If they differ, then to a step #164. If they do not differ, then return to the step #136, and continuously carry out the mirror down and winding end detection.

Step #164: Change the flag C to 1, since the input state of the input port P10 has changed. After that, return to the step #136 and continuously carry out the mirror down (shutter charge completion) and windup completion detection.

Step #165: Compare the present state of the input port P10 with the previous one. If they differ, then to a step #166. If they do not differ, then return to the step #136.

Step #166: Since the signal of the input port P10 has changed over from off to on, for one cycle of winding operation has terminated, stop the current supply to the second motor M2, and increment the frame counter.

Step #167: When the first motor M1 is being supplied with current, to a step #168. When it is stopping, then branch to a step #169.

Step #168: Check the flag E that is memorizing the high or low of the voltage. If the voltage is high, them to a step #169. If the voltage is somewhat low, then return to the step #148 to step the simultaneous current supply to the motors M1 and M2.

Step #169: Stop the current supply to the motors M1 and M2, and jump to the rewind sequence described above.

Step #175: Check the flag Z of the E²PROM to determine whether automatic rewinding is to be carried out or inhibited. If the flag Z is 1, then branch to the above-described rewind sequence to carry out the automatic rewinding. Meanwhile, if the flag Z is 0, for the automatic rewinding is inhibited, then return to the step #22.

The foregoing is the flow of sequences for simultaneously performing the releasing, film transportation, shutter charging and mirror driving.

Next, a flowchart of the lens microcomputer MC3.

Figure 14:
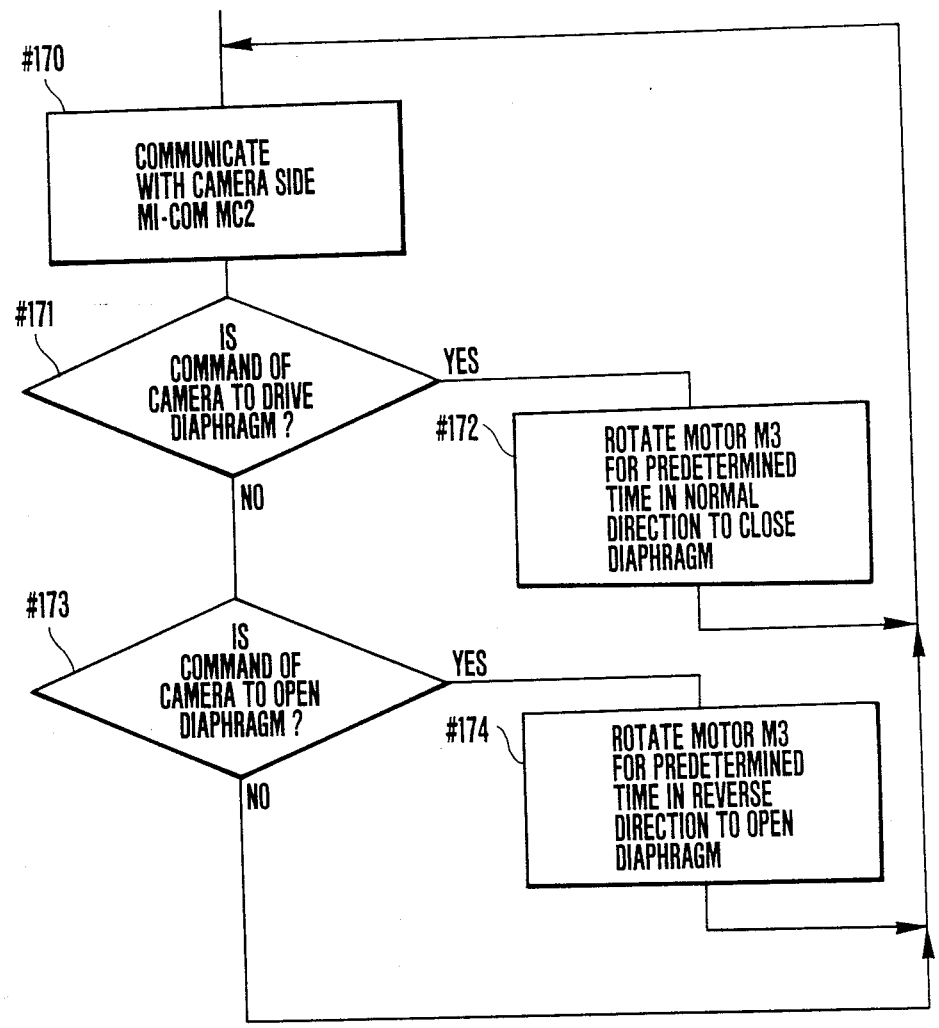
FIG. 14 is another subroutine flowchart for the operation of FIG. 11.

FIG. 14 is the flowchart of the microcomputer MC3 of the lens side.

Step #170: Communicate with the camera side microcomputer MC2.

Step #171: Test if the result of communication with the camera side microcomputer MC2 is the diaphragm drive command from the camera side. If so, then to a step #172. If not so, then branch to a step #173.

Step #172: Energize the third motor M3 for the diaphragm blade drive to rotate in the normal direction (the counter-clockwise direction in FIG. 10) and close down the diaphragm to the prescribed position. Since the aperture value has been sent at the time of communication from the camera side, the current supply may be maintained only for the corresponding time to the aperture value. Also, as the third motor M3 use may be made of a stepping motor or the like in combination with the drive signal in the form of a prescribed number of pulses.

Step #173: Test if the result of communication with the camera side microcomputer is the diaphragm full open command from the camera side. If so, then to a step #174. If not so, then return to the step #170, and wait for the next command of the camera side microcomputer MC2.

Step #174: Energize the third motor M3 for the diaphragm blade drive for a predetermined time to rotate it in the reverse direction (clockwise in FIG. 10) and open the diaphragm fully. After that, return to the step #170 and wait for the command of the camera side microcomputer MC2.

The foregoing constitutes the flowchart of the lens microcomputer MC3.

Here, about the camera sequence in the embodiment of the invention, an outline sequence under the normal condition is explained.

By inserting a new film cartridge 50 into the camera housing and closing the back cover 430, the autoloading starts. That is, at first, the second motor M2 for windup is rotated in the normal direction by about 3 frames. In this state, the spool 401 and the sprocket 402 both are rotated by the second motor M2 as the drive source to send the film leader portion 56 to the spool 401 and at the same time convolute it. After that, for once, the above-described second motor M2 is rotated in the reverse direction to change over the clutch to free the sprocket 402 and to change over to the spool drive. And, again for about one frame, the second motor M2 is rotated in the normal direction to check whether or not the auto-loading has succeeded. That is, by rotating the spool 401 in the state of sprocket free, if the sprocket 402 is driven to rotate by the film 52, the fact that the leader portion 56 of the film 52 is convoluting on the spool 401 can be ascertained, and the auto-loading can be determined to be successful. Until this, the film bank frame advance for auto-loading ends, and the rotation of the second motor M2 for windup stops. Thus, the camera waits for actuation of the next release.

By operating the release button 12, the first motor M1 for the mirror drive and shutter charge is rotated in the normal direction for a prescribed time to move the mirror upward and at the same time render the shutter unit 300 in the charge release state where the charge lever 302 which has so far played the latching function of preventing the shutter from accidentally running down is moved to release the latching. Also, at almost the same time, the third motor M3 for diaphragm drive is rotated in the normal direction for a prescribed time to carry out the closing down of the diaphragm to the computed value. And, the coil 383 of the leading curtain control electromagnet is supplied with current to run down the leading blade group 352 to initiate an exposure. After the preset value of time, the coil 389 of the trailing curtain control electromagnet is supplied with current to run down the trailing blade group 351 to terminate the exposure.

After the exposure end has been ascertained, the above-described first motor M1 is rotated again in the normal direction or the same direction as that when in the mirror up for a prescribed time, thereby the movable mirror 70 is moved downward (to the finder observing position) and the shutter unit 300 is driven to be charged. At the same time, the charge lever 302 for preventing the above-described accidental running down of the shutter is held in the latching position Also, at almost the same time, the second motor M2 for windup is rotated in the normal direction by one frame of winding up. Further, the third motor M3 for diaphragm drive is rotated in the reverse direction to return the diaphragm to the full open state. In this state, the next release actuation is waited.

And, the exposure operation based on the abovedescribed release operation is repeated. When all the frames of film have been exposed, as the film 52 is tensioned at a time during the winding up, this state is detected by the stoppage of rotation of the rotary disc 420 rotating in drive connection with the sprocket 402. Then, the first motor M1 for mirror drive and shutter charge is rotated in the normal direction until the downward moving of the mirror and the charging of the shutter are complete. And, after the second motor M2 for windup has once stopped, it rotates in the reverse direction to cut off the transmission system between the second motor M2 and the spool 401. Because the spool 401 is freed, the rewind load is reduced. And, the first motor M1 which has so far been used for the mirror drive and shutter charge is for now rotated in the reverse direction to change over the transmission system of the first motor M1 from the mirror drive and shutter charge transmission system which has so far been used to the rewind transmission system. Subsequently, the rewind gear 201 of the rewind transmission system is rotated in the rewind direction. By the rewind end, the film 52 all returns into the cartridge 50 with the film leader portion 56 only left out of the cartridge 50 to some length. At this, the driven rotation of the sprocket 402 by the film 52 stops. Upon detection of this, all the operations including the first motor M1 are stopped to terminate the camera sequence.

What is first characteristic of the above-described embodiment is that independent two electric motors of each other are provided of which the first M1 is assigned to the mirror-driving and shutter-charging, and the second M2 is to the film-winding-up, thereby it being made possible to improve the framing rate. Particularly in the charging (winding up of the film 52, and charging of the shutter unit 300) after the shutter has run down, concerning the film winding-up operation which usually takes the longest time, it is in the prior art that a common motor was used for winding up the film and charging the shutter. In this embodiment of the invention, the only duty of the second motor M2 is to wind up the film. Hence, this film winding-up operation can be completed in a very short time. Also, in this embodiment, mirror-up and mirror-down of the movable mirror 70, shutter charge driving of the shutter unit 300 and allowance of charge release can be carried out by rotating the first motor M1 in the same direction, and there is no need to reverse the rotation of that motor M1 for every one-frame shot. This feature, too, contributes to a large increase of the framing rate. It also implies that the changeover of the clutch for each shot is removed. Therefore, another advantage is produced that the operating sound becomes quiet. Further, each stop phase of rotation of this or first motor M1 in the same direction is set so that when the mirror up of the movable mirror 70 is completed (the exposure retracted position), the charge release of the shutter unit 300 results, and when the charging of the shutter unit 300 is completed, the mirror-down of the movable mirror 70 results (finder viewing position). Hence, only by the rotation of the first motor M1 in the same direction, the operations of the movable mirror 70 and shutter unit 300 in accurate coincidence with the camera sequence could be obtained.

Also, since the operations of the movable mirror 70 and the shutter unit 300 can be obtained only by the same directional rotation of the first motor M1, the reversed rotation of the first motor M1 can be used to do another task, that is, rewind driving of the film 52. Thus, an efficient allotment of the operations of the camera has been realized.

On the above-described increase of the efficiency of the task allotment, a little more detailed explanation will be added. The first motor M1 performs two main tasks depending on its direction of rotation. However, it largely differs from the prior art or the changeover of the rotation of the same motor for performing the tasks of swinging the mirror and winding up the film. That is, the prior known method is that the rotation of the motor is changed over in each one-frame shot to actuate the planetary clutch so that the two tasks are time-serially repeated. However, in this embodiment, the large different point is that the rotation of the first motor is not changed over for each shot of each one frame. It is at the filming end, generally speaking, at a time when all the film frames have been exposed, that the rotation of this or first motor M1 is changed over to actuate the clutch, and the clutch does not change over in each shot. Therefore, the first motor M1 is not subject to overwork due to the changeover between the normal and reverse directions of rotation, and a great increase of its life-time is achieved. Further, due to the removal of the clutch changeover, the operating sound particularly in the continuous shooting can be made quiet. Also, as a matter of course, the automatic transition to the rewind mode can be performed only by electrically changing the direction of rotation of the first motor M1. Thus, an improvement of the manageability, too, can be achieved.

Figure 15:
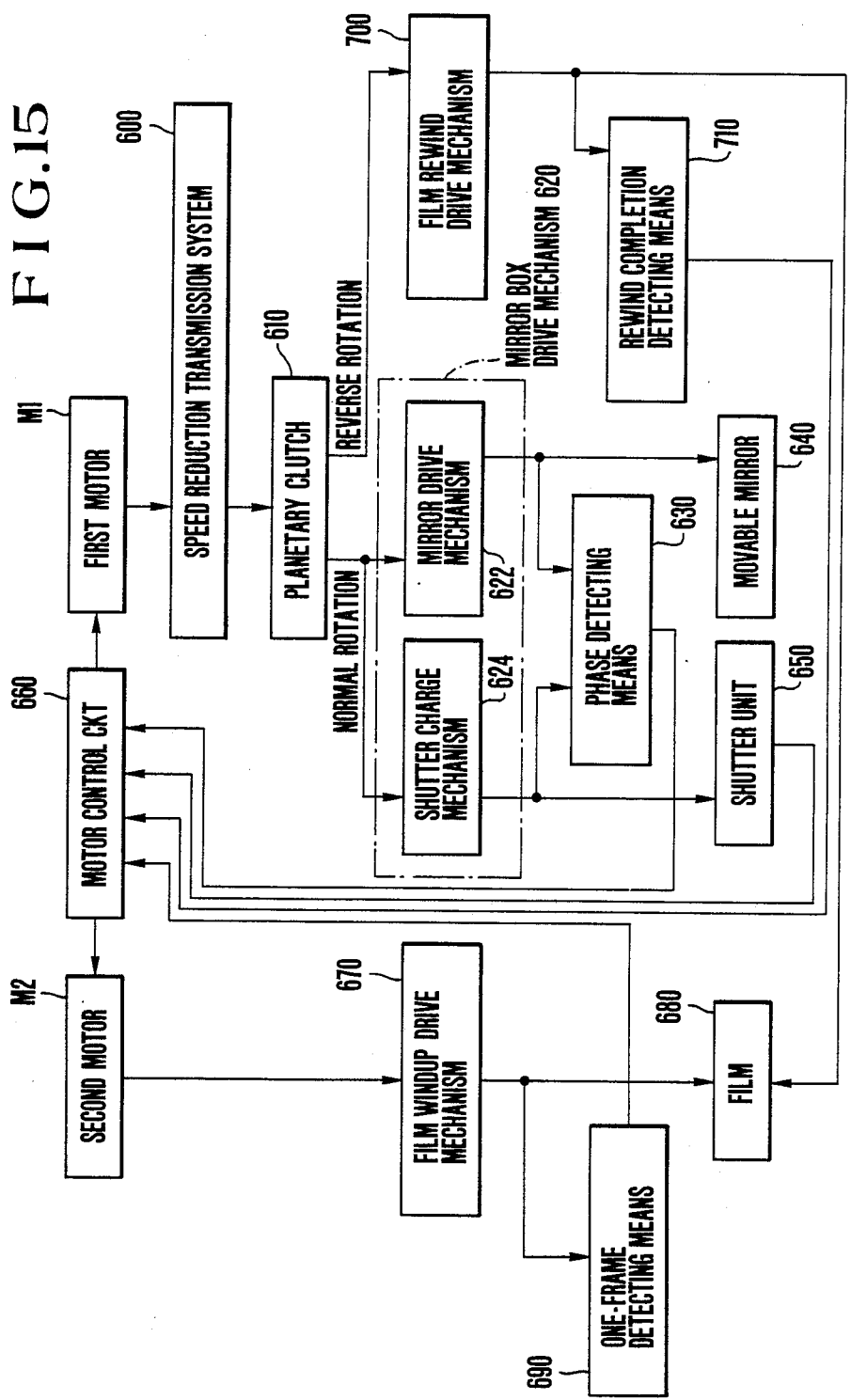
FIG. 15 is a block diagram taken to explain that operational feature which corresponds to one aspect of the invention.

Next, the first feature of the embodiment is explained about on the basis of the block diagram of FIG. 15. Rotation of the first motor M1 is adequately sped down by a speed reduction transmission system 600, and changing over between two transmission systems is carried out by a planetary clutch 610. That is, when the first motor M1 rotates in the forward direction, the planetary clutch 610 comes to engage with the transmission system of the mirror box drive mechanism 620. When in the reverse direction, the planetary clutch 610 comes to the transmission system of a film rewind drive mechanism 700. In such a manner, one of the transmission systems to be driven is selected depending on the direction of rotation of the first motor M1. Keeping up the discussion on assumption that the first motor M1 is rotating in the forward direction, the rotation of this or first motor M1 is transmitted to the mirror drive mechanism 622 and the shutter charge mechanism 624 in the mirror box drive mechanism 620.

The mirror drive mechanism 622 operates swing motion of the movable mirror 640, and the shutter charge mechanism 624 operates the charge driving and charge releasing of the shutter unit 650. The phase based on the operation of both mechanisms 622 and 624 is detected by a phase detecting means 630. The detection result of this phase detecting means 630 is supplied to a motor control circuit 660. Thus, the rotation and stoppage of the first motor M1 is carried out. Also, the mirror drive mechanism 622 and the shutter charge mechanism 624 are set up so that in the phase when the upward swing turn of the movable mirror 640 to the retracted position from the optical path to the exposure aperture is complete, the shutter charge release phase is obtained, and that in the phase when the running of the shutter is complete, the phase of completion of the downward movement of the mirror 640 to the finder viewing position is obtained.

Based on the actuating signal from the release button or like release start information, the motor control circuit 660 rotates the motor M1 in the forward direction. And, the forward rotation of the first motor M1 continues until, as the mirror-upping is completed, the movable mirror 640 reaches the retracted position detected by the phase detecting means 630. At that point in time, the stopping control of the first motor M1 is carried out by the motor control circuit 660. Also, in the stopped state of this or first motor M1, the shutter charge mechanism 624 reaches a phase that allows for the shutter charge release of a shutter unit 650. After that, the running of the shutter is carried out by the shutter unit 650.

When information representing that the running of the trailing blade group of the shutter has been completed is supplied to the motor control circuit 660, the control circuit 660 rotates the first motor M1 again in the same or forward direction. By this forward rotation of the first motor M1, the mirror drive mechanism 622 is driven again to move the movable mirror 640 downward, and the shutter charge mechanism 624 is also driven to charge the shutter unit 650. When the phase detecting means 630 detects the phase that the shutter charge mechanism 624 has completed the shutter charging operation, the motor control circuit 660 stops the first motor M1. For note, at this point in time, the movable mirror 640 completes its downward movement, taking the initial or finder-viewing position.

Up to the arrival of the next release start information, the first motor M1 continues stopping in this state. And, each time the next release start information comes on, the above-described sequence of operations is recycled.

Meanwhile, rotation of the second motor M2 is transmitted to the film windup drive mechanism 670 by which film 680 is transported in the windup direction. The rotation of this or second motor M2 is controlled by the motor control circuit 660. In more detail, when information representing that the trailing blade group in the shutter unit 650 has run is supplied to the motor control circuit 660, the second motor M2 is rotated to advance the film 680. When the winding up of the film 680 by one frame is completed, this state is detected by one-frame detecting means 690 and the detection result is supplied to the motor control circuit 660. The second motor M2 is then stopped. After that, each time the shutter unit 650 is opened and closed, the film windup drive mechanism 670 performs the winding up of the film 680 for each frame.

Next explanation is given to the case when the first motor M1 rotates in the reverse direction. The changeover of the rotation of the first motor M1 to the reverse direction is controlled by the motor control circuit 660. But, its condition is that a rewind signal due to the actuation of the rewind button and a stretch detection signal of the film 680 (the state of completion of exposure of all the film frames) generate. When the rotation of the first motor M1 is reversed by this motor control circuit 660, the planetary clutch 610 is automatically changed over to the film rewind drive mechanism 700 so that the rotation of the first motor M1 is transmitted to the film rewind drive mechanism 700 and the film 680 is transported to the rewinding direction. This film rewinding is continued until the state of completion of the rewinding of the film 680 is detected by the rewind completion detecting means 710. And, upon completion of the rewinding, the rewind completion detecting means 710 produces detection information. When it is supplied to the motor control circuit 660, the stop control of the first motor M1 is performed.

Also, what is secondly characteristic of the above-described embodiment is that the camera having the automatic rewind function can easily be altered in method to a camera capable of prohibiting automatic transition to the rewind mode. This change of method differs from that which results in an increase of the cost and size as, for example, a mechanical switch accessible from the outside of the camera housing is provided and the method is altered by the changeover of this switch. In this embodiment, use is made of a memory means in the non-volatile form of EEPROM capable of rewriting data to permit the user to write data of whether to allow or to prohibit automatic transition. This method has advantages that a low cost and a minimization of the size of the camera are achieved, and the management for the alteration is good. For note, the method of using the above-described mechanical switch accessible from the outside of the camera housing necessitates at least one additional input port of the microcomputer for controlling the camera sequence as a matter of course. Even from this aspect, an increase of cost results.

Figure 16:
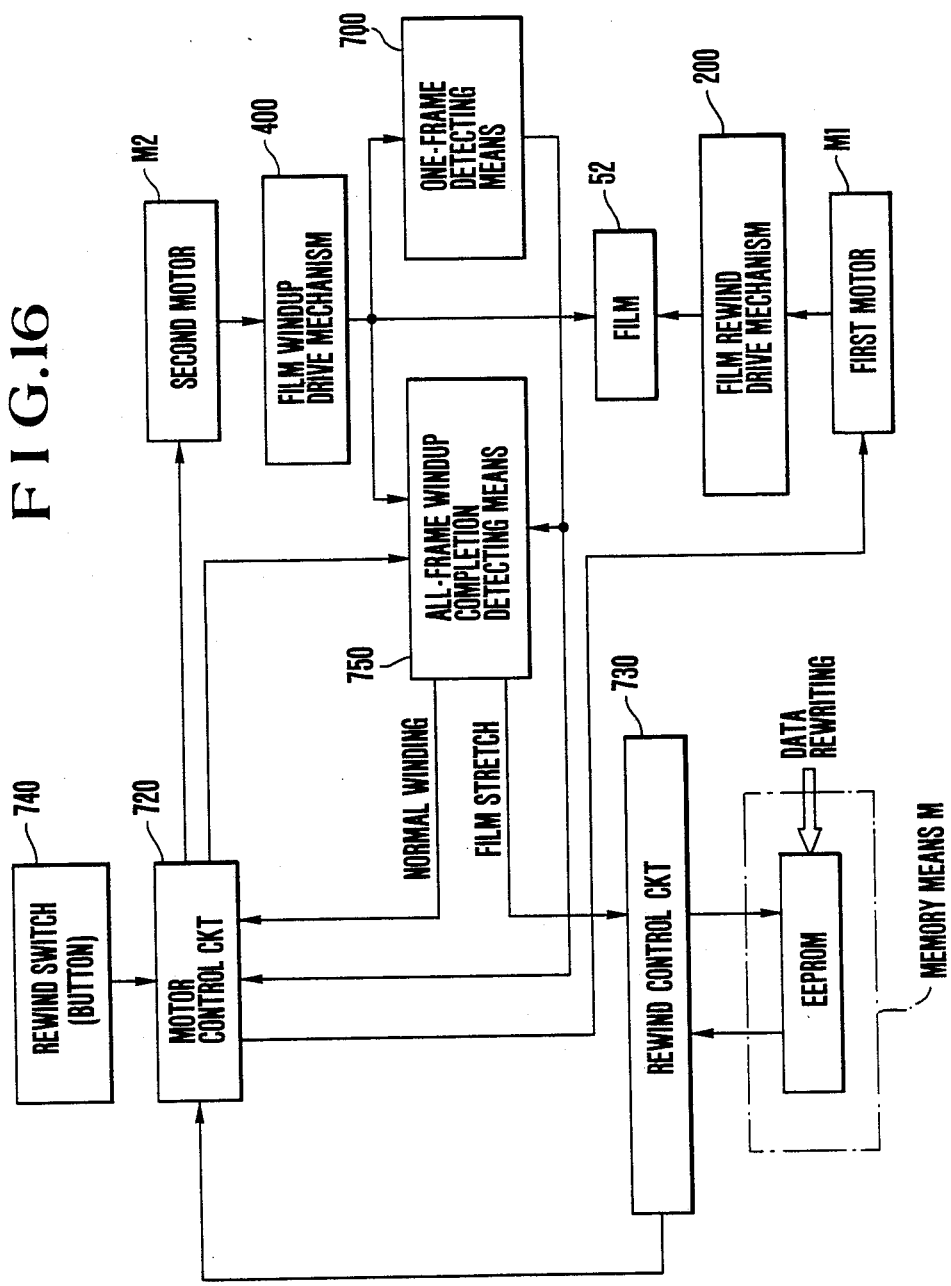
FIG. 16 is a block diagram taken to explain that operational feature which corresponds to another aspect of the invention.

This or second feature of the embodiment is explained on the basis of FIG. 16.

Rotation of the second motor M2 is transmitted to a film windup drive mechanism 400 to wind up the film 52. The rotation control of this or second motor M2 is carried out by a motor control circuit 720. Actually, by the input of a signal representing the completion of running of the shutter unit (the trailing blades of the shutter), the second motor M2 is driven to rotate in the windup direction. A one-frame detecting means 700 detects the state of rotation of a sprocket 402 of the film windup drive mechanism 400. In the state that the sprocket 402 has been moved by the film 52 in following up way by one frame of film, the one-frame windup completion signal is outputted to the motor control circuit 720. The motor control circuit 720 receives that signal to stop-control the second motor M2.

An all-frame windup completion detecting means 750 cooperates with the same sprocket 402 in such a manner that when the on-off changeover signal representing the film movement (as arranged to recycle the on-off changeover signal a plurality of times in winding up one frame) is not produced by the film 52 during a prescribed time, a film stretch (film all-frame windup completion) signal is outputted to a rewind control circuit 730. In the rewind control circuit 730, whether or not the motor control circuit 720 drives the first motor M1 for rewind in automatic response to reception of the above-described stretch signal is determined, or either one of the two controls, namely, the automatic and manual transition to the rewind mode, is selected. This selection is performed based on the content of the data rewritable non-volatile memory EEPROM provided in the memory means M, or the presently stored information representing whether the automatic transition is allowed or prohibited.

Supposed the data of allowing the automatic transition to the rewind mode has been stored in the memory EEPROM, then the motor control circuit 720 first stop-drives the second motor M2 and then drives the motor M2 in the reverse direction to the windup direction, thereby the clutch is actuated to cut off the drive connection between the second motor M2 and the film windup drive mechanism 400, or the windup member, for example, takeup spool, is freed to reduce the rewind load. And, after that, the first motor M1 is rotated in the rewind direction to automatically rewind the film.

Meanwhile, suppose the data of prohibiting the automatic transition to the rewind mode has been stored in the memory EEPROM, then the motor control circuit 720 merely stop-controls the second motor M2 and waits in this state.

A rewind switch 740 includes a rewind bottom for forcibly performing the rewinding operation. By operating this rewind switch 740, the motor control circuit 720 controls the second and first motors M2 and M1 in a similar manner to that described in connection with the automatic transition.

What is thirdly characteristic of the above-described embodiment is that before the first motor M1 is driven to rotate in the reverse direction for the rewinding purpose (step #78 of FIG. 13D), the windup or second motor M2 is driven to reverse rotation (step #76) to remove the load of the film windup drive mechanism 400 when in the rewind mode. That is, as the second motor M2 is rotated in the reverse direction, the sun gear 406 rotates from the position of FIG. 9(d) in the clockwise direction, thereby the spool side planet gear 411 is released from the meshing engagement with the spool side transmission gear 409, thus cutting off the drive connection between the second motor M2 and the spool 401, and freeing the spool 401. Hence, despite that the spool 401 is driven by the film 52 to rotate in the rewind direction, no substantial rewind load is given so that a high speed rewinding becomes possible.

Suppose such a control of the second motor M2 as in this embodiment is not carried out when to the rewind mode, then because the spool side gear 411 of the planetary clutch of the film windup drive mechanism 400 is left in engagement with the spool side transmission gear 409, the load on the first motor M1 when in the rewind mode becomes very large (for the second motor M2 must rotate to follow up it, the rewinding speed is unavoidably slowed down.

Also, in this embodiment, not only just before the start of rewinding, but also during all time when the film is rewound, the reverse driving of the second motor M2 is made to continue. The reason why the reduction of the rewind load is performed in such a way is that if it were only before the start of rewinding that the control takes place, the possibility of damaging the film 52 would not become ignored when an accident of rapidly changing the rewind load happens at a time during the rewinding operation as the spool side planet gear 411 is returned back by some shock to engage the spool side transmission gear 409 again.

For note, though the second motor M2 continues being energized to rotate in the reverse direction during the entire rewinding operation, the electrical power load may be almost ignored because the current flowing to the second motor M2 is as little as the no-load one, for the planetary clutch is merely caused to escape (spool side planet gear 411 is held out of connection with the spool side transmission gear 409).

Also, in this embodiment, since the first motor M1 for performing the rewinding is fixedly mounted on the side wall of the mirror box 60 at a location near the rewind fork 202 (see FIG. 2) which is the final stage of the rewind transmission system, the efficiency of transmission related to the rewinding operation can be set to a very high value. Also, since the second motor M2 for performing the winding up operation, too, is located within the spool 401 which also is the final stage of the windup transmission system, the efficiency of transmission related to the winding operation can be set to a very high value.

Also, in this embodiment, the second motor M2 for winding up the film 52 and the first motor M1 for performing the rewinding are arranged to operate independently of each other. Therefore, as the second motor M2 use may be made of a motor of so good controllability as to allow for an increase of the accuracy of the stopped position of the film as after advanced one frame to maintain constant the distance between the successive two of the exposed frames (for example, coreless motor), while, for the first motor, a high power motor with emphasis on the speed or a cheap motor with emphasis on the production cost may be selected. When the motors are selected by such criterions, a high performance, or low cost motor driven camera can be offered.

Next, a third feature of the embodiment is explained about on the basis of the block diagram of FIG. 17. Rotation of the first motor M1 is adequately sped down by a speed reduction transmission system 800, and changing over between two transmission systems is carried out by a planetary clutch 810. That is, when the first motor M1 rotates in the forward direction, the planetary clutch 810 comes to engage with the transmission system of the mirror box mechanism 820. When in the reverse direction, the planetary clutch 810 comes to the transmission system of a film rewind drive mechanism 900. In such a manner, one of the transmission systems to be driven is selected depending on the direction of rotation of the first motor M1. Keeping up the discussion on assumption that the first motor M1 is rotating in the forward direction, the rotation of this or first motor M1 is transmitted to the mirror drive mechanism 822 and the shutter charge mechanism 824 in the mirror box drive mechanism 820.

The mirror drive mechanism 822 operates swing motion of the movable mirror 840, and he shutter charge mechanism 824 operates the charge driving and charge releasing of the shutter unit 850. The phase based on the operation of both mechanisms 822 and 824 is detected by a phase detecting means 830. The detection result of this phase detecting means 830 is supplied to a motor control circuit 860. Thus, the rotation and stoppage of the first motor M1 is carried out. Also, the mirror drive mechanism 822 and the shutter charge mechanism 824 are set up so that in the phase when the upward swing turn of the movable mirror 840 to the retracted position from the optical path to the exposure aperture is complete, the shutter charge release phase is obtained, and that in the phase when the running of the shutter is complete, the phase of completion of the downward movement of the mirror 840 to the finder viewing position is obtained.

Based on the actuation signal from the release button or like release start information, the motor control circuit 860 rotates the motor M1 in the forward direction. And, the forward rotation of the first motor M1 continues until, as the mirror-upping is completed, the movable mirror 840 reaches the retracted position detected by the phase detecting means 830. At that point in time, the stopping control of the first motor M1 is carried out by the motor control circuit 860. Also, in the stopped state of this or first motor M1, the shutter charge mechanism 824 reaches a phase that allows for the shutter charge release of a shutter unit 850. After that, the running of the shutter is carried out by the shutter unit 850. When information representing that the running of the trailing blade group of the shutter has been completed is supplied to the motor control circuit 860, the control circuit 860 rotates the first motor M1 again in the same or forward direction. By this forward rotation of the first motor M1, the mirror drive mechanism 822 is driven again to move the movable mirror 840 downward, and the shutter charge mechanism 824 is also driven to charge the shutter unit 850. When the phase detecting means 830 detects the phase that the shutter charge mechanism 824 has completed the shutter charging operation, the motor control circuit 860 stops the first motor M1. For note, at this point in time, the movable mirror 840 completes its downward movement, taking the initial or finder-viewing position.

Up to the arrival of the next release start information, the first motor M1 continues stopping in this state. And, each time the next release start information comes on, the above-described sequence of operations is recycled.

Meanwhile, the rotation of normal direction of the second motor M2 brings the planet gear of the planetary clutch 920 into drive connection with the film windup drive mechanism 870 to transport the film 880 in the windup direction. The rotation of this or second motor M2 is controlled by the motor control circuit 860. In more detail, when information representing the completion of running of the trailing blades of the shutter in the shutter unit 850 is supplied to the motor control circuit 860, the second motor M2 is rotated in the normal direction to perform the winding up operation of the film 880. As the film is being wound up, when the film 880 has advanced by one frame, this state is detected by one-frame detecting means 890, and the detection result is supplied to the motor control circuit 860 to stop the second motor M2. After that, each time the shutter in the shutter unit 850 runs, the one-frame winding operation of the film 880 is recycled by the film windup drive mechanism 870.

And, at a time during the film winding operation that follows the completion of exposure of the last one of the prescribed number of frames (in the case of the 24-exposure cartridge in use, usually the 24th frame), the film 880 is stretched. This stretching of film 880 is detected by the film stretch detecting means 930. That is, the above-described one-frame detecting means 890 is so constructed to produce an on-off signal which is recycled a plurality of times when the film is being advanced through the length of one frame. If the plurality of the on-off signals are not produced within a prescribed time, it is determined that the film is stretched, or all the film frames have been exposed. And, when the stretching of the film 880 is detected by the film stretch detecting means 930, its detection signal is sent to the motor control circuit 860. And, the motor control circuit 860 continues energizing the first motor M1 to rotate in the normal direction until it receives a signal representing that the movable mirror 840 has moved downward and the phase that the charging of the shutter charge mechanism 824 is completed from the phase detecting means 830. At a time when this signal is received, the second motor M2 is first driven to rotate in the reverse direction, and, in somewhat delay, the first motor M1 also is then driven to rotate in the reverse direction.

The state resulting fro the reverse rotation of the second motor M2 is explained. By the change of the direction of rotation of the second motor M2, the planet gear of the planetary clutch 920 is taken out of drive connection with the windup transmission system of the film windup drive mechanism 870, and the windup transmission system (including the spool) is freed. Therefore, when in the rewind mode that follows, the film windup drive mechanism 870 becomes no load.

Next, the state resulting from the reverse rotation of the first motor M1 is explained. The change of the rotation of this or first motor M1 to the reverse direction is controlled by the motor control circuit 860 as has been described above so that it occurs under the condition that the rewind signal due to the manipulation of the rewind button and the detection signal of the stretch (the completion of exposure of all the frames) of the film 880 are generated. When the first motor M1 is rotated in the reverse direction by the motor control circuit 860, the planet gear of the planetary clutch 810 is automatically changed over to the film rewind drive mechanism 900 so that the rotation of the first motor M1 is transmitted to the film rewind drive mechanism 900 to transport the film 880 to the rewind direction. This film rewinding is continued until the completion of rewinding is detected by a rewind completion detecting means 910. And, upon completion of the rewinding, the above-described rewind completion detecting means 710 produces detection information. When it is supplied to the motor control circuit 860, the first motor M1 is stopped.

For note, though the foregoing embodiment has been described in connection with the type in which the film 52 is wound up frame by frame in each shot, and, after all the frames have been exposed, the film 52 is continuously rewound, the present invention is applicable to another type in which soon after the film loading, the film 52 is all wound up on the takeup spool, and then rewound frame by frame in each shot.

What is claimed is:

1. A motor driven camera comprising:
    a mirror drive mechanism for swinging a mirror to an exposure retracted position from a finger viewing position and to the finder viewing position from the exposure retracted position;
    a shutter charge mechanism for performing charge driving and charge releasing of a shutter;
    a first film drive mechanism for driving film in a direction reverse to a feeding direction for each successive shot;
    a first motor serving as a drive source for driving said mirror drive mechanism, said shutter charge mechanism and said first film drive mechanism, wherein said mirror drive mechanism, for said mirror drive mechanism effects mirror movement from the finder viewing position to the exposure retracted positions and back to the finder viewing positions with unidirectional rotation of said first motor; and
    a clutch mechanism having output transmission systems being changed over in response to a change of the direction of rotation of an output of said first motor, one of said output transmission systems being connected to said mirror drive mechanism and said shutter charge mechanism, and another of said output transmission systems being connected to said first film drive mechanism.

2. A camera according to claim 1, further comprising:
    a second film drive mechanism for driving the film in a feeding direction for each one-frame shot; and
    a second motor serving as a drive source for driving said second film drive mechanism.

3. A camera according to claim 1, wherein said first film drive mechanism drives the film in the rewinding direction.

4. A camera according to claim 2, wherein said first film drive mechanism drives the film in the rewinding direction, and said second drive mechanism drives the film in the winding-up direction.

5. A camera according to claim 1, wherein said clutch mechanism is includes a planetary clutch having a planet gear, when revolved in a first direction said planet gear engaging a common start transmission gear of said mirror drive mechanism and said shutter charge mechanism, and when revolved in a second direction said planet gear engaging a transmission gear of said first film drive mechanism.

6. A camera according to claim 5, wherein said mirror drive mechanism and said shutter charge mechanism are associated with each other so that rotation of said start transmission gear accompanies with driving one of said mechanisms, and driving of said one mechanism accompanies with driving another of said mechanisms.

7. A camera according to claim 4, wherein said first film drive mechanism includes a rewind fork engaging with a hub of a film cartridge,
   said second film drive mechanism includes a spool on which the film is taken up,
   said first motor is arranged on said rewind fork side of said movable mirror on a camera framework, and
   said second motor is arranged on said spool side of said movable mirror on said camera framework.

8. A motor driven camera comprising:
   a mirror drive mechanism rotating unidirectionally for swinging a mirror to an exposure retracted position from the exposure retracted position;
   a shutter charge mechanism for performing driving related to charging of a shutter;
   a first film drive mechanism for driving film in a direction reverse to a feeding direction for each successive shot;
   a first motor serving as a drive source for driving said mirror drive mechanism, said shutter charge mechanism and said first film drive mechanism wherein said mirror drive mechanism, for said mirror drive mechanism effects mirror movement from the finder viewing position to the exposure retracted position and back to the finder viewing positions with unidirectional rotation of said first motor; and
   a clutch mechanism having output transmission systems being changed over in response to a change of the direction of rotation of an output of said first motor, said mirror drive mechanism and said shutter charge mechanism being connected to one of said output transmission systems of said clutch mechanism, and said first film drive mechanism being connected to another of said output transmission systems of said clutch mechanism.

9. A camera according to claim 8, further comprising:
   a second film drive mechanism for driving the film in a feeding direction for each one-frame shot; and
   a second motor serving as a drive source for driving said second film drive mechanism.

* * * * *

UNITED STATES PATENT AND TRADEMARK OFFICE
CERTIFICATE OF CORRECTION

PATENT NO. : 4,881,092

DATED : November 14, 1989

INVENTOR(S) : Hidehiko Fukahori, et al.

It is certified that error appears in the above-identified patent and that said Letters Patent is hereby corrected as shown below:

COLUMN 2:

Line 9, "used motors" should read --motors used--.

Line 40, "for" should read --before--.

Line 48, "or capa-" should read --or is capa---.

COLUMN 3:

Line 48, "can simply" should read --can be simply--.

Line 67, "film rewing" should read --film rewind--.

Figure 9E:
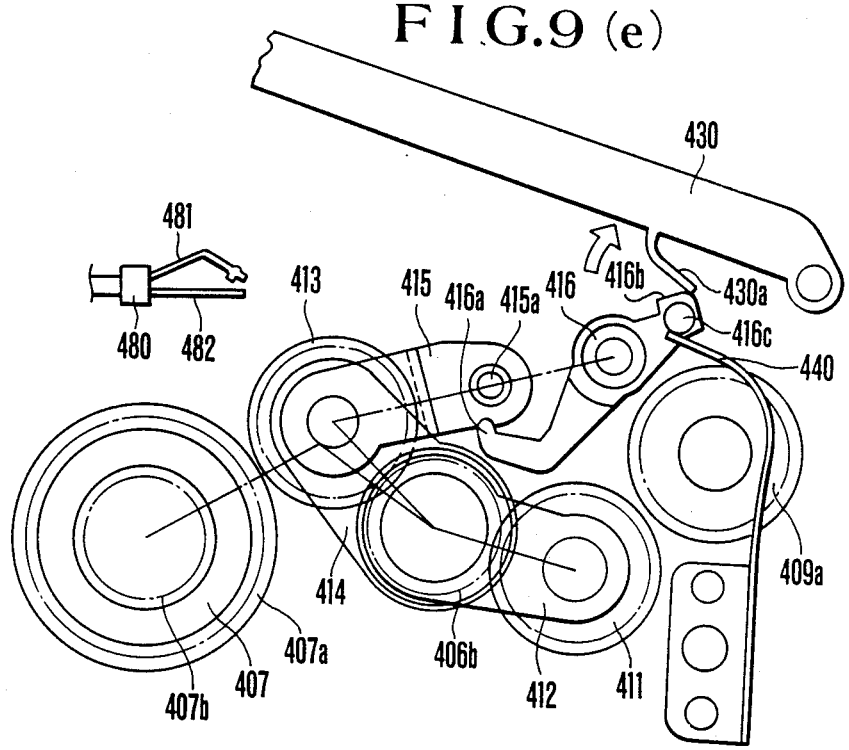

COLUMN 4:

Line 15, "FIGS. 9(e) to 9(e)" should read --FIGS 9(a) to 9(e)--.

Line 59, "are" should read --is--.

COLUMN 5:

Line 32, "mesh" should read --mesh with--.

Line 48, "rotates" should read --rotating--.

UNITED STATES PATENT AND TRADEMARK OFFICE
CERTIFICATE OF CORRECTION

PATENT NO. : 4,881,092
DATED : November 14, 1989
INVENTOR(S) : Hidehiko Fukahori, et al.

It is certified that error appears in the above-identified patent and that said Letters Patent is hereby corrected as shown below:

COLUMN 6:

Line 62, "lockwise" should read --clockwise--.

COLUMN 7:

Line 8, "the counter-clockwise" should read --the counter-clockwise direction--.

COLUMN 10:

Line 18, "supposed" should read --supported--.

COLUMN 11:

Line 14, "reaches" should read --reach--; and "becomes" should read --become--.

Line 40, "clockwise" should read --clockwise direction--.

COLUMN 12:

Line 22, "cartridge" should read --cartridge chamber 44--.

Line 33, "to insert" should read --inserting--.
    Line 33, after "downward" insert a period.

UNITED STATES PATENT AND TRADEMARK OFFICE
CERTIFICATE OF CORRECTION

PATENT NO. : 4,881,092  
DATED : November 14, 1989  
INVENTOR(S) : Hidehiko Fukahori, et al.

Page 3 of 8

It is certified that error appears in the above-identified patent and that said Letters Patent is hereby corrected as shown below:

COLUMN 13:

Line 11, "405 common" should read --406 common--.

Line 52, "a tail 416c" should read --a pin 416c--.

COLUMN 14:

Line 13, "sun gear 408" should read --sun gear 406--.

Line 26, "406, 406" should read --406, 407--.

COLUMN 16:

Line 19, "ring 540" should read --gear ring 540--.

Line 55, "battery BUT" should read --battery BAT--.

COLUMN 18:

Line 49, "MC" should read --MC2--.

COLUMN 19:

Line 1, "charing" should read --charging--.

Line 45, "MC" should read --MC2--.

Line 46, "MC" should read --MC3--.

UNITED STATES PATENT AND TRADEMARK OFFICE
CERTIFICATE OF CORRECTION

PATENT NO. : 4,881,092
DATED : November 14, 1989
INVENTOR(S) : Hidehiko Fukahori, et al.

It is certified that error appears in the above-identified patent and that said Letters Patent is hereby corrected as shown below:

COLUMN 20:

Line 67, "producting" should read --production--.

COLUMN 22:

Line 23, "MC" should read --MC2--.

COLUMN 23:

Line 64, "the #30," should read --the step #30,--.

COLUMN 24

Line 51, "t" should be --to--.

Line 52, "formal" should read --normal--.

Line 56, "TR2" should read --TMR2--.

COLUMN 25:

Line 65, "TRM2" should read --TMR2--.

COLUMN 27:

Line 25, "stat" should read --start--.

Line 28, "stoppage o" should read --stoppage of--.

UNITED STATES PATENT AND TRADEMARK OFFICE
CERTIFICATE OF CORRECTION

PATENT NO. : 4,881,092
DATED : November 14, 1989
INVENTOR(S) : Hidehiko Fukahori, et al.

It is certified that error appears in the above-identified patent and that said Letters Patent is hereby corrected as shown below:

COLUMN 30:

Line 36, "more 15 millisecond" should read --15 milliseconds more--.

Line 51, "count time" should read --count the time--.

COLUMN 31:

Line 19, "M2" should read --M1--.

Line 58, "rotate more one revolution" should read --to rotate one revolution more--.

COLUMN 32:

Line 34, "could not" should read --could--.

Line 43, "to" should be deleted.

Line 44, "carry" should read --carrying--.

COLUMN 34:

Line 12, "stopping." should read --stopping,--.

Line 13, "The" should read --the--.

Line 37, "to a step" should read --advance to a step--.

UNITED STATES PATENT AND TRADEMARK OFFICE
CERTIFICATE OF CORRECTION

PATENT NO. : 4,881,092
DATED : November 14, 1989
INVENTOR(S) : Hidehiko Fukahori, et al.

It is certified that error appears in the above-identified patent and that said Letters Patent is hereby corrected as shown below:

COLUMN 35:

Line 15, "them" should read --then--.

Line 17, "step" (second occurrence) should read --stop--.

Line 53, "microcomputer" should read --microcomputer MC2--.

COLUMN 36:

Line 56, "abovede-" should read --above-de--.

COLUMN 39:

Line 43, "generate." should read --is generated.--.

COLUMN 40:

Line 46, "Supposed" should read -- Suppose--.

Line 48, "stop" should read --step--.

COLUMN 41:

Line 19, "to" should read --in--.

Line 36, "planet" should read --planetary--.

Line 45, "planet gear" should read --planetary gear--.

UNITED STATES PATENT AND TRADEMARK OFFICE
CERTIFICATE OF CORRECTION

PATENT NO. : 4,881,092
DATED : November 14, 1989
INVENTOR(S) : Hidehiko Fukahori, et al.

It is certified that error appears in the above-identified patent and that said Letters Patent is hereby corrected as shown below:

COLUMN 43:

Line 8, "planet gear" should read --planetary gear--.

Line 45, "the phase" should be deleted.

Line 51, "fro" should read --from--.

Line 53, "planet" should read --planetary--.

COLUMN 44:

Line 2, "planet gear" should read --planetary gear--.

Line 24, "finger" should read --finder--.

Line 35, "said mirror drive mechanism" should be deleted.

Line 38, "positions" should read --position--.

Line 61, "is" should be deleted.

COLUMN 45:

Line 4, "with" should be deleted.

Line 6, "with" should be deleted.

UNITED STATES PATENT AND TRADEMARK OFFICE
CERTIFICATE OF CORRECTION

PATENT NO. : 4,881,092

DATED : November 14, 1989

INVENTOR(S) : Hidehiko Fukahori, et al.

It is certified that error appears in the above-identified patent and that said Letters Patent is hereby corrected as shown below:

COLUMN 46:

Lines 7/8, "for said mirror drive mechanism" should be deleted.

Line 10, "positions" should read --position--.

Signed and Sealed this

Twenty-fourth Day of September, 1991

Attest:

HARRY F. MANBECK, JR.

Attesting Officer

Commissioner of Patents and Trademarks